(12) United States Patent
Kelsey et al.

(10) Patent No.: US 12,367,425 B1
(45) Date of Patent: Jul. 22, 2025

(54) COPILOT CUSTOMIZATION WITH DATA PRODUCER(S)

(71) Applicant: THIA ST Co., Corvallis, OR (US)

(72) Inventors: Elaine Kelsey, Corvallis, OR (US); Sazzad Mahmud Nasir, Muncie, IN (US); Jeffrey Thomas Yarbro, Memphis, TN (US); Lauren Elizabeth Egerton, New York, NY (US); Elliot Nicholas Robson, Seoul (KR); Brendan Michael Kelly, Somerville, MA (US); Robert Oscar Robson, Corvallis, OR (US); Spencer Thomas Ward, Kent, WA (US)

(73) Assignee: THIA ST CO., Corvallis, OR (US)

( * ) Notice: Subject to any disclaimer, the term of this patent is extended or adjusted under 35 U.S.C. 154(b) by 0 days.

(21) Appl. No.: 19/005,699

(22) Filed: Dec. 30, 2024

Related U.S. Application Data

(63) Continuation of application No. PCT/US2024/061934, filed on Dec. 26, 2024, which is a continuation-in-part of application No. 18/898,502, filed on Sep. 26, 2024, now Pat. No. 12,242,503.

(60) Provisional application No. 63/717,151, filed on Nov. 6, 2024, provisional application No. 63/709,258, filed on Oct. 18, 2024, provisional application No. 63/646,613, filed on May 13, 2024, provisional application No. 63/561,654, filed on Mar. 5, 2024, provisional application No. 63/620,329, filed on Jan. 12, 2024.

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| 8,442,940 | B1 | 5/2013 | Faletti et al. |
| 10,802,488 | B1 | 10/2020 | Abeloe |

(Continued)

OTHER PUBLICATIONS

Morisot, "Add a SideNet to your MainNet," ArXiv:2007.13512v1, 15 pages (Jul. 2020).

(Continued)

*Primary Examiner* — Christopher J Raab
(74) *Attorney, Agent, or Firm* — Klarquist Sparkman, LLP

(57) ABSTRACT

Methods and apparatus are disclosed for customizing a copilot. Document records related to copilot objectives or tasks are obtained and used to identify corresponding data sources. Data sources can be integrated into data producers or data repositories, to be used by a retrieval microservice. Data producers and other microservices are individually fine-tuned for the custom application, before or after integration into the copilot. The integrated copilot is tested end-to-end, and can be further refined. Disclosed techniques range from fully automated to human-in-the-loop (e.g. guided by an expert) to fully interactive. Some techniques produce tools which can automate certain customization operations. Training data, tasks, or document records blend expert-generated, developer-generated, or synthesized items.

16 Claims, 25 Drawing Sheets

(56) References Cited

U.S. PATENT DOCUMENTS

| | | | |
|---|---|---|---|
| 10,803,127 | B2 | 10/2020 | Alexander et al. |
| 10,992,780 | B1* | 4/2021 | Rudrappa Goniwada .................... H04L 67/34 |
| 11,379,715 | B2 | 7/2022 | Tang et al. |
| 11,443,102 | B1* | 9/2022 | Wilson .................... G06Q 30/04 |
| 11,922,121 | B2 | 3/2024 | Wang |
| 12,093,658 | B1 | 9/2024 | Silver et al. |
| 12,136,043 | B1 | 11/2024 | Davis et al. |
| 12,210,973 | B2 | 1/2025 | Johnson |
| 2015/0199646 | A1 | 7/2015 | Taylor et al. |
| 2016/0246824 | A1 | 8/2016 | Furuhashi et al. |
| 2017/0262811 | A1* | 9/2017 | Ovadya ................. G06F 40/186 |
| 2017/0262949 | A1 | 9/2017 | Jay |
| 2018/0089593 | A1 | 3/2018 | Patel et al. |
| 2019/0325353 | A1 | 10/2019 | Aftab et al. |
| 2020/0050946 | A1 | 2/2020 | Lecue et al. |
| 2020/0057946 | A1 | 2/2020 | Singaraju et al. |
| 2020/0069208 | A1 | 3/2020 | Keane |
| 2020/0186433 | A1* | 6/2020 | Cui ..................... H04L 41/0886 |
| 2020/0241944 | A1 | 7/2020 | Derdak et al. |
| 2020/0257733 | A1 | 8/2020 | Mei et al. |
| 2020/0380254 | A1* | 12/2020 | Zeng ..................... G06V 10/82 |
| 2021/0035047 | A1 | 2/2021 | Mossoba et al. |
| 2021/0089779 | A1 | 3/2021 | Chan et al. |
| 2021/0295238 | A1 | 3/2021 | Poon et al. |
| 2021/0174347 | A1 | 6/2021 | Rose |
| 2021/0201128 | A1 | 7/2021 | Xu et al. |
| 2021/0233030 | A1 | 7/2021 | Preuss et al. |
| 2021/0286831 | A1 | 9/2021 | Girardi et al. |
| 2021/0312399 | A1 | 10/2021 | Asokan et al. |
| 2021/0357705 | A1 | 11/2021 | Sung et al. |
| 2021/0365782 | A1 | 11/2021 | Huang et al. |
| 2022/0067665 | A1 | 3/2022 | Westerheide et al. |
| 2022/0232085 | A1 | 7/2022 | Panikkar et al. |
| 2022/0237892 | A1 | 7/2022 | Anderton-Yang |
| 2022/0284312 | A1 | 9/2022 | Brecque |
| 2022/0336060 | A1 | 10/2022 | Koop et al. |
| 2023/0133373 | A1 | 5/2023 | McGonnell |
| 2023/0214192 | A1 | 7/2023 | Makhija et al. |
| 2023/0214238 | A1* | 7/2023 | Yitzhaki ................. G06F 9/451 719/320 |
| 2023/0289691 | A1 | 9/2023 | Sabourin |
| 2024/0012842 | A1 | 1/2024 | Kislal et al. |
| 2024/0037949 | A1 | 2/2024 | Johnston et al. |
| 2024/0087743 | A1 | 3/2024 | Grimm et al. |
| 2024/0095679 | A1 | 3/2024 | Nowak et al. |
| 2024/0111498 | A1* | 4/2024 | Vaughn ..................... G06F 8/30 |
| 2024/0119383 | A1 | 4/2024 | Bowers et al. |
| 2024/0176629 | A1 | 5/2024 | Reddy |
| 2024/0202177 | A1* | 6/2024 | Bandlamudi ....... G06F 16/2237 |
| 2024/0303569 | A1* | 9/2024 | Yu ..................... G06Q 10/06316 |
| 2024/0362503 | A1 | 10/2024 | Prasad et al. |
| 2024/0386015 | A1* | 11/2024 | Crabtree ............. G06F 16/9024 |
| 2024/0403005 | A1* | 12/2024 | Friddle ..................... G06F 8/35 |
| 2024/0412720 | A1* | 12/2024 | Vasylyev .......... G06F 16/33295 |
| 2025/0005288 | A1 | 1/2025 | Amatriain-Rubio et al. |
| 2025/0069308 | A1 | 2/2025 | Cameron et al. |

OTHER PUBLICATIONS

Agarwal et al., "Knowledge graph based synthetic corpus generation for knowledge-enhanced language model pre-training," ArXiv:2010.12688 v2 (Mar. 13, 2021).

Bodor et al., "From Development to Deployment: An Approach to MLOps Monitoring for Machine Learning Model," 14th International Conference on Intelligent Systems: Theories and Applications, 7 pages (Nov. 2023).

Dorsch et al., "GraphGuard: Enhancing Data Quality in Knowledge Graph Pipelines," SEMIIM, 14 pages, (Nov. 2023).

Feng et al., "Knowledge Card: Filling LLMs' Knowledge Gaps With Plug-in Specialized Language Models," ArXiv:2305.09955v2, pp. 1-24 (Oct. 2023).

Jeong, "A Study on the Implementation of Generative AI Services Using an Enterprise Data-Based LLM Application Architecture," ArXiv 2309.01105v1, pp. 1-26 (Sep. 2023).

Kaddour et al., "Challenges and Applications of Large Language Models," ArXiv 2307.10169v1, pp. 1-72 (Jul. 2023).

Liang et al. "Modular Retrieval for Generalization and Interpretation," ArXiv:2303.13419v1, pp. 1-15 (Mar. 2023).

Liu et al., "Multi-stage pre-training over simplified multimodal pre-training models," ArXiv:2107.14596 (Jul. 22, 2021).

PCT/US2024/061299 Invitation to Pay Additional Fees, including Partial Search Report and Provisional Opinion, 15 pages (Apr. 9, 2025).

PCT/US2024/061934 Invitation to Pay Additional Fees, including Partial Search Report and Provisional Opinion, 20 pages (Apr. 4, 2025).

Roca et al., "Microservice chatbot architecture for chronic patient support," Journal of Biomedical Informatics, pp. 1-19 (Oct. 2019).

Shao et al., "Enhancing Retrieval-Augmented Large Language Models with Iterative Retrieval-Generation Synergy," ArXiv:2305.15294v1, pp. 1-12 (May 2023).

* cited by examiner

Meeting Transcript
Date: October 9, 2023
Location: NT Airlines Headquarters Meeting Room
Subject: Strategic Collaboration with UAM
Present:
From UAM:
Leila Hasan (Regional Sales Director)
Robert Thompson (Regional Sales Manager)
Bryan Tan (Sales Representative - Indonesia)
From NT Airlines:
Limawan Tan (CEO)
Ridwan Ibrahim (Marketing + Sales Director)
Siti Rahayu (Operations Director)

01 Bryan Tan: Good afternoon, esteemed members of NT Airlines. Thank you for hosting this meeting. Today, we would like to delve deeper into our collaboration and how we can enhance our partnership.

02 Limawan Tan: We appreciate UAM's proactive approach, Bryan. We look forward to hearing more about your plans.

03 Leila Hasan: Thank you, Mr. Tan. We've taken your feedback to heart and are implementing a strategic plan to address the concerns. One immediate measure we're introducing is setting up dedicated program managers for our key clients, ensuring streamlined communication and a more personalized post-purchase experience.

04 Ridwan Ibrahim: That sounds promising, Leila. It will definitely ease the communication process.

05 Robert Thompson: In addition to that, we're investigating the root causes of our delivery delays. We're exploring partnerships with local logistics providers and even considering enhancing our regional assembly capabilities. Our aim is to have aircraft deliveries better aligned with your operational needs.

06 Siti Rahayu: That would be a major improvement. Aligning the delivery timelines with our operational requirements is crucial for us.

07 Bryan Tan: On a longer-term perspective, we're also looking into offering more customization options. We've recognized the growing demand in the market for tailored aircraft solutions, and we're keen on providing that. From cabin configurations to in-flight entertainment systems, we want to ensure that our aircraft fits your specific requirements.

08 Limawan Tan: Customization has always been on our wishlist. If UAM can deliver on that front, it will be a significant boost to our partnership.

09 Leila Hasan: We're glad to hear that. Our aim is to be more than just a supplier to NT Airlines; we want to be a strategic partner, understanding and addressing your needs every step of the way.

10 Ridwan Ibrahim: That's the kind of relationship we're looking for. Your proposed strategies align well with our vision for the future. We're optimistic about the direction this partnership is heading.

11 Bryan Tan: Thank you, Ridwan. We'll keep you updated on our progress and ensure that the strategies discussed today are implemented effectively.

12 Limawan Tan: We appreciate that, Bryan.

13 Bryan Tan: Absolutely. Thank you all for your time today.
End of Meeting

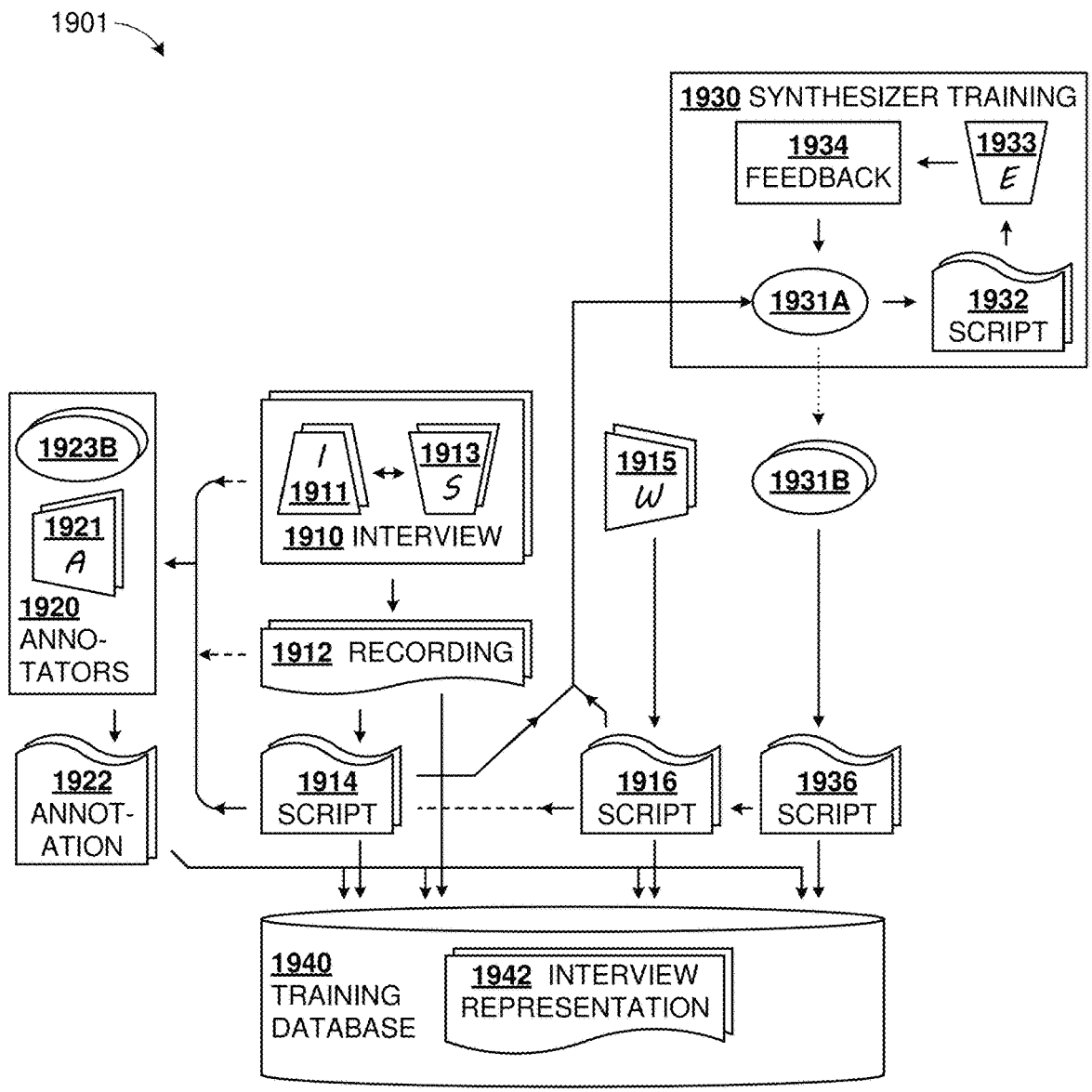
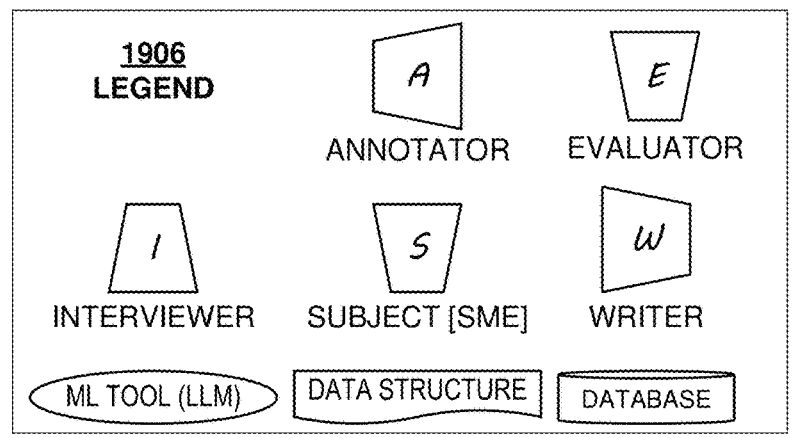
FIG. 19A

⋮

Elicit workflows and flow charts through questions and feedback     2212E
- Ask them to describe step-by-step how they perform a task
- Ask follow up questions to fill in the gap
- Show them the resulting workflow map or diagram
- Ask them to provide feedback until workflow is accurate
- What are exceptions to this workflow?
- How are each of those exceptions handled?
- Can the workflow be updated to handle those exceptions?
- What are problems that arise when completing this task? How do you handle each problem?

Record their screen for a day and have a model interpret that?     2212F
- Start with human annotation of the audio, video, text capture from screen stream and then move towards training a model to do the annotation

Expansion Model Related     2212G
- Generate list of input queries and requests
  - Generate synthetic possibilities from previous steps and show to the SME for feedback
- Generate list of active alerts
  - Generate synthetic possibilities from previous steps and show to the SME for feedback
- Repeat the previous steps as necessary to get a pretty comprehensive list of queries and alerts and the language they'll use
- Generate synthetic list of possible expansions for each query or alert
  - Get feedback from SME on Expansions
  - Repeat as needed
- Optional (Train on the outer loop with a reward model instead of on the direct output of the expansion model - SME gives feedback on output)

⋮

Core Model Related     2212Z
- Background information and documents (domain-specific and role specific data) - everything for extended pretraining
- The data from above
- Output feedback from the overall system
  - Synthetic output generation
  - Feedback from SME
  - Repeat as necessary

FIG. 22B

COPILOT CUSTOMIZATION WITH DATA PRODUCER(S)

CROSS REFERENCE TO RELATED APPLICATIONS

This is a Continuation of PCT Application No. PCT/US2024/061934 which: claims the benefit of U.S. Provisional Application Nos. 63/717,151 filed Nov. 6, 2024; 63/709,258 filed Oct. 18, 2024; 63/646,613 filed May 13, 2024; 63/561,654 filed on Mar. 5, 2024; and 63/620,329 filed on Jan. 12, 2024; and is also a continuation-in-part of U.S. patent application Ser. No. 18/898,502 filed Sep. 26, 2024, which in turn claims the benefit of 63/561,654 filed on Mar. 5, 2024 and 63/620,329 filed on Jan. 12, 2024. All these applications are incorporated by reference herein in entirety.

BACKGROUND

Tools based on Large Language Models (LLMs, which are machine learning (ML) tools incorporating an attention mechanism) have demonstrated remarkable natural language processing capabilities mimicking human linguistic or reasoning functions. LLMs have been used to answer questions, translate and summarize documents, or create content, and have found applications in finance, legal scholarship, programming, and chatbots. However, the usage of LLMs as everyday tools has been limited for a variety of reasons, such as computational burden, undesirable artifacts, and difficulty of customization.

While customized LLMs can be expected to outperform general purpose LLMs, many applications rely on off-the-shelf LLMs, or provide a rudimentary amount of fine-tuning which may not adequately prevent the LLM from producing undesirable results. For example, the LLM may generate results that are outside its desired scope of competence, based on prior training. On the other hand, extensive reprogramming of a large LLM can be prohibitive for a small volume application.

Certain applications require specialized training data which may not be readily available in published literature or in proprietary data repositories of an organization seeking to deploy such tools. One approach is to have skilled personnel create such training data, but this can be considerably laborious, especially when hundreds or even thousands of training data records may be required for a single trained ML tool. This problem worsens as larger volumes of training data are required for ever-increasing sizes of ML tools. Moreover, one organization may wish to have tens or hundreds of trained ML tools with distinct customized training, greatly increasing the human effort required.

Accordingly, there is a need for improved technologies for customizing ML tools and leveraging human effort in the generation of training data.

SUMMARY

In brief, disclosed technologies support copilot customization with a mix of automated, guided ("human-in-the-loop"), or interactive techniques. The disclosed technologies are applicable with copilots having a microservice architecture, which can be customized to perform particular tasks in a target data environment. Copilot tasks can be associated with relevant document records, and the document records can be used to identify data sources which can be used in fulfillment of the tasks. Data sources can be variously integrated into data producer microservices (often suitable for live data) or into data repositories (often suitable for historical, static, or slowly evolving data). Data producers and other microservices can be individually customized by one or more training phases, which can include fine-tuning. The complete copilot can be tested (for offering a satisfactory level of performance), deployed and, after deployment, can be monitored and refined over time under expert guidance.

Further examples of the disclosed technologies apply automation in various ways to generation or utilization of training data, amplifying contributions of skilled personnel to copilot customization.

Interviews

In certain examples, a copilot can be trained using representations of interviews in a training corpus, and then deployed to participate in conducting additional interviews. Some trained copilots can conduct such additional interviews. Such copilots can be assisted by feedback or suggestions from one or more evaluators (either human beings, or implemented as trained machine learning tools, in any combination). The feedback or suggestion can be offered live during an interview, or after the interview. To illustrate, feedback can be used to create supplementary training data for reinforcement learning applied to the trained copilot.

In further examples, trained copilots can monitor additional interviews and suggest prompts to partner interviewers conducting the additional interviews.

Interview representations can include transcripts or recordings of actual or mock interviews, which can be augmented by annotations. These annotations can include topic identification, an allocation of portions of an interview among various topics, or a workflow map based on responses of one or more interview subjects. Interview representations can also be synthesized by another trained machine learning tool, or can be authored by a human. Annotations can be prepared by a human annotator, or by a trained machine learning tool. This tool can be trained using similar techniques as used to train interviewers or evaluators.

While interviews can often be conducted with a single interviewer and a single subject, these are not requirements: a single interview can include multiple interviewers or multiple subjects, in any combination.

Disclosed technologies are not limited to interviews, and can also be applied to recorded work sessions.

Recorded Work Sessions

In certain examples, workflow maps can be used to train a first copilot to emulate associated workflows. A second copilot can be trained to generate the workflow maps from recorded sessions of experts performing associated workflows. The second copilot can be trained to predict an annotator's output (e.g. a workflow map) for example recorded sessions. Unsupervised, supervised, or reinforcement learning can be used, in any combination. The trained second copilot can be deployed to generate annotations for additional recorded sessions.

In certain examples, segments of a recording can be assigned to respective trained machine learning (ML) tools based on annotation (e.g. demarcating the segments) accompanying the recording. Each trained ML tool can extract, from the respective segment, one or more maps of a respective workflow. These trained ML tools are dubbed "extractors." The maps can be stored or transmitted for use in training emulators of the respective workflows. These emulators, individually or in any combination, can be similar to the first copilot described above.

In further examples, annotations demarcating the segments can themselves be generated by another trained ML tool dubbed a "segmenter." The segmenter can be trained (similarly to the second copilot described above) to predict an annotator's output (e.g. indication of segments) for example recorded sessions. One or more of the trained ML tools can be incorporated into respective microservices of a microservice network.

In certain examples, a third copilot can be implemented as a weakly connected network of microservices including a distribution microservice and one or more task microservices. The distribution microservice can identify respective tasks based on client input, and forward the task toward respective task microservices. Each of these task microservices can emulate its received task, e.g. perform that task or cause that task to be performed.

In some examples, the third copilot can be directed to generation of workflow maps from recorded sessions of experts performing associated workflows. That is, the distribution microservice can implement a tool similar to the segmenter, and the task microservices can implement tools similar to the extractors. A task microservice can be trained to annotate a given task using training data records, each record including a workflow map for the given task and a recording of one or more experts performing the given task.

In other examples, the third copilot can be directed to emulation of workflows as instructed in the client input. That is, the distribution microservice can identify one or more workflows to be emulated (tasks). The task microservices can emulate the various workflows according to their respective training. A task microservice can be trained to emulate a given task using training data records, each record including a workflow map for the given task.

The foregoing and other objects, features, and advantages of the invention will become more apparent from the following detailed description, which proceeds with reference to the accompanying figures.

BRIEF DESCRIPTION OF THE DRAWINGS

FIG. 13 is an example meeting transcript which can be used for copilot customization according to the disclosed technologies.

FIGS. 19A-19E are diagrams illustrating dataflows and relationships between various roles in examples of the disclosed technologies.

FIGS. 22A-22B are parts of a diagram illustrating example organization of data extracted from an interview, according to the disclosed technologies.

DETAILED DESCRIPTION

Introduction

Figure 1:
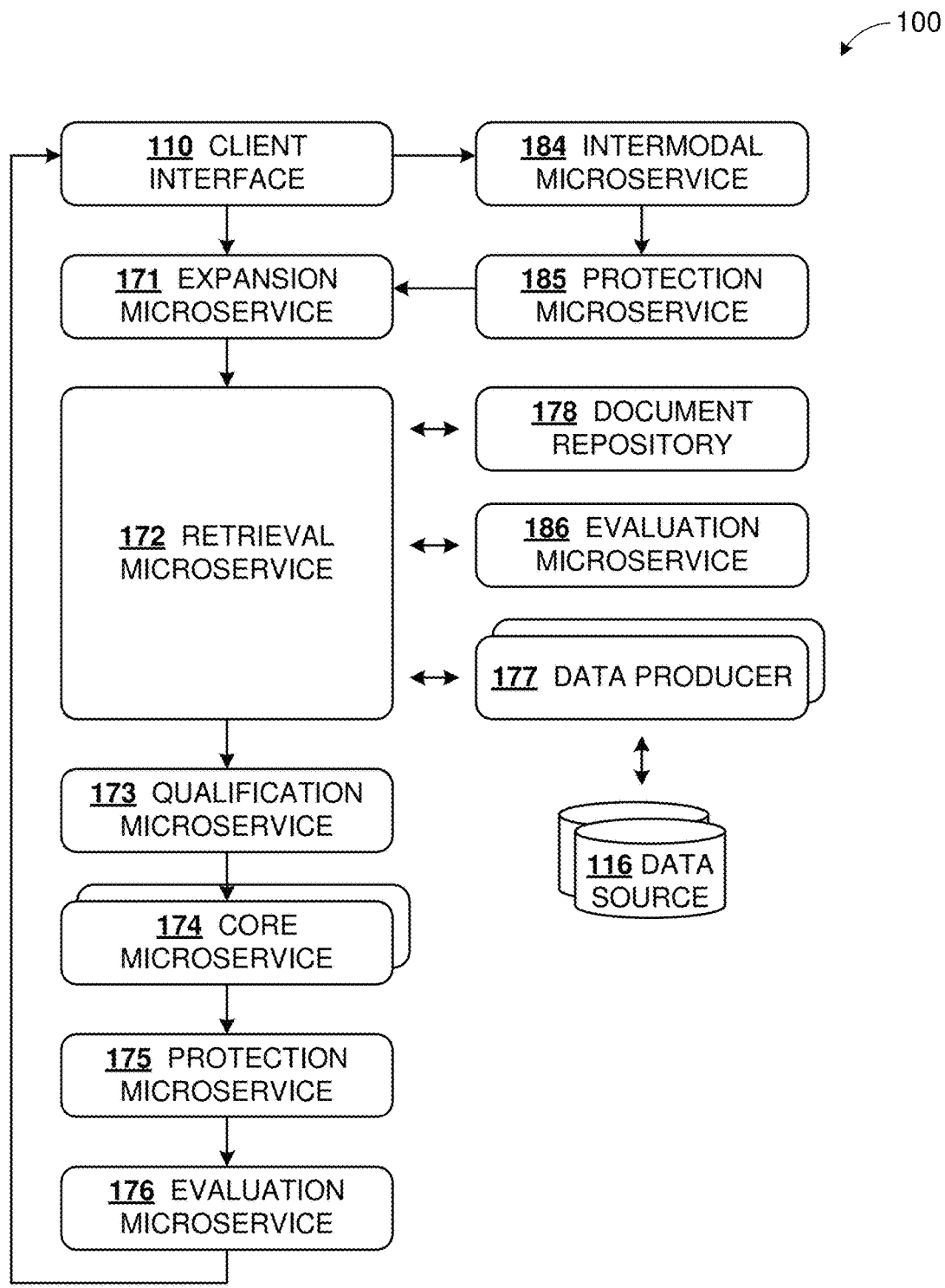
FIG. 1 is a block diagram illustrating an example copilot architecture according to the disclosed technologies.

Language models have made great strides in recent years, and have captured the imagination of the artificial intelligence community, businesses in many sectors, and the public at large. Unsurprisingly, a common mindset has been that bigger is better and, in particular, that emergent behavior can arise when models exceed some threshold size.

The development of language models has been spurred in part by the introduction of an attention mechanism for neural networks, allowing non-local gathering and propagation of information between e.g. neurons or layers of a neural network. Today, attention mechanisms are commonly provided in a variety of so-called "transformer" neural networks, but this is not a requirement, and similar features can be incorporated into other neural networks, such as a state-space model used by Mamba, or even into machine learning implementations other than neural networks.

1. Size and its Disadvantages

Size comes with penalties. For an LLM with N trainable parameters, the computational burden to process a given input into output (e.g. perform an inference) can scale as O(N). Furthermore, the computation burden (e.g. in flops) of training an LLM can scale as O(N·D), where D is an amount of training data. While D can be chosen independently of N, larger models often require more training data than small models. Illustratively, in some examples, D can also scale as O(N), meaning that the computation burden of training an LLM can scale as $O(N^2)$. Other types of ML tools can exhibit similarly unfavorable scaling.

Additionally, computer systems of greater complexity can be required to support large LLMs. A common architecture is based on a compute node incorporating a general purpose processor (so-called "CPU," for central processing unit) with one or more accelerators or coprocessors ("GPU"), which support parallel operations and are often graphical processing units. Multiple nodes can be coupled to form a "cluster."

As currently deployed, one GPU can support up to about 20 billion parameters, and one CPU can support about eight GPUs. Thus, known LLMs with 200 billion to 2 trillion parameters can require clusters with two to about thirteen nodes. Because transformers have long-range connectivity across neurons and layers, the performance of progressively larger LLMs can worsen discontinuously going from a one-GPU system, where passing data is local, to a multiple-GPU system, and again from a one-node system to a multiple-node system. That is, total computation time can be dominated by the time required for data communication rather than for compute operations. For these reasons, computation time can be worse, by a factor of 10 or more, than that predicted by O(N) scaling for inference or O(N·D) scaling for training.

2. Microservice Network Architecture and its Advantages

Innovative architectures disclosed herein utilize a coupled network of microservices, variously implemented as LLMs, other machine-learning tools, or procedural logic—the latter including rule-based or other program logic. Some examples of the disclosed technology incorporate numerous small LLMs (which can be run on one GPU), and one or a few mid-sized LLMs (which can be run on one node). While the description herein often refers to LLMs for reasons of current popularity and clarity of illustration, the disclosed innovations are not so limited. Many of the LLM implementations disclosed herein can be substituted by other trained ML tools. That is, descriptions of LLMs herein generally extend to other trained ML tools, in addition to LLMs.

A microservice network architecture has been found to exhibit emergent behavior and can provide performance comparable to competing trillion parameter models on some tasks for which it is designed. In one view, the microservice network as a whole can be greater than the sum of its parts—having cognitive functioning capabilities arising from the network organization of its constituent parts which are absent in any of those constituent parts.

At the same time, the microservice network copilot can provide significant benefits, as described further herein.

Reduced training time: Relative to a 1 trillion parameter competing product, the computational burden to train a disclosed 70 billion parameter core microservice is reduced by a factor of 200 (based on $O(N^2)$ scaling) to 2,000 (also considering 10× reduction by eliminating inter-node data communication overhead) or more. Because of the scaling described above, a microservice architecture implemented with smaller ML tools is more readily scalable, in comparison to a monolithic tool implemented with a very large LLM, such as ChatGPT.

Reduced inference time: Relative to a 1 trillion parameter competing product, the computational burden to train a disclosed 70 billion parameter core microservice is reduced by a factor of 15 (based on O(N) scaling) to 150 (also accounting 10× for eliminated inter-node data communication overhead) or more.

Improved performance of specialized functions: Decoupling specialized functions into respective microservices allows each microservice to be optimized and to perform that specific function better and more efficiently than a general-purpose large LLM for which the specific function is merely a small part of its overall functioning. As an analogy, a pen is suitable for writing a signature and a paint sprayer is suitable for painting a house. Just as it is difficult for one tool to do both signatures and house-painting, it can be difficult or inefficient for one large LLM to be effective at multiple specialized functions.

Administrative independence: Each microservice can be trained and maintained independently of other microservices, e.g. at different times, or on different computing environments. However, additional training of the assembled microservice network is not precluded.

Sequential operation: Because microservices can interact at the application programming interface (API) level, the microservices can be efficiently run sequentially on a small computer system, rather than requiring multiple microservices to run concurrently. However, parallel operation is not precluded, e.g. to support pipeline operation with multiple clients or to reduce latency.

Ease of modification: Individual microservices can be attached, detached, updated, or fine-tuned without having to re-train a large LLM.

Ease of customization: Because individual microservices can be trained in hours (e.g. less than one day), or even less than one hour, rather than months, it can be feasible to develop customized copilots for diverse applications. Various types of customization can be performed. In varying examples, customization can be performed for knowledge domain, training datasets, accessible data repositories, cognitive functions, supported tasks, modes of client input, levels of client authorization, perspective on the knowledge domain, or alignment goals.

Safety—bias, toxicity, or hallucination: Small LLMs can be safer than large LLMs, e.g. less prone to bias and toxicity. Moreover, a microservice network architecture allows safety mechanisms, such as bias and toxicity filtering, to be incorporated at specific positions in the network architecture to mitigate such undesirable artifacts at, or immediately following, the point or points where these artifacts may be introduced. In this way, filtering can be applied in a manner analogous to a local anesthetic at the point(s) of greatest need. In contrast, competitive large LLMs can require artifacts to be monitored and corrected from the outside, akin to a general anesthetic, applied indiscriminately. Still further, addressing artifacts in a competing large LLM can involve retraining, which can counteract the primary training of the large LLM, adversely affecting its performance for its intended purpose.

Another artifact, hallucination, refers to generation of erroneous answers (sometimes passing off fiction as fact). This can be difficult to detect, let alone correct, in the black-box architecture of competing large LLMs. In contrast, some examples of the disclosed microservice architecture introduce a qualification microservice to detect whether a client input lies within the competency of the microservice network. Particularly, this can be invoked effectively after client input has been digested and the projection of the client input onto the available knowledge corpus is known, but before e.g. any core microservice has acted to produce a client output. In contrast, a competing large LLM can be constrained to examine (i) raw client input, whose relationship to a knowledge corpus may not be well known or (ii) client output, which by design reflects an underlying knowledge corpus, and from which competency cannot be readily ascertained.

The inventors have tested an embodiment (dubbed "Thia") of the disclosed technologies. A set of test inputs (combined documents and text queries) was formulated by subject-matter experts in the aerospace domain, and the inventors verified that the test inputs or essentially similar inputs were not included in any training data of the underlying models. The test inputs were provided to (i) a version of Thia that was embedded in a corporate data environment, and to (ii) a comparative large LLM (GPT-4) having access to documents from the same data environment. Human evaluators were used to provide blind ratings of the outputs of Thia and GPT-4 for each input, along with qualitative feedback on what characteristics of the higher-ranked and lower-ranked output led to the ranking. In these tests, human evaluators ranked Thia outputs higher than GPT-4 outputs in over 93% of the test cases. With two automated rating protocols, a Thia version achieved accuracy ratings of 4.9 and 4.72 on a scale of 5, while a GPT version GPT-4o achieved respective accuracy ratings 4.7 and 4.59. With either protocol, the inaccuracies (five minus the accuracy ratings) are significantly lower for Thia as compared to a comparative tool estimated to have over ten times the size and ten times the compute hardware of the tested Thia version.

3. Copilot Applications

Various terms have gained popularity for LLM-based tools providing assistive language interfaces, including "agent," "assistant," "chatbot," or "copilot." In the art, each of these terms has seen varying usage to refer to tools having widely disparate capabilities. In this disclosure, the term "copilot" is used broadly for a software tool providing knowledge-based assistance to a user in the furtherance of some task. Thus, the scope of the term copilot encompasses, without limitation, question-answering systems, generative tools (e.g. new text, audio, video, or art), interfaces to machinery, education delivery, language translation, or other tasks. Some copilots can support one or more of these applications. Additionally or alternatively, a copilot can support other applications.

In some examples, a copilot can provide a conversational interface and can use LLMs or other language models to support interaction with a client, interaction with data repositories, or for other specialized functions. Some copilots can interface with recording or communication equipment. Copilots can interpret a client's input, analyze data, unify multiple sources of information, make decisions, and provide context-aware output.

A copilot can be specialized for specific tasks, specific knowledge corpora, or specific cognitive functions. The copilot can be trained to perform those specific tasks, with those knowledge corpora, or with those cognitive functions.

Some copilots can provide read-only access to data, but this is not a requirement and, in other examples, a copilot can be used to modify, update, or delete data responsive to client input.

Copilots can be deployed by enterprises (e.g. for internal use, or for use by customers or other partner organizations), in vehicles (e.g. automobiles, aircraft, ships, submarines, or spacecraft), by individuals (e.g. trained for personal finance or household automation, or as online avatars), or in other roles (e.g. air traffic control, monitoring physical sensors or communication networks for security or surveillance).

A customized copilot can consolidate diverse databases or stores of knowledge within an organization, reducing the problems often encountered in having information available where and when needed. At the same time, examples of the disclosed technologies can honor security protocols and maintain, by design, restricted access to sensitive data.

4. Customization Background

There is considerable demand for bespoke LLMs, copilots, and similar ML tools. Prevalent large LLMs can be prone to artifacts, are insufficiently specialized for many niche applications, and can be computationally burdensome to train and operate. The computational burden can be prohibitive for many small-scale applications. In particular, a large LLM can require an extremely high level of effort to customize to a satisfactory level of specialized performance. Common small LLMs, on the other hand, are often unable to provide the level of performance offered by large LLMs. The present applicant has disclosed, in related recent patent applications, a microservice network architecture for a copilot, which can offer performance comparable to a large LLM, but with a much lower computational footprint. The components of the microservice network can be considerably smaller than common large LLMs, and are accordingly much easier to train, specialize, or customize. Customization of such a copilot is the subject of this disclosure.

5. Customization Use Case

The disclosure is presented for a particular use case, namely training a copilot to perform a particular job for an organization, which could be a job performed by an existing expert human, collectively by a department, or a synthesized collection of job functions not aligned with any specific person's responsibilities. As disclosed further herein, the job can be described in terms of objectives, which can become the objectives of a customized copilot, or tasks which the copilot is expected to perform. However, the disclosed techniques are not limited to such a use case, but can be applied to other copilot objectives or tasks.

The job adoption use case is of particular interest to many organizations faced with human capital issues. Despite decades of effort developing organizational processes, competence at various functions can often be dependent on one or a few key people, raising performance issues for the organization in the face of absences, departures, or work overload. A copilot trained to step in for a key person can mitigate such issues. Additionally, performance levels among staff can vary considerably for similar work, and organizations can seek to have an expert provide supplementary training to underperforming staff. But, oftentimes, one or a few experts may not have the capacity to provide training to all staff in need of training. A copilot trained to emulate the expert can easily be replicated to provide training independently to many staff members, even simultaneously.

6. Example Copilot Architecture

FIG. 1 is a block diagram illustrating an example copilot architecture. Copilot instances conforming to this architecture can be customized using disclosed technologies, but this is not a requirement and the disclosed technologies can be applied to a wide range of copilot architectures. The arrows in FIG. 1 show primary directions of data flow as a client input is processed, however signals in the opposite direction may also be present, e.g. for communication handshake, notifications, feedback, or other functions. Additionally, illustrated microservices can communicate along paths not explicitly shown in FIG. 1.

Initially, input can be received from a client at client interface 110. The input can be expanded at expansion microservice 171, following which pertinent documents or other data can be retrieved by retrieval microservice 172, e.g. from document repository 178 or data producer(s) 177 coupled to data source(s) 116. A combination of client input, expansion output, and retrieval output can be filtered by qualification microservice 173, e.g. to guard against content outside the copilot's domain of expertise. Qualified data can be inputted to core microservice(s) 174, and the output can be filtered by protection microservice 175, e.g. to detect or reject bias, toxicity, or confidential data. Then, filtered results can be evaluated by evaluation microservice 176 and, if satisfactory, some or all of the results can be returned to the client via client interface 110. Alternatively, evaluation microservice 176 can return processing flow to retrieval microservice 172 (this path not shown in FIG. 1) if evaluated results are inadequate and another pass through the illustrated flow is warranted.

Some copilot instances can support input modes other than text (sometimes, multimodal input), which can be directed from client interface 110 to intermodal microservice 184, for conversion of alternative input modes to text, which in turn can be filtered by protection microservice 185 en route to expansion microservice 171.

Also shown in FIG. 1 is evaluation microservice 186 which can monitor data retrieved by retrieval microservice, e.g. to gauge whether additional retrieval iterations may be required. This can be more computationally efficient than waiting till results reach evaluation microservice 176 to determine that more retrieval data is desirable.

Repository 178 can store a variety of documents extracted from a target corpus (810), including some data translated from database or other specialized data formats, and can also store policy and procedure guidance accessible to expansion microservice 171. This guidance can be used to determine prompts inferred by expansion microservice 171 or provided e.g. to retrieval microservice 172 or core microservice 174.

Additional details of the components of FIG. 1 are described further herein.

7. Customization Features and Advantages

The microservice architecture lends itself to agile customization of individual microservices. Customization can be tailored to the specific functions of each microservice to provide high levels of performance with low levels of computational burden or human effort.

Disclosed technologies blend expert-generated data, developer-generated data, and synthesized data. Initially, expert-generated data can provide a seed for training data, task descriptions, or relevant document records. However, the volume of data required for customization can strain the capabilities of the expert. Thus, at a second stage, a developer (who can be a human architect guiding the copilot customization) can generate additional training records or tasks, or can identify document records. The expert can be called on to validate developer-generated data. Validating data items can be considerably less burdensome than generating a similar volume of data items de novo. However, copilot performance can be improved with still more training data, tasks, or document records. As described herein, disclosed examples can leverage trained ML tools to synthesize additional training data, tasks, or document records. Synthesized items can also be validated by an expert. Such a blend can deliver high performance without undue burden on the expert. Advantageously, synthesized data can provide a broader ensemble of items for the customization tools to work with, avoiding a fixed mindset or tunnel vision that any given person might have. For example, an expert might find that a synthesized item is different from how they would have approached a task, but would work just fine.

Disclosed technologies rely on document records as an intermediary between tasks and a data corpus. The Applicant has found that mining a target corpus using tasks directly can lead to a very limited selection of data from the corpus. Document records can efficiently broaden the scope of data that can be retrieved, to aid with any given client input. In one aspect, document records can be analogous to query expansion, although invoked at customization time rather than inference time.

8. Customization for Generation of Training Data

Numerous applications of trained ML tools require training data based on knowledge elicited from humans. An early approach was to have skilled humans themselves author training data records, but such an approach can be laborious, and may not scale well as the number of ML tool applications increases or the size of the ML tools increases.

The disclosed technologies apply various approaches to introduce automation into generation of training data, improve quality of the training data, or improve performance of ML tools trained using the training data.

9. Automation for Interviews

In a first aspect, interviews can be used to elicit knowledge from skilled personnel. That is, a transcript or other representation of an interview can be used directly as a training record. This can be advantageous because the effort required from a skilled subject to engage in an interview can be orders of magnitude less than the effort required for the skilled person to create an equivalent number of training records: 10-30 times less, 30-100 times less, 100-1000 times less, or even less. Thus, for a fixed amount of effort from skilled personnel, interviews and automation for interviews allow amounts of training data or numbers of customized deployments to be scaled orders of magnitude higher than previously possible. Moreover, a skilled human or trained ML tool interviewer can ensure that an interview provides complete and uniform coverage of desired topics, which may not occur with a skilled person generating training records unsupervised. In effect, the interview can move the boundary between the skilled person and a trainee ML tool from formatted training data in the form of records, to unformatted training data in the form of an interview representation. This can substantially reduce the human effort required to produce a given amount of training data. In some instances, a trained human can author the interview representation directly, e.g. without the actual interview being conducted.

Second, additional training data (in the form of interview representations) can be synthesized by a suitably trained ML tool dubbed a "synthesizer." Representations of real or authored interviews can be used to train the synthesizer, which can then be prompted to generate substantially similar synthesized interview representations. An evaluator can review and offer feedback on the synthesized interview representations. The feedback can be used to create additional training records for the synthesizer, which can be applied e.g. in a reinforcement learning process or a supervised learning process. This can be advantageous because the effort required from a skilled interviewer to review synthesizer output can be 10-30 times less (or sometimes even less) than the effort required to sit through an actual interview. 1-5 cycles (or sometimes more) of reinforcement learning, with 3-30 training records (or sometimes more) at each cycle for any given topic, can be sufficient for the synthesizer to achieve a predetermined quality of synthesized interview representations. Moreover, once the synthesizer has reached its required proficiency, the synthesizer can create many synthesized interview representations with little or no further involvement from an evaluator. A practical limit on the number of synthesized interview representations, without repetition or near-repetition, can depend on a number of factors including the size of the synthesizer, volumes of training data used both prior to and during its specialized training as a synthesizer, and the quality of its training. Thus, although many trained ML tools described herein can advantageously be implemented as compact copilots, for some applications it can be advantageous to use a tool based on a large LLM (or, GPT-4o) as a synthesizer.

Thus, for a large proportion of training data records (e.g. interview representations), the boundary between a skilled person (in the role of an evaluator) and an ML tool can be further moved: from an interview, to reviews of synthesized candidate interviews. This can result in substantially more training data output for a given amount of human effort. Still further, human evaluators can themselves be complemented with suitably trained ML tools.

Third, an evaluator can partner with an interviewer to improve the quality of interview(s) conducted by the interviewer. That is, the evaluator can monitor an interview conducted by the interviewer and offer feedback or suggestions, during the interview or after. The feedback or suggestions can expand the scope of subject matter covered in an interview, and can ensure completeness of covered subject matter. Having good quality training data, in the form of complete coverage in an interview, can reduce the number of interviews required to achieve a given performance in a trained ML tool. Typical improvement can be in the range 3-10. In some instances, a human evaluator can oversee a trained ML tool interviewer while, in other instances, a trained ML tool evaluator can oversee a human interviewer and, in further instances, both evaluator and interviewer can be trained ML tools.

Fourth, annotations can be incorporated into interview representations. Some annotations can aid a trainee ML tool in learning data organization of knowledge elicited from a subject. Other annotations can subdivide an interview representation according to topic, and different ML tools can be specialized to respective topics. Further annotations can provide an evaluator's comments on subjects' responses or on interviewers' prompts during the interview. Annotations can be prepared by human annotators or suitably trained ML tools, in any combination.

10. Automation for Workflow Emulation from Recorded Work Sessions

Further aspects of the disclosed technologies are directed to recorded sessions of experts (e.g. skilled personnel, trained ML tools, or equipment) performing workflows. These aspects operate on a watch-and-learn paradigm and can bypass interviews completely, or can be used in conjunction with interviews. Disclosed technologies using recorded work sessions can often reduce efforts required from skilled personnel or domain experts by a factor of 10-30, or even more, over comparative techniques and, in some scenarios, can be superior to techniques utilizing interview representations. In many fields, recordings of work sessions are widely available. Disclosed technologies enable these recordings to be efficiently used to train ML tools.

In a fifth aspect, workflow maps can be used train ML tools (dubbed "emulators") to emulate workflows. An emulator of a given workflow can be trained to predict what an expert would do in each situation encountered in the given workflow. In varying examples, workflow maps can be used by themselves as training data in one or more training phase, or can be used in conjunction with other training data.

Sixth, an extractor ML tool can be trained to extract workflow maps from recorded sessions of experts performing workflows.

Because small ML tools require less computing resources than large ML tools, and can be trained more quickly with less training data, it can also be advantageous to divide a complex set of activities into smaller workflows. Thus, seventh, an extractor or emulator ML tool can be trained specifically for one or a group of the smaller workflows. The extractor or emulator ML tool can be trained using focused segments of the recorded sessions, particular to the relevant workflow(s). Different ML tools can be trained to emulate different respective workflows.

11. Division of Complex Activities into Smaller Workflows

Division of complex activities into smaller workflows can be further aided by automating support for segmenting, distribution, and merging.

Eighth, segmentation can also be performed by an ML tool trained to predict how an annotator would demarcate a recorded session among workflows or topics. The demarcated segments can be used to train specialized extractor ML tools.

Ninth, distribution of workflows can also be performed by an ML tool trained to predict an evaluator's identification of requested workflows from client input. This tool can route identified workflows to corresponding specialized emulators.

Tenth, individual workflow maps can be merged into a composite data structure. A variety of techniques can support merger of workflow maps, and traversal of maps and data structures.

Eleventh, the partitioning of complex activities into smaller workflows can be implemented in a microservice network architecture used by disclosed copilots. For either workflow map generation or workflow emulation, specialized task microservices can support respective workflows, and other microservices can support distribution of recordings or instructions among the task microservices, or aggregation of outputs from the various task microservices as needed.

These and other techniques disclosed herein can be used singly or in any combination to incorporate automation and reduce the human effort required to produce a given volume of trained ML tools to a desired performance requirement.

Terminology

To facilitate review of the various embodiments, explanations of the following terms are provided. Occasionally, and where clear from the context, a term may also be used in a different meaning. Throughout this disclosure, including claims, suffix "(s)" is used as shorthand to denote "one or more" of a given item. To illustrate, "apple(s)" can be shorthand for "one or more apples."

In the context of an interview representation, an "annotation" refers to auxiliary data, going beyond the dialog itself or its style of delivery, which can be inferred from the interview by an evaluator termed an "annotator." Examples of annotation include workflow maps, commentary (e.g. "incomplete," "contradictory," "incorrect," or "out of scope"), or allocation of interview portions among respective topics. In the context of a recorded session, an "annotation" refers to auxiliary data, going beyond transcription of dialog, which can be inferred from the recorded session by an evaluator termed an "annotator." Some annotations can be generated "live," during an interview or recorded work session. Examples of annotation include workflow maps or allocation of session segments among respective workflows or topics. An annotation demarcating media (e.g. an interview or session) among one or more portions (dubbed "segments") can provide timestamps or other indexes defining endpoints (e.g. a beginning and an end) of each segment in the media, or can provide media clipped to such endpoints, with respective segments being extracted as separate data objects. In the latter case, the endpoints of a segment are the beginning and the end of that segment. As described herein, segments can overlap, one segment can contain more than one workflow, one workflow can be distributed among one or more segments, or some portions of the media can remain unallocated to any segment or workflow.

An "attention mechanism" generates an output with weighted contributions from input tokens according to one or more keys. A key vector $K_i$ that closely matches a sequence of input tokens can result in a high weight $w_i$, while a poor match can result in a low weight. The weight $w_i$ for each key vector $K_i$ can be applied to a respective value vector $V_i$, and summed to obtain an output vector $O = \Sigma w_i \cdot V_i$.

In the context of interview recordings or representations, "audio" refers to a mode in which interview communications are stored or recorded as sound, albeit often in digital form. Thus, audio of two different speakers can differ even when the words spoken are exactly the same. Similarly, "video" refers to a mode in which interviews are stored or recoded as moving visual images. While video recordings can include one or more audio channels, this is not a requirement. Other videos can be silent, or can include captions of verbal communication.

"Chain-of-thought reasoning" is a style of problem solving in which a solution is derived in smaller steps which can form a directed graph dubbed a "chain." Some ML tools can be trained to learn and perform chain-of-thought reasoning when solutions to an input are not amenable to direct resolution (e.g. in a single step). In varying examples, chain-of-thought reasoning can proceed forward from what is known toward what is required; backward from what is required toward what is known; or a combination thereof. Chain-of-thought reasoning can involve trial and error, as not candidate small steps may help in completing the required chain. Moreover a chain, once found, may not be unique and may not be optimum relative to other possible chains. An ML tool can be trained to generate and output reasoning (e.g. logic or basis) for each of multiple steps in the chain, prior to or accompanying a final result. Chain-of-thought reasoning can capture a linear reasoning sequence, and can be considered as an example of tree reasoning or graphical reasoning. "Tree reasoning" can follow a reasoning path along a tree, with a problem input being a root node of the tree, a problem solution at an intermediate or leaf node of the tree, with the reasoning path able to backtrack from a first reasoning branch of the tree to explore a different branch. In some examples, parallel processing can be used to follow multiple branches concurrently. Tree reasoning in turn can be considered an example of graphical reasoning. Like tree reasoning, "graphical reasoning" can return to a previously visited node however, unlike tree reasoning, graphical reasoning can follow a cyclic path (e.g. a loop) to do so. Graphical reasoning can also support splitting a problem over multiple branches and merging respective results, which can be applied to verify results on one branch by another branch. A reasoning path followed in graphical reasoning or any of its specializations is termed a "trajectory." For certain problems, graphical reasoning can outperform tree reasoning which in turn can outperform chain-of-thought reasoning. For example, more general forms of graphical reasoning can sometimes solve harder problems which more specialized forms cannot, or can reach solutions more quickly or with less usage of computing resources.

A "client" is a hardware or software computing entity that uses a resource provided by another hardware or software computing entity such as a copilot. A "client interface" is a software component within a copilot which receives input from or provides output to a client. Disclosed copilots can support one or more client interfaces. Often, client output is provided to a same client from which client input was received, but this is not a requirement. Some copilots can be used to mediate interactions between two distinct clients: language translation between two clients is just one example. Examples of the disclosed technologies can support additional client interfaces for management functions, including e.g. monitoring, human evaluation, human feedback, fine-tuning, annotation, supplemental training, updates, or other control.

A "copilot" is a software tool providing knowledge-based assistance to a user in the furtherance of some task. Some disclosed copilots can be implemented as a "microservice network," which is a collection of microservices connected in a directed graph. In response to a client input, data can be processed and transmitted among the microservices, until an output is returned. While responses to client input often result in output to a client, this is not a requirement. In some examples, a client input can result in internal updates e.g. to parameters of an ML tool, to copilot configuration, or to an internal database. A path through the microservice network along which data propagates in response to the client input is dubbed a "flow." The process of coupling microservices to form the copilot is dubbed "assembly." In examples, the coupled microservices can be customized, before or after assembly, resulting in a copilot customized for a particular application. A "deployed" copilot can be used for inference, developing and returning outputs in response to fresh (not previously seen) client inputs. However, a deployed copilot can also be subject to occasional incremental training. In some examples, the deployed copilot can be a snapshot of a master version. As the master version is incrementally trained, a new snapshot can replace the previous snapshot. Update of the deployed copilot can be performed by taking the copilot offline during a maintenance interval. Alternatively, a hot swap can be performed. After training, assembly, or update, one or more copies of a given copilot can be generated, deployed, or further customized. Each of these copies of the given copilot is termed a "copilot instance."

A "copilot objective" is a desired capability of a customized copilot. In some examples, copilot objectives can be described in terms of tasks or functions at which the copilot should have proficiency.

Within a copilot, a "core microservice" is a microservice whose function is to receive input and provide corresponding output which is of interest to a user at a client. The intended audience of output from a core microservice is the user or client, whereas the intended audience for other microservices can be components within the copilot, e.g. further microservices such as a retrieval microservice or a core microservice. The user or client focus of a core microservice does not preclude (i) iterative invocation of one or more core microservices or (ii) routing of a core microservice's output through other microservices such as qualification or evaluation microservices. Moreover, invocation of these other microservices can, in some instances, lead to all or part of the core microservice's output being discarded or otherwise failing to reach an intended destination. In some examples, an ensemble of core microservices can cooperate.

A "corpus" is a collection of documents which contain knowledge of one or more domains. A "general corpus" is a corpus which illustrates use of a language but is not specific to any given target deployment. Non-limiting examples of generic corpora include: an encyclopedia, a library, or an archive of one or more publications. A "target-specific corpus" (or simply "target corpus") is a corpus which contains knowledge specific to a knowledge domain in which a copilot is, or is desired to be, proficient. Non-limiting examples of target-specific corpora include: interview representations (with optional annotation); a corporate database; textbooks, publications, or other literature in the target domain; or proprietary documents (e.g. manuals, presentations, training materials). Intermediate between general and target corpora, some deployments can utilize industry-specific or occupation-specific corpora, which contain knowledge common to a class of targets but can exclude e.g. proprietary or sensitive data.

A "CPU" (or, central processing unit) is a general-purpose computer processor, which can have one or more processor cores. The term CPU encompasses complex instruction set computer (CISC), reduced instruction set computer (RISC), specialized processors in the form of application-specific integrated circuits (ASIC), or embodiments in field-programmable gate arrays (FPGA). The term "GPU" (or, graphical processing unit) is used herein to encompass any accelerator or coprocessor, often providing parallel processing capability. A GPU is not limited to chips or coprocessors marketed as graphical processors. CPUs, GPUs, nodes, clusters, or other computing resources described herein can variously be implemented as stand-alone laptop, desktop, or workstation computers at a customer or client premises; at a data center; or in the cloud. The term "processor" encompasses CPUs and GPUs.

The unqualified term "data" refers to any digital representation of information.

A "database" is an organized collection of data maintained on computer-readable media and accessible by execution of instructions at one or more processors. Databases can be relational, in-memory or on disk, hierarchical or non-hierarchical, or any other type of database. Some databases support SQL as an API and are termed "SQL databases." Numerous other database APIs are known in the art and can be supported by disclosed technologies, including some known as "noSQL databases." Email and messaging applications can have specialized databases termed herein as an "email repository" or a "messaging repository" respectively. The database for a learning management application is termed a "learning management store." Some databases can store training corpora.

A "data producer" microservice can provide data from one or more associated data stores such as databases, repositories, or libraries. In examples, data producers can be invoked from a retrieval microservice and can transform data representations (e.g. data mode, syntax, or for matching with API) between a calling microservice and the associated data store, in either direction.

A "data repository" (or "repository") is a collection of data objects maintained on computer-readable media and accessible by execution of instructions at one or more processors. In some instances data objects in a repository can be of a common type or associated with a common software application and the repository can take on a corresponding name, such as "document repository," "email repository," or "messaging repository." Some repositories can be static, or infrequently updated, while others can be frequently updated, or even live. In a copilot, some repositories (e.g. where data transformation is required) can be accessed through a data producer microservice, while other repositories (e.g. static repositories or repositories of text documents) can be accessed directly from a retrieval microservice.

A "data source" is a data object or collection of data objects. Thus some data sources can be a database or other data store, e.g. available for access through a data producer or elsewhere in a copilot, while other exemplary data sources can be single documents, document records, database tables, database records, document records, or annotations. In some examples, data sources can be identified, validated, or selected based on relevance to an instant topic. An identified data source is termed a "candidate data source" prior to validation or selection.

A "data structure" is an organized collection fields for storing respective values, although some or all fields may not have any value defined. A "composite" data structure is an aggregate of two or more previously existing data structures such as workflow maps. Data structures can be implemented as directed or undirected graphs, tables, vectors, multi-dimensional arrays, or as other collections of fields each having a respective datatype or structure. A data structure can be hierarchical.

In the context of ML tools or copilots, the term "deploy" refers to usage of a trained ML tool for a practical application, such as conducting an interview or emulating a skilled person's workflow. Although a deployed tool can be expected to have been trained, deployment of the tool does not preclude additional training, for example by reinforcement learning, fine-tuning, or some other update to the tool.

A "document record" can be a document, portion thereof, or other data object addressing a topic. Some document records of interest describe a communication, and can be a transcript of that communication. The communication can be one-way, e.g. a presentation having a document record in the form of slides or transcript, two-way, e.g. a phone call having a document record in the form of notes or transcript, or multi-way e.g. a meeting or email discussion having a document record in the form of an email thread or a transcript. Other document records can be reports or other documents, including complete documents. Of interest in some disclosed examples are document records that are pertinent to a given task, which means that a subject addressed by the document record matches or overlaps with a topic in the task. Also of interest herein are data sources supporting a document record, which means that the data source provides information about topics in the document record. In some examples, the document record can describe a parameter or pose a question, and the supporting data source can provide a value for that parameter or an answer to the question. This support relationship applies whether or not the document record itself includes the parameter value or answer. Some document records can be email conversations. An "email conversation" is a sequence of electronic mail messages among two or more parties having respective electronic mail addresses, each message after the first being responsive to one or more preceding messages of the sequence. Some document records can be presentations or transcripts thereof. A "presentation" is a broadcast communication from one or more presenters to an audience of one or more people or software agents (e.g. evaluators, annotators, or trainee ML tools). Presentations are generally one-way communications from presenters to audience, but a subsequent question-answer session is not precluded. Other document records can be interview scripts or workflow maps.

A "document repository" is a collection of documents stored in computer-readable form. Insofar as a copilot is concerned with a knowledge domain, a document can contain information relevant to this knowledge domain. The information can be expressed in a language, which in some examples can be a language of human verbal communication, such as English or Esperanto, but this is not a requirement. In other examples, the language can be a visual language, such as art, graphics, or a sign language; or a computer programming language. A document can be an entire source document, such as an operating manual or a meeting transcript, or a chunk of such an application. In some examples, chunks of size 10-10,000 words, or 100-1, 000 words, can be commonly used.

Within a copilot, an "evaluation microservice" is a microservice coupled to receive output from a source microservice directed toward one or more destination microservices, and perform evaluation on that output. In varying examples, the evaluation microservice can determine whether the received output meets a predetermined condition, can determine whether to discard or forward all or parts of the received output, can increment statistics or performance metrics based on the received output, can issue notifications, or can make routing, dataflow, or other decisions for controlling the handling of an instant client input.

Within a copilot, an "expansion microservice" is a microservice whose function is to receive tokens of client input and provide additional related tokens. With these additional tokens, a retrieval microservice can gather additional documents. With the additional tokens or the additional documents, a core microservice can generate additional or improved responses. An expansion microservice can be implemented using a trained ML tool, such as an LLM, LMM, or DNN.

The term "expert," as a noun, refers to a human or a software tool able to provide responses deemed correct by another, independent, expert, for at least a predetermined percentage of test questions. The predetermined percentage can be in a range 50-99.9%, in some examples greater than or equal to 90%.

"Feedback" provided in response to (actual) output from an ML tool, microservice, or copilot can range from a binary token (e.g. "good" or "bad") to proposal of a better output. In some cases, the feedback can indicate a "deficiency" in the actual output (e.g. the output is incomplete, or some portion of the output is incorrect), which identifies an aspect of the output which resulted in the output being judged unsatisfactory. In further cases, the feedback can provide an "explanation" of the deficiency (e.g. this part of the input is not addressed, reasoning was not provided, or the output failed to take document D into account), which supports the deficiency finding. Still further, feedback can sometimes provide an alternative to the actual output that would have been rated higher, or judged correct, by a human or trained ML tool providing the feedback.

"Filtering" refers to an act of testing some data against a condition ("filter condition") and separating, or separately handling, the tested data according to whether the condition is met. Data meeting the condition can be designated as "conforming."

A "flowchart" is a step-by-step representation of a procedure as a directed graph. Each step of the procedure is represented as a vertex of the graph, and the procedure flows from step to step along edges of the graph. A flowchart can include branches or loops. Some flowcharts can include two or more disconnected components. A workflow map can be a graph having two or more components, any of which can be a flowchart; these components can be joined by directed edges or undirected edges, or can be disconnected.

A "function" of a copilot or ML tool is a defined relationship between an input (or class of inputs) and a corresponding desired output (or class of desired outputs).

A "graph" is a set of two or more vertices and a set of one or more edges joining respective pairs of the vertices. Examples of the disclosed technologies can be implemented as a network of microservices which can be represented as a graph, with each microservice being a vertex of the graph, and directed edges indicating that a destination microservice can be invoked from a source microservice. A graph in which a path exists between every pair of vertices is a "connected graph." A graph having directed edges is a "directed graph." A directed graph is "weakly connected" if the underlying undirected graph (e.g. with all directed edges replaced with undirected edges between the same pair of vertices) is connected. To illustrate, a directed graph A→B←C is weakly connected because its underlying undirected graph A-B-C is connected. A weakly connected network of microservices means that the microservices can work together rather than in isolation.

The terms "input" and "output" are respectively used to denote data provided to a copilot (e.g. from a client) or microservice, or data provided by a copilot (e.g. to a client) or microservice. Input can be in the form of one or more questions, instructions, task descriptions, language tokens, interview scripts, recorded sessions, or data in non-text modes (e.g. audio or images). Output can be in the form of one or more answers, acknowledgments, notifications, annotations, results, including language tokens or data in other modes, or other data objects. Output from one microservice can be provided as input to another microservice. Thus, output can take any of the forms of an input, or vice versa. The terms input and output are applicable during both training and operation of an ML tool. Accordingly, "input" can sometimes refer to training data.

The term "integrate" refers to joining two or more entities into a whole. Example of integration include insertion of a data object into a database or other repository, coupling a data store with a data producer microservice, assembly of microservices into a copilot, or compilation of workflow maps into a composite data structure.

An "interview" is an exchange of communication between one or more "interviewers" directing the course of the interview ("conducting" the interview) and one more "subjects" responding to the interviewers. An interview can include dialog (in a human language, in oral or text form, in any combination), and can optionally include auxiliary material such as visual aids. Communications from an interviewer to a subject are dubbed "prompts" and communications from the subject(s) to the interviewer(s) are dubbed "responses." A "representation" of an interview is a script or recording of the interview, optionally with annotation(s). The representation of the interview preserves content of the interview, and can be used and re-used, e.g. for training an ML tool. Notably, an interview representation can exist without the interview itself having taken place. To illustrate, an interview representation can be authored by a human writer or can be synthesized by a trained ML tool. An interview can be monitored and evaluated, e.g. by an evaluator, either during the interview or offline, with or without knowledge of the subject(s) or even the interviewer(s). An evaluator and an interviewer can be partners, and the evaluator can offer "feedback" (e.g. a judgement such as "good" "bad" or "off-topic") or "suggestions" (e.g. "please ask X," "what about Y," or "please probe deeper") based on the interview. The feedback or suggestions can be provided to the partner interviewer(s) or to a third party, or can be used to create additional training data, e.g. for reinforcement learning. In the context of interviews, "partners" refers to two or more actors working together to conduct the interviews, and a "partner" is any one of these actors. Partners can be humans or trained ML tools in any combination. Partners can have same or different roles, such as interviewer or evaluator, in any combination. An evaluator partner can provide feedback or suggestions during or after an interview.

With regard to a procedure performed repeatedly, an "iteration" is one execution of that procedure. The iterated procedure can include invocation of a particular microservice. Commonly, an invocation of an iterated procedure starts with an "initial iteration" and ends with a "final iteration." The designation "initial" does not preclude execution of the procedure prior to the initial iteration in a distinct invocation of the procedure, and similarly there can be other invocations of the procedure after the final iteration of a given invocation. Repetitions of the procedure need not be identical. Commonly, values of parameters can vary from one iteration to the next and, consequently, branches and control flow can also vary. Particularly, a final iteration can exit out of an iterative loop without executing all instructions of the procedure. The iterated procedure can be associated with a "stopping condition:" a determination that the stopping condition is met results in no more iterations being performed.

A "job" is a function or collection of functions which a person (or, in some cases a trained ML tool) is expected to perform. Such persons can often be employees of an organization, but this is not a requirement, and other jobs can be business owners, self-employed people, or volunteers. A "job description" can be a listing of the function(s) of a job, and can optionally include task description(s) of respective functions. A job can be related to an occupation, but there may not be a one-to-one correspondence. For example, two people can have the occupation "doctor" but can perform substantially different jobs. Conversely, a given job can have elements of multiple occupations, such as "engineer," "technical writer," and "manager."

The term "knowledge domain" refers to one or more subject areas of interest in a copilot deployment. The subject areas can be related to each other (e.g. engines and fuels), but this is not a requirement. In some examples, two disparate subject areas can be of interest to users of a copilot and can both be included in the copilot's knowledge domain. Knowledge or data of the knowledge domain can be graphically represented, e.g. as a "knowledge graph" or in a multi-dimensional space in which vector representations of knowledge tokens are defined. A collection of points in the multi-dimensional space can define a volume in some or all of the dimensions of the space. Such a volume of a knowledge domain can approximate a copilot's competency. At least due to limitations of finite corpora available for training or RAG, a copilot may not have perfect knowledge within this volume. Knowledge, e.g. in a training corpus, can have varying breadth ("scope") and depth. In examples, a domain of knowledge presented as training data to a trainee ML tool can become progressively more specialized ("narrower" scope) and more detailed over a series of training phases. To illustrate, a general language corpus can have broad scope but shallow depth. Thus, an ML tool trained on the general corpus may recognize the term "doctor" but may remain ignorant about a doctor's job functions. An occupation training corpus can have intermediate breadth and depth, providing a trained ML tool with knowledge of job functions common among various types of doctors, but without knowledge of a particular specialist in a particular organization, also without additional knowledge of most other occupations. A target-specific corpus can have narrow scope with much detail about practice habits of doctors of a given specialty employed within a particular organization.

A "large language model" ("LLM") is an implementation of a machine-learning technique incorporating an attention mechanism. The term language is a reflection of usage in the art; it does not imply any specific size, and is not a term of degree. Thus, while many LLMs include billions or even over a trillion trained parameters, but this is not a requirement. Some LLMs disclosed herein can be implemented in a size of about 500 million parameters, or even smaller. Thus, it can be useful to describe "small LLMs" under 20 billion parameters (which can be run on one GPU; often having 100 million to 20 billion parameters), "large LLMs" with over 160 billion parameters (which can be run on a multi-node cluster), and "mid-sized" LLMs from 20-160 billion parameters (which can be run on a single node). While LLMs are often implemented as transformer neural networks, this is not a requirement, and other machine-learning techniques can also be used.

A "large multimodal model" ("LMM") is a variation of an LLM configured to accept non-text input, e.g. audio or images, instead of or in addition to text. Descriptions of LLMs herein encompass LMMs. LMMs are well-suited to accommodate audio or video data in recorded work sessions, or some workflow maps.

A "library" is a collection of objects. Non-limiting examples of the objects include documents, document records, API queries, database records, messages, workflow maps, interview scripts, recorded sessions, or annotations. Often, the objects in a library are of a same type.

As a noun, a "link" is a one-way or bidirectional connection between two software entities, either of which can be code or data. As a verb, "link" refers to forming such a connection. In some examples, a data producer microservice can be linked to a data source such as a database. Links can also be implemented between portions of one or more workflow maps.

"Live data" refers to data, accessible to a copilot (for example through a data producer microservice), which is updated independently of the copilot operation. For example, a data producer can have access to an email repository or messaging repository which automatically updates as emails or messages are sent or received. Similarly, staff of an organization can update the organization's databases as part of normal work, and these live databases can be available to a copilot. In contrast to live data, some conventional tools can take periodic snapshots of a live database, and import these snapshots into a copilot environment—such snapshots are not live data. Access to live data allows a copilot to seamlessly provide up-to-date responses to client inputs.

"Machine learning" (or "ML") denotes a technique for improving performance of a software tool through experience (dubbed "training") without additional improvement to (captive) procedural logic of the software tool. An "ML tool" is a software program trained by an ML technique. A neural network is an example of a software tool that can be trained by machine learning. A trained machine learning tool can include trained parameters, logic dubbed "captive procedural logic" to perform calculations on input data using the trained parameters to obtain output data, and supervisory program code (dubbed "auxiliary procedural logic") to manage input and output interfaces, activate the calculations, update trained parameters, collect or provide diagnostic information, or perform other tasks. A "parameter" is an atomic data item (such as a weight applied to a given input to a given cell of a neural network) within an ML tool. Parameter values can be established by training, to obtained desired behavior. The behavior of a trained ML tool can variously be governed by: its trained parameters, its configuration (e.g. in a microservice network) and associated resources (e.g. data producers or associated data stores). A "configuration" of an ML tool can include a graph or environment in which the ML tool operates (e.g. for training, testing, or inference), as well as variables (other than trainable parameters) controlling the ML tool itself or its interfaces with its environment. Copilots, LLMs, LMMs, or neural networks can be ML tools.

"Merge" refers to an act of combining data from two or more data objects ("constituents") into a single composite data object. The composite object can be a union of its constituents, but this is not a requirement. In other examples, identical data items in two constituent data objects can both be retained in the composite object, or some constituent data items can be omitted from the composite object.

A "microservice" is a software implementation of a specific function operating in conjunction with other microservices performing respective functions.

"Mode" refers to a type of data encountered as input or output. Common modes in disclosed copilots include text (including language tokens), speech, other audio, images, multimedia. Other modes can include software source code, documents in various formats, database tables, symbol sequences (e.g. for a communication protocol), or various metadata. Internally, a copilot can also support additional modes for communication between microservices, e.g. for task descriptors or signaling. "Multimodal" refers to a software module supporting two or modes of data. In varying examples, a multimodal module can receive input in one mode and provide output in a distinct mode; or can receive inputs in two distinct modes; or can generate outputs in two distinct modes. An "intermodal" microservice supports an input in one mode leading to output in a different mode, e.g. non-text to text, or text to non-text.

As a verb, "monitor" refers to an act of observing an interview, a recorded work session, or a deployed ML tool or copilot. As a noun, a "monitor" is the observer, and can be a human or a trained ML tool. In varying examples, monitors can provide feedback or suggestion to an interviewer (e.g. as a partner of the interviewer), can provide other evaluation (e.g. for RLHF or other update of a monitored ML tool or copilot), or can perform annotation.

A "neural network" is an artificial network of "units" (or "cells") that has linkages modeled on behavior of biological neurons and that can be implemented by a software program on a computer. A neural network is an example of a machine learning tool. Some neural networks described herein can be "transformer neural networks" (or simply "transformers") which have couplings between cells independent of the spacing between the cells. Transformer neural networks variously use stages labeled "encoder" or "decoder." Both encoders and decoder stages incorporate an attention mechanism for coupling tokens with each other. Attention in a decoder can be restricted such that generation of a given token can only use (attend to) preceding tokens. In an encoder, generation of a given token can attend to both preceding and following tokens. Empirically, encoders are found to perform well in classification tasks, e.g. by learning word embeddings. Decoders are found to perform well in text generation, e.g. in answering questions. Some LLMs of interest herein combine encoder and decoder stages. An "encoder-decoder transformer neural network" includes one or more (often three to twenty) encoder stages followed by one or more (often three to twenty) decoder stages. Some neural networks described herein can be deep neural networks ("DNN"s) having multiple layers of cells between an input layer and an output layer. Alternatives to LLMs include structured state space models (SSM), and related recurrent neural networks (RNN, a form of DNN; some RNNs can be implemented with transformers) and convolutional neural networks (CNN). State space models implement intermediary latent spaces to maintain state, and can offer similar benefits as attention mechanism in LLMs. For example, such models can be used to implement an expansion microservice or a core microservice. RNNs, decision trees, random forests, or long short-term memory (LSTM) are further examples of trained ML tools which can be used to implement e.g. portions of a core microservice or an evaluation microservice. An "LSTM" is a recurrent neural network configured to store data in its cells with trainable retention periods.

An "occupation" is a generalization of a class of tasks. Illustratively, an occupation can be similar to a human occupation (e.g. engineer, analyst, journalist), but the term is not so limited. Notably, multiple customized copilot deployments can have similar objectives or tasks, and ML tools for such copilots can be customized from occupation-trained tools more efficiently than from more broadly trained tools.

"Performance" refers to a quantitative or qualitative assessment of how well a software program (such as a trained ML tool, microservice, or copilot) performs one or more of its intended functions. To illustrate, a quantitative performance metric can be a score indicating what fraction of test inputs yield output from the software program that is rated satisfactory by an evaluator. Qualitative performance measures can include e.g. "unsatisfactory" or "improved." A value of the performance is dubbed a "performance level." A "performance criterion" is a specified relationship between the performance and a predetermined performance level.

In the context of training ML tools or copilots, a "prediction task" refers to the ML tool or copilot being directed to continue an incomplete portion of training data. To illustrate, the ML tool or copilot can be provided some interview dialog and directed to provide a next piece of the dialog, which can be a next prompt, next word, next sentence, or another unit of the dialog.

"Procedural logic" refers to logic operations which can be specified by instructions in a programming language (which can be machine opcodes, assembly instructions, or a high-level programming language, including a hardware description language such as VHDL) and is distinct from data on which those instructions operate. Procedural logic can also be implemented in hardware (e.g. specified by VHDL) by gates coupled to perform operations similar to those of software instructions. Machine learning tools can incorporate captive procedural logic to process inputs into outputs, and auxiliary procedural logic for auxiliary tasks. Captive or auxiliary procedural logic are particular examples of procedural logic. Procedural logic that is not part of an LLM or other machine learning tool (e.g. other than captive or auxiliary procedural logic) is sometimes referred to as "freestanding procedural logic" herein.

In the context of an interview, "prompt," as a noun, is a communication from interviewer(s) to subject(s). As a verb, "prompt" refers to providing such a communication. While prompts are commonly speech or text in a human language, they can also include other modes such as e.g. a visual aid or another sensory input. A prompt can include one or more communications by one or more interviewers. In the context of an interview, a reply to a prompt is dubbed a "response," and can include one or more communications by one or more subjects. Thus, a contiguous sequence of prompts (with no intervening response) can be regarded as a single prompt, and a contiguous sequence of responses (with no intervening prompt) can be regarded as a single response.

In the context of an operating ML tool such as a copilot, "prompt," as a noun, is an instruction accompanying an input to a copilot, microservice, or other ML tool which specifies what the ML tool is to do with that input. For example, prompts such as "find all occurrences of" or "find synonyms for" can accompany an input string. Some prompts can include e.g. audio, images, video, diagrams, or other data modes. As a verb, "prompt" refers to providing the input or accompanying instruction.

Figure 2A:
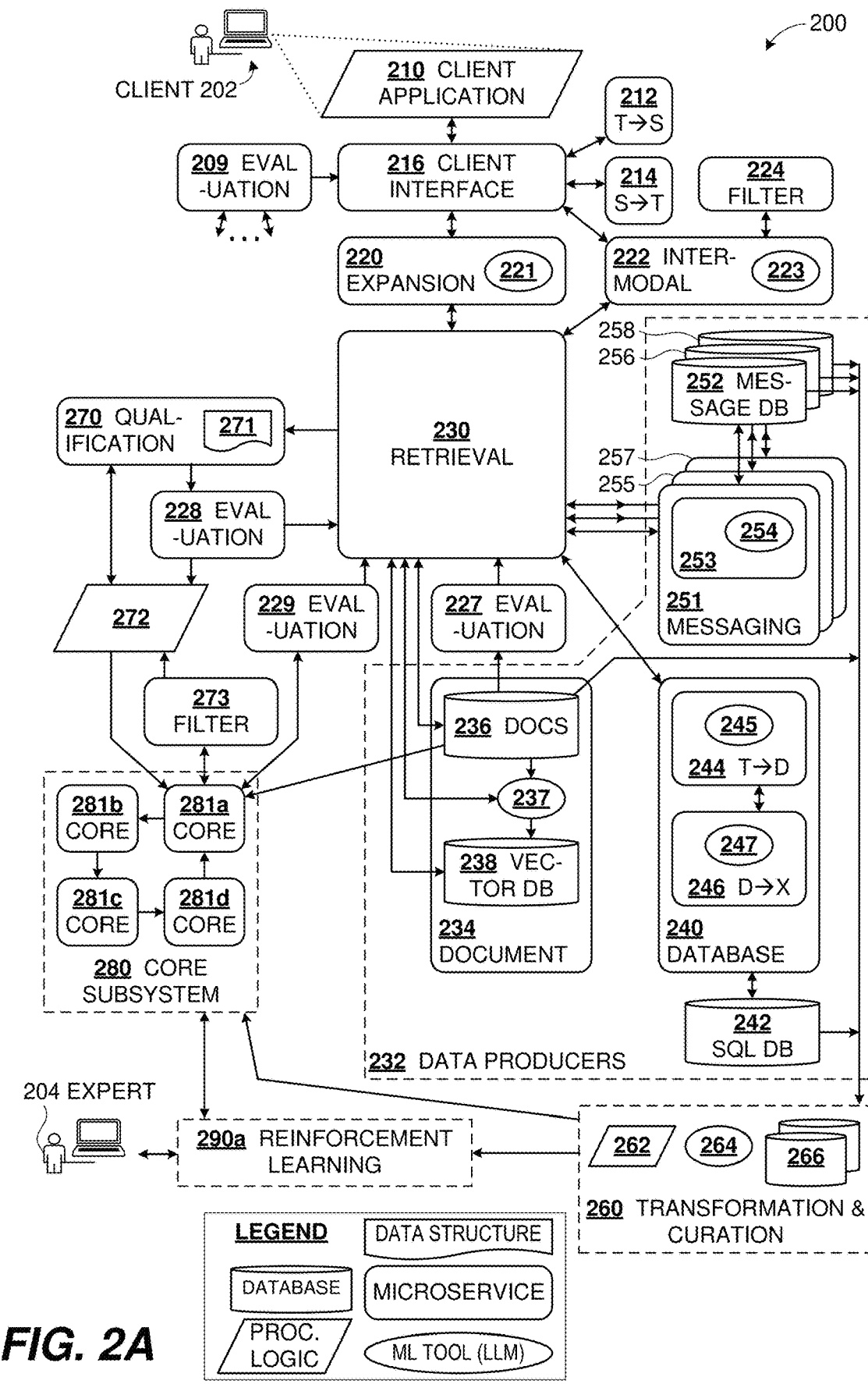
FIGS. 2A-2C together constitute a schematic diagram of an example architecture of a copilot according to the disclosed technologies.

A "protection microservice" can provide various forms of protection as described in context of FIGS. 1, 2A, or elsewhere herein, including without limitation: bias and toxicity filtering, attack detection, out-of-domain detection, or protection against leakage of confidential information.

A "qualification microservice" can determine whether inputs directed to another microservice are within competencies of that microservice or an encompassing copilot.

The term "receive" refers to an act of getting information at a microservice or other software component from another microservice, software module, or client. Similarly, the term "transmit" refers to an act of conveying information from a microservice or other software component to another microservice, software module, or client. In varying examples, receiving or transmitting can be performed by communication over a bus or network, by message passing (including parameter passing between microservices, e.g. on a call stack), by use of a shared memory location, or by another technique.

"Reinforcement learning" is a training technique in which an ML tool is provided candidate output along with an indication (e.g. provided by an evaluator) whether that candidate output is desirable or undesirable and, optionally, one or more reasons why the candidate output is so regarded.

Within a copilot, a "retrieval microservice" is a microservice whose function is to receive input and provide, as output, documents or other data relevant to that input. The intended audience of output from a retrieval microservice is a core microservice. This core microservice focus does not preclude (i) iterative invocation of the retrieval microservice or (ii) routing of a retrieval microservice's output through other microservices such as qualification or evaluation microservices en route to a core microservice. Moreover, invocation of these other microservices can, in some instances, lead to all or part of the retrieval microservice's output being discarded or otherwise failing to reach a core microservice.

In the context of interviews, a "script" is a text representation of communications during the interview. In some examples, the script can be a bare record of the dialog, e.g. what the interviewer said and what the subject responded. In other examples, a script can include additional commentary qualifying the dialog, e.g. "[long pause]", "[interrupting]", or "[words not clear]". Some scripts can be transcripts of actual interviews, while other scripts can be authored by a human writer or synthesized by a trained ML tool. As verbs, both "author" and "synthesize" denote creative acts based on assimilated knowledge rather than on any specific interview or document.

"Skilled personnel" refers to one or more humans having certain knowledge, abilities, or skills, e.g. pertaining to a job. Example copilots disclosed herein may assist in eliciting such knowledge, abilities, or skills from skilled personnel, e.g. through interviews or recorded work sessions. Some experts can be skilled personnel, and vice versa. Skilled personnel are said to be "at work" while engaged in performing a job function. A "person" is a human.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution. Software can be organized in "modules." Each module can contain one or more functions and associated data directed to a common task or group of related tasks. Any of copilots, microservices, ML tools, LLMs, neural networks, annotations, interview representations, or databases can be implemented as software, which can be organized as respective software modules.

A "target" is a use case for a deployment (the "target deployment") of an innovative copilot. A target can be associated with one or more knowledge domains ("target domain"). "Customizing" can refer to configuring (e.g. by training) a copilot to be proficient in the target domain.

In the context of a job or associated workflow, a "task" (or "work item") is one of the functions performed as part of that job or workflow. A "task description" can provide details of how the function is performed, prerequisite knowledge providing context or otherwise aiding such performing, or expected results from the performed function. In some examples, a task can be performed by a microservice (dubbed "task microservice") trained to perform that task. Tasks can be allocated to appropriate microservices by another microservice dubbed a "distribution microservice" which can identify an appropriate microservice for a given task and route the task to that microservice.

In the context of a training phase, a "task" can be a function a trainee ML tool is directed to perform. Commonly, the performance of the trainee tool at this task is expected to improve over the course of the training phase. To illustrate, prediction tasks or chain-of-thought reasoning tasks can direct the trainee ML tool to perform prediction or chain-of-thought reasoning respectively.

In the context of copilot operation, a "task" (or, "task input") is a copilot input within its scope of competence. Illustratively, a task can be a question which the copilot should be able to answer, but tasks are not so limited, and tasks other than questions can also be used. Tasks can exemplify or define objectives of a customized copilot. Tasks can also be fresh inputs presented to a copilot for inference, e.g. after deployment. A task can include input data with or without an accompanying prompt. The term "task description" is used occasionally to describe a possible copilot input being used for another purpose, e.g. to obtain document records or training data. Similar to training, tasks for copilots or ML tools can be classified according to a breadth of knowledge required to train for or perform the tasks. Thus, "general language tasks" can be learned from a general language corpus, without requiring knowledge specific to an occupation; "occupation-related tasks" can be learned from an occupation training corpus, without requiring knowledge specific to a custom deployment; and "custom tasks" can be learned from a custom training corpus. Custom tasks can be specific to a particular target deployment, and can exclude occupation-related tasks common among related but distinct targets.

The term "test," as noun, verb, or adjective, refers to operations in which training inputs are provided to an ML tool and corresponding outputs are compared with desired responses to determine a performance metric for the ML tool. Often, a pool of training records can be split into two disjoint sets, one of which is used for training and the other used for testing.

"Text" refers to representations of words (e.g. "microscope"), or printable characters (e.g. "02.03.2024"), which convey semantic meaning.

A "token" is a unit of language, which can be a word, number, phrase, or other representation of semantic content in the language. The language can be a language of human verbal communication, but that is not a requirement. To illustrate, in a visual language of art or graphics, a red rectangle or a face can be a token. A token of a human communication language (e.g. English) can be represented as text, audio, image, or in another mode. To illustrate, a red patch in an image can represent "red." Commonly, closeness between two vector representations can indicate closeness of their underlying semantic content.

A "transcript" is a text rendition of a meeting, interview, presentation, or other session.

The term "validate" refers to an act of confirming that a data object (e.g. a document record) is suitable for its intended use. A variety of techniques can be used for validation. In some examples, a data object can be validated based on a similarity score, between the data object being tested and a reference data object, exceeding a predetermined threshold. In other examples, a data object can be validated based on it satisfying a predetermined criterion. In further examples, a data object can be validated by an evaluator.

A "vector representation" is a representation of a language token in a multi-dimensional space. Word embedding techniques can be used to obtain vector representations of language tokens.

A "work session" (or simply "session") is a period of activity during which work is performed, e.g. by one or more experts or skilled personnel. A work session can include gaps between work operations. An interview in which the expert(s) or skilled personnel is/are subjects is not considered a work session. However, an interview conducted by the expert(s) or skilled personnel can be a work session if conducting interviews is part of the work being performed—e.g. a doctor interviewing a patient, journalist interviewing a news source, or a hiring manager interviewing a job candidate. A "recorded work session" is a work session from which audio, image, or video signals are converted to electrical form, e.g. by a microphone or camera. In electrical form, signals of the recorded work session can be digitized and processed by various software tools (e.g. annotators) described herein. A recorded work session can be stored as a recording in digital form, but this is not a requirement. That is, digital signals can be stored temporarily in memory while being processed by an annotator during the work session, but need not be retained after annotation is complete. Thus, references to recorded work sessions herein encompass, but do not require, non-transitory or durable recordings of such sessions.

A "workflow" refers to one or more procedures for accomplishing a job or function thereof, and a "workflow map" can be a flowchart; a similar description of those procedure(s); an organized representation of knowledge including prerequisite knowledge for performing the procedure(s); or a data structure into which possible outputs of the procedure(s) can be organized. In some instances, a workflow map (e.g. for workflow input or output) can be represented graphically, as a "knowledge graph." In some examples, an annotator can progressively construct portions of a workflow map while monitoring an interview of a subject describing his/her job. The time-varying evolution of the annotator's workflow map over the course of the interview forms a dynamic record dubbed a "dynamic workflow map," while the finished product is dubbed a "static workflow map." It can often be desired for a second person or trained ML tool to replicate the workflow of a first person or ML tool. In some cases, the replication may be imperfect while, in other cases, the replication may differ from the original while achieving substantially similar results. For such reasons, the second person or ML tool can be said to "emulate" the original workflow. Emulation encompasses perfect replication of the original workflow. Further, emulation does not require an emulator to directly replicate an instant workflow, rather the workflow can be replicated by the emulator and external equipment under control of the emulator, in any combination. Workflow maps can have "relationships" with other workflow maps. Some workflow maps can be related as pertaining to a common workflow (e.g. pertaining to input, flowchart, or output of the common workflow). Other workflow maps can inherit relationships of their parent workflows, e.g. one being a prerequisite for another, two workflows being mutually exclusive, or two workflows commonly performed together.

Training

Training of a machine learning tool such as an LLM can be performed in phases. Generally, a unit of training data inputted to the tool during training can have a desired output, known as a "desired response." Training data can also be annotated. The annotation is known as a "label." In some examples, a label can be the desired response while, in other examples, the label can be a hint that assists the machine learning tool in classifying or otherwise processing the unit of training data without specifically being the desired response. Training can be applied to an ML tool, and "learning" can be the effect on the ML tool, e.g. improvement in some quantified measures of performance at desired function(s), however the terms training and learning can often be used interchangeably. A "training regimen" is a predefined multi-step procedure for performing training. A training regimen can be iterative and can include decision blocks and branches.

A "training corpus" is a collection of training data available for training or evaluating a model. Some training data can be organized as sets of records ("training records" or "training data records"), wherein two records of a given set share a common property (e.g. all records of the given set are conversations), but this is not a requirement. Some training records can be organized as (i) an input to a trainee ML tool, and (ii) a desired output from the trainee ML tool, but this is not a requirement. Other training records can be organized as (i) input, (ii) candidate output, and (iii) feedback on the candidate output. Training records can be created by an expert or developer, or can be synthesized by a trained ML tool. Training records can derived from repository data, document records, workflow maps, interview scripts, annotations of recorded work sessions or interviews, knowledge graphs, or an expert's acquired knowledge. As an illustration, a trained ML tool can generate a bullet point summary of an interview or recorded work session. Such a summary can also be a convenient source of training data for training a core microservice or other ML tool.

Training can be performed as a sequence of "phases," each phase having e.g. training data with a corresponding scope of knowledge (e.g. general language, technical language, occupational, deployment-specific, or job-specific); a particular configuration of a trainee ML tool (including e.g. a target microservice within a copilot, or a cluster of microservices); a training objective (e.g. next prompt prediction, or masked language recovery); and a training modality (e.g. unsupervised, supervised, or reinforcement learning). Each of these can evolve over a multi-phase training regimen. Scope of knowledge can be progressively narrowed to one or more deployments intended for the trainee ML tool. Training can begin with individual microservices and can advance to progressively larger clusters and even an entire copilot. Training modalities can advance from unsupervised, to supervised, to reinforcement learning. Training phases can continue even after an ML tool has been initially trained and deployed.

In "unsupervised learning," desired output of a trainee ML tool can be pre-existing and can be included with input provided to the trainee ML tool. In "supervised learning," desired output of the trainee ML tool can be pre-existing but can be excluded from training data provided as input to the trainee ML tool. Rather, the desired output can be compared with output from the trainee ML tool to determine a loss function, from which feedback can be provided to update parameters of the ML tool, e.g. by backpropagation. In "reinforcement learning," pre-existing desired output is not required. Rather, output produced by the ML tool can be rated by a human evaluator or a reward model, to generate feedback for updating parameters of the ML tool.

A "training objective" is a function or task for which it is desired to improve performance of a trainee ML tool.

In the context of training, "update" as a verb can refer to a process of changing a trained ML tool, e.g. through additional training, and "update" as a noun can refer to such a change. In some scenarios, additional training can be applied to an offline copy of the ML tool, after which the online copy can be replaced to complete the update.

"Pretraining" phases can be performed without explicitly labeling data or providing any desired response. Rather, the desired response can be automatically extracted from inputted training data. To illustrate, a pretraining phase can train a tool to perform a masked language modeling (MLM) task, e.g. recovering a data erasure. Thus, given an input "the car is blue," a pretraining phase can automatically erase a word from the input and use the erased word as the desired output. Thus, the tool can be trained, inter alia, to respond with "car" for MLM input "the * is blue". Other tasks can be similarly used for pretraining. In a next word prediction task ("prefix LM"), the tool can be trained to respond with "blue" for input "the car is". Training data used for pretraining can be in the form of complete documents (including interview scripts, work recordings, or annotations) or a corpus of multiple documents or document records. Compared with fine-tuning, pretraining phases often run longer and cover broader scope. While pretraining is often unsupervised, in some cases pretraining can be supervised.

"Fine-tuning" refers to one or more optional additional training phases that can be performed to customize a machine learning tool (e.g. a neural network, LLM, microservice, or copilot) for a particular target deployment or to update the tool subsequent to initial deployment. Training data used for fine-tuning can be organized as records, each having a "training input" which is to be provided as input to the tool and a "desired response" (e.g. a label) against which output of the tool can be measured. However, this is not a requirement, and fine-tuning can also be implemented using similar (unlabeled) data and tasks as a pretraining phase. Fine-tuning can be generic, e.g. training a tool to perform a particular task in a domain-independent fashion, or can be targeted to a specific knowledge domain. Compared with pretraining, fine-tuning phases can be more focused on narrower objectives with narrower scope of training data. While fine-tuning is often performed as supervised or RLHF phases, in some cases fine-tuning can be unsupervised.

Any training phase can improve or optimize performance on a given task. In addition to MLM and prefix LM, non-limiting examples of common training tasks include question-answering (multiple choice or closed-book), sentence completion, sentiment analysis, word sense disambiguation, coreference resolution, or natural language inference (e.g. determining whether an inputted hypothesis is true, false, or indeterminate). Other training tasks include next prompt prediction and annotation prediction.

A "trained" tool can provide output that matches or is similar to the desired response on at least a predetermined fraction of test inputs. To illustrate, a training input can be "what color is the car?" and the desired response can be "blue."

"Incremental training" refers to a training phase following an earlier training phase. Given a set of changes (either modifications or additions) to the training dataset used for the earlier training phase, incremental training uses the set of changes to perform additional training, e.g. of an LLM or other machine learning tool. In some instances, the set of changes can be small compared to the training dataset. To illustrate, the term incremental training can be used when the set of changes is less than a predetermined limit of e.g. 5%, 10%, 20%, or 50% of the training dataset used for the earlier training phase, measured e.g. in documents, megabytes, tokens, or another unit. Furthermore, example copilots can perform incremental training when the set of changes reaches a predetermined threshold, which can be in a range from 1% to the predetermined limit. Incremental training can be applied to pretraining, fine-tuning, or both.

Training records can be created in various ways. In some examples, both training input and desired response can be created by a human expert. In other examples, a software tool can extract training inputs (e.g. questions) or desired responses (e.g. answers) from a document, from document records, or from a corpus of documents, and a human expert can provide complementary desired responses or training inputs. In further examples, a software tool can generate both training inputs and desired responses, in which case the training data is said to be "synthesized." The software tool can be an LLM based tool, but this is not a requirement, and other question and/or answer generating tools can be used. In examples, synthesized training data can be screened by a human expert, often with considerably less effort than required to generate the desired responses or the training inputs without assistance.

Figure 2B:
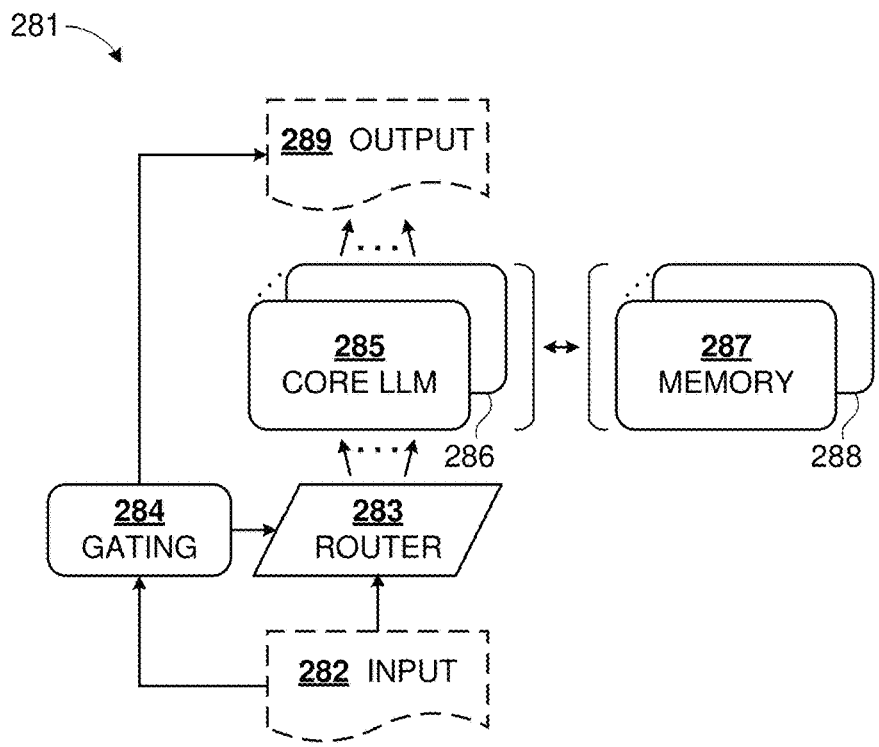

Training can be performed at multiple levels, e.g. on a single LLM or machine learning tool; individually for each LLM in a mixture-of-experts or ensemble of LLMs; collectively on the mixture-of-experts or ensemble; on a cluster of microservices such as a retrieval microservice and one or more associated data producers; or on a complete copilot similar to that illustrated in FIGS. 2A-2B. Commonly, training can be performed bottom-up, starting with smaller tools and proceeding to successively larger tools, but this is not a requirement. Particularly fine-tuning updates can be performed on one or a few microservices without necessitating additional training of larger units or an entire copilot.

In examples, some domain-specific pretraining or fine-tuning phases can be customized to particular levels of client authorization, leading to variants of a given trained microservice.

A copilot can incorporate a capability to trace dataflow and internal data as the copilot acts on a given client input. Such a tracing capability can assist in identifying performance levels of various microservices and lead to focused fine-tuning of an underperforming microservice. The disclosed microservice architecture lends itself to debugging or continual improvement in this manner because the internal data passed between microservices can be intelligible to a human analyst. (In a competing large LLM approach, while activations can in principle be traced, no systematic approach is available for using such activations to identify focus areas for remedial training.) Any microservice can be instrumented with an API allowing restricted access by developers to monitor behavior or performance, adjust configuration of the microservice, or apply additional training.

Example Architecture

Figure 2C:
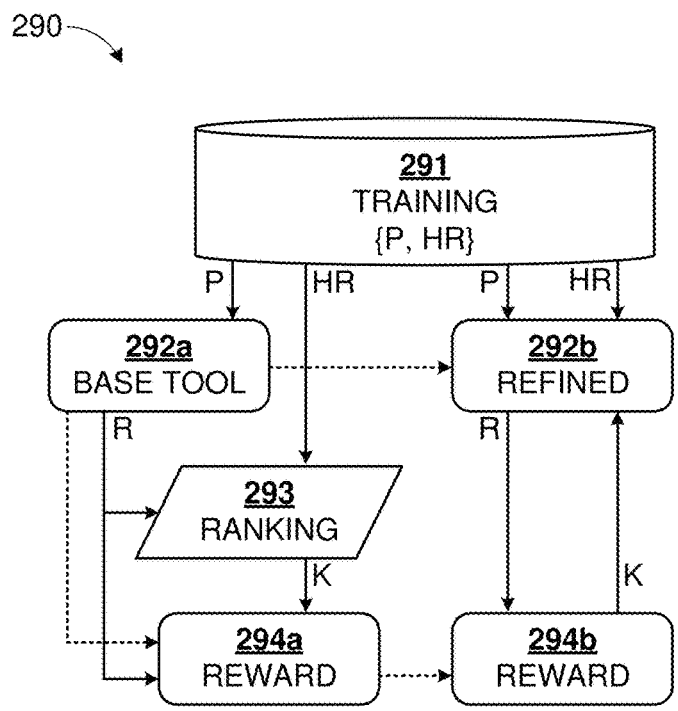

FIG. 2A is a schematic diagram 200 of an example architecture of a copilot according to the disclosed technologies. Shown in FIG. 2A is a network of modules implementing respective microservices, with arrows showing some possible communication paths among the microservices. This architecture is exemplary. Any given embodiment can omit certain modules or paths, incorporate other modules of paths, or implement other variations. The illustrated microservice network can be configured to implement a copilot serving one or more client applications, with capabilities for certain tasks comparable to or exceeding those of much larger, slower, and power-hungry competitive architectures. FIGS. 2B-2C are insets providing a detailed view 281 of a core microservice 281a-281d and a detailed view 290 of reinforcement learning subsystem 290a respectively. A legend in FIG. 2A shows the shapes used for microservices, databases, other data structures, procedural logic ("Proc. Logic"), and trained ML tools (some of which can be LLMs). As described further herein, additional or different entities can be implemented. In varying examples, certain microservices within which an ML tool is shown may also include procedural code which is not shown; procedural logic can be substituted for a depicted microservice; or more than one microservice or ML tool can be implemented where one is shown. For conciseness of illustration, short-hand labels are used in FIGS. 2A-2C.

Each microservice operates by receiving input, performing a specialized function on that input to obtain an output, and transmitting that output. The microservices can variously operate based on an LLM, on another trained machine learning tool, or on freestanding procedural program logic. Input can be received from a source such as another microservice or a client. Output can be transmitted to a destination such as another microservice or a client. Client application 210 can be run on computing hardware of client 202.

In some instances, a microservice can transmit output to the source from which it received input. In other instances, the microservice can transmit output to a destination different from the source. In further instances, the microservice can transmit multiple outputs to respective destinations, one of which can be the source. To illustrate, invocation of microservice A can initially invoke another microservice B, meaning that A transmits a first output to B. Later, when microservice B and perhaps other microservices have completed and transmitted their outputs eventually reaching A, microservice A can transmit another output responding to its source.

A microservice can invoke none, one, or more than one, microservice. In varying examples, a microservice can perform its specialized function upon receipt of inputs from one, two, or more distinct sources.

In some examples, microservice invocations can be stacked, as in a software call stack, so that as each microservice completes, control returns to its caller (source), but this is not a requirement. In other examples, event-driven or non-blocking paradigms can be used. Microservice A can invoke microservice B and can terminate, or continue, without waiting for microservice B to complete. In further examples, a mix of these or other types of flow control can be used.

Among other microservices, FIG. 2A illustrates expansion microservice 220, retrieval microservice 230, core microservices 281a-281d, and evaluation microservices 209 and 227-229.

1. Expansion Microservice and ML Tool

Expansion microservice 220 can be configured to receive first input incorporating one or more language tokens, e.g. derived from a client input, and determine one or more substitute or additional tokens associated with the received language tokens. To illustrate, an input token "lunch" can variously spawn additional tokens such as "time," "calendar," "break," "policy," "restaurant," or "recipe," any of which could be relevant to the client's intent, albeit absent in the client's actual input. Expansion microservice 220 can incorporate or be coupled to trained ML tool ("expansion tool") 221, which can be an LLM.

Separating expansion tool 221 from other ML tools or microservices in the copilot architecture enables efficient training of a small ML tool for the expansion function, which can be easily customized or fine-tuned for a particular deployment. To illustrate, "calendar" could be an important token in one deployment, but irrelevant in another deployment. Customized training of tool 221 enables a copilot deployment according to the disclosed technologies to produce high quality output with less computational effort than competing architectures.

Moreover, removing the burden of tool 221's functionality from other microservices in the copilot architecture enables those microservices to be implemented more compactly and efficiently as well.

Numerous variations and extensions can be implemented within scope of the disclosed technologies. In varying examples, expansion microservice can perform expansion variants such as standardizing word forms (e.g. "ran," "running" 4 "run"), replacing synonyms ("fine," "excellent") with standard terms ("good"), splitting ("lunchtime" 4 "lunch" and "time"). Alternatively, each of these variants can be performed by separate microservices, in any combination.

In examples, expansion microservice 220 can transform a user's query into smaller, more specific questions. Expansion microservice 220 can convert user inputs into well-formatted and targeted tasks to be delivered to core microservice 281a. Working together, a network of microservices can transform client inputs, e.g. expressed in natural conversation, into explainable and actionable prompts that break down input tasks into a group of subtasks that together retrieve thorough and accurate information.

Expansion tool 221 can be constructed from an encoder-decoder transformer based neural network. Flan-UL2 is an example of a suitable base transformer neural network. In other examples, expansion tool 221 can be constructed from a decoder-only transformer, e.g. without any encoder stages.

2. Intermodal Microservice and LMM

Some examples of the disclosed technologies can implement intermodal microservice 222 to support modes of client input other than text.

Intermodal microservice 222 can be configured to receive second input, which can be derived from client input and can contain one or more tokens, which can be audio inputs, images, or video. Intermodal microservice 222 can determine one or more language tokens from the second input, for example using an intermodal LMM 223. A second output comprising these language tokens can be transmitted.

Numerous variations and extensions can be implemented within scope of the disclosed technologies. In some examples, client input can contain non-text data and intermodal microservice 222 can be invoked from client interface microservice 216. Second output from microservice 222 can be returned to client interface microservice 216 to be forwarded to expansion microservice 220. In other examples, non-text data objects can be encountered during retrieval augmented generation (RAG) by retrieval microservice 230, and intermodal microservice 222 can be invoked from retrieval microservice 230. In such instances, language tokens (second output) can be returned to retrieval microservice 230, or can be conveyed to expansion microservice 220 for expansion just like any text-mode input. Other connectivity between intermodal microservice 222 and data producers or core microservices can also be provided. Multiple intermodal microservices 222 or multiple intermodal LLMs 223 can be provided, e.g. for respective classes of non-text data.

Similarly, other intermodal services can be implemented to generate client output in modes other than text for some applications. To illustrate, speech output can be beneficial in e.g. automotive, mobile, or public-announcement applications where a user's visual attention may be occupied or where a visual display is not available. Non-text visual outputs can be beneficial for e.g. status or alarm notifications, charts, diagrams, or other visualizations. An intermodal microservice can be an example of a class of "data interpreter" microservices, whose function is to translate data, understand context of data, or categorize data from specific data sources. A data interpreter microservice can be trained using techniques described in context of FIGS. 5, 12, 19B or elsewhere herein.

Thus, intermodal microservices 222 can process visual, audio, or text data, enabling a copilot to interpret audio or visual input as text, or generate audio or visual output from text.

In some examples, intermodal microservices 222 can handle all non-text input. In other examples, specialized client-side microservices 212, 214 can be implemented. As shown in FIG. 2A, speech-to-text service 214 ("S→T") can process client speech to provide text from client interface 216 to the copilot. Conversely, text-to-speech service 212 ("T→S") can process text outputted to client interface 216 into speech.

Supporting multiple input or output modes in a competing large LLM can be a significant burden, Removing the burden of LLM 223's functionality from other microservices enables those microservices to be implemented much more compactly and efficiently.

Moreover, and similar to expansion microservice 220 or expansion LLM 221, separating intermodal microservice 222 from other microservices or LLMs enables efficient implementation and training of an intermodal conversion function, which can be easily customized or fine-tuned for a particular deployment. To illustrate, two intermodal LMMs 223 can be trained for respective speakers' voice or vocabulary, while another intermodal microservice can be trained to generate a particular type of visual output without wasting effort on other types of output that may not be required in a particular application. Customized training of intermodal LLM such as 223 enables a copilot deployment according to the disclosed technologies to produce high quality input or output conversion with less computational effort than competing architectures.

3. Retrieval Microservice and RAG

Retrieval microservice 230 can be configured to receive third input, which can include or be based on output from expansion microservice 220 or intermodal microservice 222. Retrieval microservice 230 can perform a function of retrieving data relevant to the third input. Retrieval microservice 230 can perform this function by invoking other microservices dubbed "data producers" (collectively 232), examples of which are described further herein. The retrieved data can be used to augment the received third input, thereby facilitating still other microservices such as core microservices, described further herein, to efficiently generate high-quality outputs for respective inputs (e.g. the third input), which ultimately derive from an original client input. The generation of augmented input by data retrieval is termed "retrieval augmented generation" ("RAG") herein.

Accordingly, retrieval microservice 230 can retrieve one or more data objects related to the third input from one or more of data producers 232, and can use these data objects to augment the third input so as to obtain fourth output, which can be transmitted toward one or more of the core microservices. Retrieved data objects (e.g. documents) can be ranked and selected to keep size of the fourth output (measured in bytes or number of data objects) within a predetermined limit. Ranking can be performed by an LMM with a late interaction architecture, such as ColBERT.

Numerous variations and extensions can be implemented within scope of the disclosed technologies. In examples, retrieval microservice 230 can be further configured to repeat the RAG, based in part on the retrieved data objects or further successively retrieved data objects, until a termination condition is met. An evaluation microservice, similar to 227 or 228 and as described further herein, can be invoked to assist in making the determination whether to further iterate the RAG.

In some instances, the evaluation microservice can determine that one or more of the retrieved data objects are sufficient to accurately respond to the third input, and no invocation of core microservices 280 is required. To illustrate, a client input can be directed to finding what time a plane flight departs. The answer to this question could be contained in a retrieved document or database object. In such case, a response to the third input can be returned toward the client directly from the evaluation microservice or retrieval microservice 230.

In examples having a plurality of data producers 232, retrieval microservice 230 can determine which data producer(s) (e.g. 234, 240, 251, 255, 257) to invoke for retrieval of data objects. Successive RAG iterations can invoke different data producers 232. For example, data objects retrieved from messaging microservice 251 can be used to perform RAG using database microservice 240, or vice versa. Data objects retrieved from messaging microservice 251 or database microservice 240 can be used to perform RAG using vector index 238 of document repository 236, or vice versa.

In varying examples, retrieval microservice 230 can be implemented with an LLM, another trained ML tool, or freestanding procedural logic, in any combination.

In some examples, retrieval microservice 230 can vectorize received input (e.g. third input or retrieved data objects) and can search various databases to retrieve relevant data objects. The data retrieved from these databases can be passed to a core microservice to provide context and domain information to assist in efficiently determining accurate output for the third input. As described herein, retrieval microservice 230 can invoke additional microservices to assist with its tasks.

4. Data Producer Microservices

Examples of the disclosed technologies can utilize a wide range of data repositories for RAG. Microservices 234, 240, 251, 255, 257 supporting retrieval of relevant data objects from these repositories are dubbed "data producers" (collectively 232) herein. The next few sections describe exemplary data producers 232, which also include generic data producer 257. Data producers can be examples of data interpreter microservices.

The repositories available to the data producers 232 can have zero overlap with, partial overlap with, or can be identical to: data used to train e.g. core microservices 281a-281d described herein. In examples, RAG can enable a core microservice 281 to reach beyond its training in generating outputs relevant to a client input. Moreover, these repositories and their associated microservices can be maintained and updated independently of core microservices 281a-281d, enabling capabilities of a copilot to advance without any fine-tuning or supplemental training of core microservices 281a-281d. Because data producers can be much smaller than e.g. a core microservice, and because training data and training time often scale proportionally to the size (parameter count) of an ML tool, customizing or updating one or multiple data producers can require a small fraction (typically 0.001 to 0.1) of the computational resources required to customize or update a comparable large LLM.

Inasmuch as core microservices 281a-281d can implement LLM variants tailored to respective levels of client authorization, data repositories accessed by data producers 232 or retrieval microservice 230 can also be segregated or nested into variants according to the levels of client authorization.

5. Embedding Microservice and Document Microservice

Some examples of the disclosed technology can use vector embedding to find relevant documents in a vector-indexed document repository. That is, retrieval microservice 230 can invoke embedding microservice 237 to determine relevant vector word embeddings. A document microservice 234 can be used to map these word embeddings to relevant documents using a vector index 238, and the identified documents can be retrieved from the document repository 236.

Embedding microservice 237 can be invoked on fifth input, from retrieval microservice 230, which can be based on the third input (e.g. on a first RAG iteration), or on subsequently retrieved data objects (e.g. on a subsequent RAG iteration). Upon receipt of the fifth input, embedding microservice 237 can determine and transmit, as fifth output, one or more vector embeddings representative of at least portions of the fifth input.

Document microservice 234 can be invoked on sixth input, which can include or be based on the fifth output. Upon receipt of the sixth input, document microservice 234 can identify and transmit one or more documents having content similar to at least portions of the sixth input.

Numerous variations and extensions can be implemented within scope of the disclosed technologies. In some examples, document microservice 234 can be invoked from embedding microservice 237 while, in other examples, vector embeddings can be returned from embedding microservice 237 to retrieval microservice 230. In further examples, the vector embeddings can be provided to core microservices that have been trained on vector embeddings, or can be provided to other data producers 232 which also maintain respective vector indexes.

In varying examples, embedding microservice 237 can be implemented with an LLM, another trained ML tool, or program logic, in any combination.

Documents can be encoded in terms of dense vectors to create searchable vector databases 238. In examples, document microservice 234 can be constructed using a sentence transformer LLM configured to convert sentences of the document into 768-dimensional dense vectors. Such an LLM can group similar documents into the same clusters and can support semantic search.

6. Database Microservices

Some examples of the disclosed technology can use a database microservice to find relevant data objects stored in one or more databases. Exemplary databases can be relational or other table-oriented databases. The databases can be SQL databases or no-SQL databases. A wide range of databases can be integrated into the disclosed copilot architecture. The returned data objects can be used for RAG by retrieval microservice 230.

Database microservice 240 can be invoked on seventh input, from retrieval microservice 230, which can include or be based on the third input (e.g. on a first RAG iteration), or on subsequently retrieved data objects (e.g. on a subsequent RAG iteration). Upon receipt of the seventh input, database microservice 240 can retrieve database objects relevant to the seventh input from one or more databases 242. Database microservice 240 can determine and transmit a seventh output including or based on the retrieved database objects.

Numerous variations and extensions can be implemented within scope of the disclosed technologies. A database indexing microservice can be configured to generate or maintain at least one index from the one or more databases. Retrieval of the database objects can be efficiently performed using the at least one index. In some example, each database 242 available to database microservice 240 can have its own distinct index while, in other examples, a common index can be maintained across multiple databases 242. In varying examples, a copilot architecture can implement a plurality of database microservices, each supporting one or more respective databases or database types.

In some examples, data objects returned can be returned in a form similar to that stored in the databases. To illustrate, a data object can be returned as the value of an individual field in a database table, which can be an atomic datatype such as a string or number, a data structure, a document stored in that field, or a link to any of these. As another illustration, a data object can be returned as a record (e.g. a row of a database table), a column, or other subset of a database table or view. The returned data objects can further include identifiers of the database, table, records, or columns where they are stored, or other indicators enabling providing traceability of the data objects.

In other examples, database microservice 240 can process retrieved data objects to return seventh output in the form of a document. Such processing can include text formatting, conversion of non-text database objects to text, generation of sentence- or paragraph-style text, or charts providing graphical visualization of the retrieved database objects.

In some examples, database microservice 240 can invoke a text-to-SQL microservice 244. Text-to-SQL microservice 244 ("T→D") can translate part or all of the seventh input (e.g. questions generated by expansion model 220) into one or more SQL queries. These queries can be used to retrieve the database objects from an SQL database in real-time. In some examples, microservice 244 can obtain an SQL query by scoring a library of SQL queries against the text input. In other examples, text-to-SQL microservice 244 can utilize LLM 245, which can be constructed based on instruction-tuning an LLM such as Mistral-7b on a mixture of proprietary and open-sourced datasets.

In some examples, database microservice 240 can invoke a table-to-X microservice 246 ("D→*X"), where X can be text ("T") or another mode. Microservice 246 can generate textual statements based on data or tokens extracted from retrieved tabular database data objects. Microservice 246 can utilize LLM 247, which can be constructed based on a GPT-type model trained for generation of coherent natural language responses from a database table, fine-tuned with domain specific datasets. In variations, LLM 245 or 247 can be implemented as another type of trained ML tool.

Microservices 244, 246 can also communicate with each other as shown, for feedback or evaluation. To illustrate, database data producer microservice 240 can implement an internal evaluation module, to determine whether the X output of microservice 246 is an appropriate response to the T input received by microservice 244.

7. Messaging Microservices

Some examples of the disclosed technology can use a messaging microservice to find relevant message objects (e.g. messages or metadata) stored in one or more message repositories. Exemplary message repositories can store email, voicemail, text messages (e.g. compliant with Short Message Service, known as "SMS"), instant messages, video messages, multi-mode messages, or attachments thereto, along with corresponding metadata. A wide range of message types or messaging applications can be supported. Returned message objects can be used for RAG by retrieval microservice 230.

The content of a message repositories can share some attributes of database tables and some attributes of documents and, accordingly, messaging microservices can be implemented separately from a document microservice or a database microservice. Various message repositories can have similarities with each other. Below, messaging microservice 251 for emails is described. FIG. 2A also shows messaging microservice 255 which supports Slack® messages. Slack® microservice 255 and generic data producer microservice 257 can provide access to repositories 256, 258 respectively. Features and operation of microservice 255 can be similar to those of microservice 240 or 251, and are not described further.

Messaging microservice 251 supports email and is described further. Messaging microservice 251 can be invoked on eighth input, from retrieval microservice 230, which can include or be based on the third input (e.g. on a first RAG iteration), or on subsequently retrieved data objects (e.g. on a subsequent RAG iteration). Upon receipt of the eighth input, messaging microservice 251 can retrieve message objects relevant to the eighth input from one or more message repositories 252. Messaging microservice 251 can determine and transmit an eighth output including or based on the retrieved message objects.

Numerous variations and extensions can be implemented within scope of the disclosed technologies. A message indexing microservice can be configured to generate or maintain at least one index from the one or more message repositories 252. Retrieval of the message objects can be efficiently performed using the at least one index. In some example, each message repository 252 available to messaging microservice 251 can have its own distinct index while, in other examples, a common index can be maintained across multiple message repositories 252.

In some examples, messaging microservice 251 can invoke a query adaptation microservice 253. Query adaptation microservice 253 can translate part or all of the eighth input (e.g. questions generated by expansion model 220) into one or more queries targeting message repository 252. These queries can be used to retrieve the message objects from message repositories 252 in real-time. Query adaptation microservice 253 can utilize LLM 254, which can be constructed based on similar principles as LLM 245.

In varying examples, a copilot architecture can implement a plurality of messaging microservices, each supporting one or more respective message types or messaging applications.

8. Qualification Microservice

Some examples of the disclosed technologies can implement e.g. qualification microservice 270 to qualify inputs in relation to the competencies of the copilot. The disclosed microservice architecture allows qualification to occur deep inside the copilot at one or more selected points in the processing flow. This can save processing effort in cases of copilot incompetence. Additionally, qualification microservice 270 can operate input-side, e.g. before inputs have reached core microservices subsystem 280, which can provide precise comparison of a client input with copilot competency.

In contrast, conventional tools, particularly those intended as general-purpose tools, can be limited to determining competency from the outside, either directly from the client input, when the scope of the client input is not well-known, or from the client output, when evaluation can be confounded by output that looks good. For these reasons, conventional tools often do not even attempt to determine competency, greatly increasing the risk of hallucination or other artifacts.

Qualification microservice 270 can be configured to receive ninth input, which can include or be derived from fourth output produced by retrieval microservice 230. Qualification microservice 270 can compare all or part of the ninth input with model 271 of a knowledge corpus incorporated in the copilot, to determine whether the copilot is competent to act on the ninth input. In some examples, model 271 can be a graphical model while, in other examples, a list, table, or other non-graphical model representation can be used.

In some examples, graphical model 271 can be a map in a multi-dimensional vector space similar to that used by embedding microservice 237 or vector index 238. The map can define one or more surfaces or envelopes separating interior regions of the vector space which are within scope of the knowledge corpus from exterior regions which are outside the scope of the knowledge corpus. Thus, the copilot can be determined to be competent for portions of the ninth input that map to an interior region, and can be determined to be incompetent for portions of the ninth input that map to an exterior region.

In some examples, the knowledge corpus represented by graphical model 271 can include one or more datasets on which core microservices or other microservices of the copilot have been trained. In other examples, the knowledge corpus can include databases available to any data producer from which RAG can be performed.

In some examples, a determination of competence can require that all portions of the ninth input map to interior regions while, in other examples, competence can be determined on a portion-by-portion basis. In such case, a determination of incompetence can require that all portions of the ninth input map to exterior regions. Otherwise, the portions of the ninth input mapping to exterior regions can be discarded, the copilot can be deemed competent for the remaining portions of the ninth input, which map to interior regions, and processing can proceed.

In either case, upon determining that the copilot is competent, qualification microservice 270 can determine and transmit ninth output, including or based on the ninth input, toward at least one of the core microservices. Alternatively, upon determining that the copilot is not competent, qualification microservice 270 can transmit a notification indicating lack of competence, e.g. back to retrieval microservice 230, expansion microservice 220, or directly back to client interface microservice 216. Such notifications can redirect a receiving microservice to deprecate its previous output and generate a different output for which qualification microservice 270 determines that the copilot has competence. In some examples, qualification microservice 270 can reject all or part of the ninth input if adequate supporting information (e.g. from data producers 232 via retrieval microservice 230) is absent in the ninth input.

Numerous variations and extensions can be implemented within scope of the disclosed technologies. The placement of qualification microservice 270 is exemplary, and alternative or additional qualification microservices can be placed elsewhere. For example, a qualification microservice can be placed within each data producer, with a scope of competence limited to the stored data of that data producer.

9. Core Prompting Module

In some examples, inputs to core subsystem 280 can be managed by core prompting module 272. Output from qualification microservice 270 can be split or organized into one or more prompts provided to core microservice 281*a*. In some examples, the path from qualification microservice 270 to module 272 can be mediated by evaluation microservice 228, so that some outputs from qualification microservice 270 can be forwarded to module 272, while others can lead to another invocation of retrieval microservice 230.

Module 272 can also be invoked based on output from filter 273, e.g. to release additional prompts queued at module 272, or to blacklist certain prompts leading to unacceptable output from core subsystem 280.

10. Core Microservice

With various stages of input-side processing described above, inputs can reach a core microservice such as microservice 281*a*. Core microservice 281*a* and other core microservices 281*b*-281*d* can incorporate LLMs (or other trained ML tools) trained to perform general or specific respond-to-input tasks within one or more domains of interest. Thus, in some examples a core microservice in the disclosed architecture can be used to implement a general-purpose copilot similar to presently popular chatbots, albeit with a much smaller total size and much lower computational demands. In other examples, a core microservice can be trained for particular specialized tasks or for specialized knowledge domains. Non-limiting examples of specialized tasks include question-answering, generative tasks (e.g. software code, text, or art), natural language interfaces to database, causal reasoning, literature search (e.g. scientific, legal, journalistic, or in the humanities), or education (e.g. tutoring, grading). Non-limiting examples of specialized knowledge domains include public or private databases (e.g. scientific, legal, journalism, humanities, linguistic, corporate, enterprise resource planning (ERP), or training materials).

Off-loading various specialized functions to other microservices, as described herein, allows core microservices to be implemented much smaller than competing products in which knowledge as well as specialized functions (e.g. intermodal support, expansion, RAG, or filtering) are all integrated into one monolithic large LLM. Accordingly, disclosed core microservices require less computing hardware and less training time than prevalent competing techniques, and can be trained or customized with only modest computational burden. Still further, the small size of a core microservice allows a copilot to integrate multiple core microservices in various ways, which is impractical with the competing large LLM products.

That is, multiple core microservices within a disclosed copilot architecture can share other specialized microservices such as expansion, embedding, retrieval, data producers, or qualification.

Each core microservice 281*a*-281*d* can include one or more trained machine learning tools and optionally one or more long-term memories (e.g. LSTMs). Core microservice 281*a*-281*d* can be configured to receive a tenth input, which can include or be based on fourth output of retrieval microservice 230 or on ninth output of qualification microservice 270. Core microservice 281*a*-281*d* can apply at least one of the included ML tools to the tenth input to obtain a tenth output, and can transmit the tenth output. The trained ML tools can include one or more LLMs, LMMs, or DNNs.

Numerous variations and extensions can be implemented within scope of the disclosed technologies. As described further in context of FIG. 2B, each core microservice 281*a*-281*d* can incorporate two or more LLMs 285-286 (or other ML tools) which can be peers, trained according to respective levels of client authorization. To illustrate, LLM 285 can be trained on corporate knowledge accessible to all employees, while LLM 286 can also be trained on restricted data only accessible to managers or executives of an organization. Because core LLMs 285-286 can be compact, many levels of authorization can be concurrently supported by respective LLMs 285 . . . 286, e.g. for customers, according to several levels of corporate hierarchy, according to business unit, or according to department and job function (e.g. procurement, sales, accounting, or human resources).

Core microservice 281 can be configured to select among LLMs 285 . . . 286 according to a level of client authorization associated with the tenth input. The selected LLM 285 . . . 286 can be applied to the tenth input to generate the tenth output. Insofar as only one LLM 285 . . . 286 is applied to a given tenth input, a group of LLMs 285 . . . 286 can operate in a mixture-of-experts (MoE) mode. Additionally, each of LLMs 285 . . . 286 can itself be a combination of several LLMs, e.g. as a mixture-of-experts or as an ensemble. Thus, a collection of core microservices 280 can be organized with multiple hierarchical levels. To illustrate, a core microservice can be organized as a Mixture-of-Mixture-of-Experts (MoMoE). Each MoE within a MoMoE can be trained to be expert in one or more respective domains, or to have skills of one or more respective job functions, and multiple MoEs can be merged to form the MoMoE. Within a MoE, each expert LLM can be trained: according to a respective perspective; to perform a respective cognitive function; or according to a respective authorization level. Other organization for a hierarchical core microservice can also be used. In further examples, the feed-forward network of another LLM can be implemented as one or more expert LLMs (e.g. small or mid-sized LLMs). For a complex core microservice, merely a subset of components can be activated for a given input, with other components remaining inactive. In this manner, utilization of computing resources and power consumption can be kept to about 1-3 times that of a single mid-sized LLM.

In further examples, core microservice 281 can incorporate one or more long-term memories 287 . . . 288 which can maintain history of inputs and outputs for a respective client entity. The client entity can be a session, a client identifier associated with a respective user, or a group of users. That is, different users, user groups, or sessions can have their own memory to avoid interference between the various users, user groups, or sessions.

Some competing techniques attempt to maintain history by using the history to update the training of a large LLM, which may not distinguish client entities, may not be accurate, or may be computationally burdensome. In contrast, maintaining history in a dedicated long-term memory is computationally efficient, maintains separation between client entities, and obviates having to update core LLM 285 . . . 286 merely for the sake of logging history.

In additional examples, a core microservice can be trained to perform evaluation, e.g. integrating functionality of evaluation microservice 229 into core microservice 281*a*. Like other microservices, core microservices 281*a*-281*d* can also issue requests for clarification.

11. Core Microservice Architecture

FIG. 2B shows an example architecture 281 of a core microservice. Any one or more of core microservices 281*a*-281*d* can be implemented according to architecture 281. In variations, certain illustrated components of architecture 281 may be omitted, or additional components may be added. As described herein, core microservice 281 can receive input 282 and produce output 289, both shown in dashed outline because they may not be part of microservice 281.

Input 282 can be provided to routing module 283. In some examples, router 283 can be implemented as procedural logic while, in other examples, router 283 can be an LLM or other trained ML tool, or a combination of an ML tool and procedural logic. Router 283 can distribute parts or the whole of input 282 among one or more core LLMs (or other trained ML tools) 285 . . . 286. In some examples core LLMs 285 . . . 286 can be developed for different levels of client authorization and can operate as a mixture of experts. In other examples, core LLMs 285 . . . 286 can provide optimization for different tasks, for different types of data, or for different knowledge domains. Thus, core LLMs can also operate as an ensemble. Output from one or more invoked core LLMs 285 . . . 286 can be gathered into output 289. Optionally an aggregator module (not shown) can be implemented between core LLMs 285 . . . 286 and output 289.

Core LLMs 285 . . . 286 can be supported by memories 287 . . . 288 to retain context. In varying examples, each of memories 287 . . . 288 can be assigned to a respective core LLM 285 . . . 286, to a respective session, to a respective client entity, or to a particular group, combination, or group of combinations of one or more of these discriminants. Stored context can include data extracted or derived from past copilot tasks, from inputs received during a training phase, or from knowledge specific to an occupation or target domain. That is, memories 287 . . . 288 can store and retrieve data during training, during inference, or across training and inference. Memories 287 . . . 288 can be implemented as LSTMs or other neural networks alongside core LLMs 285 . . . 286, as key-value (KV) stores, or as other forms of random access memory (RAM). The context data can be sub-divided into chunks (which can be media segments), and stored according to topic. In some examples, an attention mechanism of core LLM 285 . . . 286 can be directed to a predetermined number of most recent KV pairs in memory 287 . . . 288.

Core microservice architecture 281 can also support alternative datapaths. As described herein, a core microservice 281*a*-281*d* can sometimes be bypassed. To illustrate, bypassing a core microservice developed for image input can save computation power in cases where input 282 is text or audio. Thus, in some examples, input 282 can be forwarded to gating module 284 to make a decision whether to process input 282 locally, or whether to forward input 282 intact as output 289. In the former case, gating module 284 can pass input data to router 283 for handling as described above. In the latter case, gating module 284 can forward input data directly as output 289. In variations, gating module 284 can split input 282, handling part locally, and forwarding part intact. To illustrate, an image portion of input 282 can be forwarded to router 283 for local handling, while text or audio portions can be passed onward in output 289. Gate 284 can variously be implemented as a trained ML tool, as procedural logic, or as a combination thereof.

12. Ensemble of Core Microservices

Returning to FIG. 2A, some innovative copilots can implement multiple core microservices 281*a*-281*d*. Core microservices 281*a*-281*d* can be configured as an ensemble of microservices, meaning all microservices 281*a*-281*d* can be invoked for a given tenth input. As shown in FIG. 2A, core microservices 281*a*-281*d* can be configured in a loop, but this is not a requirement, and other topologies can be used. In loop 281*a*-281*d*, each core microservice 281*b*-281*d* can receive an eleventh input from a preceding neighboring core microservice 281*a*-281*c*, apply at least one of its trained LLMs to the eleventh input to determine eleventh output, and transmit the eleventh output to a following neighboring microservice 281*c*-281*d*, 281*a*.

Numerous variations and extensions can be implemented within scope of the disclosed technologies. In some examples, core microservices 281*a*-281*d* can be peers trained to perform different cognitive functions, albeit on a same knowledge domain. Additionally or alternatively, core microservices 281a-281d can be distinguished by domain of expertise; forms of input (e.g. text, image, audio) that they are trained or optimized to handle; or perspective. Regarding perspective, two core microservices can be trained using respective training data drawn from a same domain, for performing a same task, but with desired responses reflecting different perspectives—e.g. varying perspectives of engineering, manufacturing, marketing, education, or technical support personnel. Going around the loop 281a-281d, each core microservice 281a-281d can successively add to a growing output for the tenth input originally received at core microservice 281a. Depending on the task embodied in the tenth input, the different microservices 281a-281d can have different amount of useful contribution to the growing output. Moreover a partial output generated by an upstream core microservice 281b can be useful to a downstream core microservice 281d. Still further, it can be desirable in some instances for core microservice 281b to use output from core microservice 281d. In such case, the growing output can continue circulating for another iteration around loop 281a-281d so that partial output from microservice 281d reaches microservice 281b. Additional iterations can also be supported.

While the loop architecture can be convenient for sequential invocation of core microservices 281a-281d, other topologies can be used. To illustrate, core microservices 281a-281d can be fully connected, so that any active core microservice 281a-281d can independently determine which core microservice 281a-281d is to be invoked next.

In some examples, partial results generated by respective core microservices can be consolidated, e.g. by core microservice 281a or by a separate evaluation microservice 229.

13. Cognitive Functions

LLMs are commonly trained to optimize performance for a single cognitive function. In many fields, attempting to maximize multiple metrics can be challenging, often leading to results which fail to maximize any of those metrics. LLMs are no exception.

Because the disclosed architecture enables powerful copilots to be built with compact LLMs, it can be feasible to incorporate multiple core microservices, each trained to optimize performance on different respective cognitive functions. Such an approach parallels some models of the human brain, in which different lobes apply different cognitive skills to cooperatively accomplish a given task.

Accordingly, core microservices 281a-281d can be trained to optimize performance on respective cognitive functions, including e.g. two or more of: next word prediction, causal reasoning, sentiment analysis, language modeling, summarization, chain-of-thought reasoning, tree reasoning, graphical reasoning, arithmetic reasoning, table-to-text generation, zero-shot generalization, or corrupt span prediction.

14. Evaluation Microservices

Microservice invocations in FIG. 2A can proceed generally downward from client 202 to core microservices 281a-281d, with each invoked microservice acting on its input and transmitting output to one or more subsequently invoked microservices. Outputs e.g. from core microservices 281a-281d can flow back upward in FIG. 2A toward client 202. Arrows in FIG. 2A show exemplary paths for outputs to flow in various directions.

At various stages, outputs can be evaluated and decisions can be taken regarding dataflow for an instant client input. That is, the output of any microservice can be coupled as input to an evaluation microservice, and outputs of the evaluation microservice can be provided as inputs to one or more other microservices. A single input received from a source microservice at the evaluation microservice can result in output from the evaluation microservice to a single destination microservice, or to multiple destination microservices. The destination(s) can be contingent on evaluation of the input, and can include the source microservice itself. An evaluation microservice can validate an output, and can determine whether an output satisfies a target quality level. If the target quality level is satisfied, dataflow can proceed along a normal path as described herein. If the target quality level is not satisfied, dataflow can be modified, e.g. to perform additional iterations of RAG, additional invocations of core microservices or other source microservices, or requesting clarification or guidance via an interface with a requesting client or another expert. Evaluation metrics can include, without limitation: response accuracy; precision and recall; recall in presence of distractor context; effectiveness of resource usage; factuality; or freedom from hallucination. An evaluation microservice can be trained using techniques described in context of FIGS. 5, 12, 19B or elsewhere herein.

A copilot can incorporate one or more evaluation microservices 209, 227-229. Each can receive twelfth input comprising all or part of the output of another microservice. Evaluation microservice 209, 227-229 can be configured to analyze the twelfth input. Based on the analysis, a further one or more of the microservices can be invoked.

Numerous variations and extensions can be implemented within scope of the disclosed technologies. Evaluation microservices 209, 227-229 can be implemented using an LLM, another trained machine learning module, or free-standing procedural logic.

Illustratively, evaluation microservices 209, 227-229 are shown in FIG. 2A. Alternatively or additionally, a core microservice can be configured to perform evaluation.

Evaluation microservice 227 can be configured to receive twelfth input derived from the fourth input received by retrieval microservice 230 from document microservice 234. Analysis by microservice 227 can be used by retrieval microservice 230 to determine whether to perform another RAG iteration.

Evaluation microservice 229 can be configured to receive twelfth input derived from the tenth output transmitted by core microservice 281a. Analysis by microservice 229 can be used by core microservice 281a to determine whether to perform additional invocations among core microservices 281a-281d.

In some examples, evaluation microservice 229 can also consolidate partial results output by respective core microservices 281a-281d. To illustrate, the partial results can be scored against inputs such as the tenth input received by core microservice 281a and highest ranking partial results can be forwarded toward a client while lower ranking partial results can be discarded.

Evaluation microservice 228 can be configured to receive twelfth input derived from ninth output of qualification microservice 270 and direct its output toward one or more of retrieval microservice 230 or core microservices 281a-281d.

Some evaluation services can receive inputs from multiple source microservices. Because client output can originate at various points in a microservice network, some deployments can implement evaluation microservice 209 as a gatekeeper for output returned to client 202 via client interface 216. Evaluation microservice 209 can receive input from one or more copilot modules, e.g. from any copilot module generating output directed toward client application 210. Thereby, such deployments can enforce quality control on outputs provided to the client. In some cases, evaluation microservices 209, 229 can be a single microservice, but this is not a requirement. Some evaluation microservices can request evidence or reasoning from a source microservice. Either the evaluation microservice or an auxiliary qualification microservice can determine entailment of the source microservice's output in view of inputs provided to the source microservice and any evidence or reasoning provided by the source microservice. "Entailment" is a measure of confidence that the source microservice's output necessarily follows from those inputs, evidence, or reasoning, in any combination, and can be determined by an ML tool trained with examples of entailment determination. An evaluation decision on the source microservice's output can be based on the determined entailment. Evaluation of reasoning can be a single reasoning step, a group of reasoning steps, or an entire reasoning trajectory. Evaluation of reasoning can be applied to any microservice performing reasoning, including but not limited to core, expansion, intermodal, protection, or even other evaluation microservices.

Additionally or alternatively, analysis by evaluation microservice 229 can be used by retrieval microservice 230 to determine whether to perform another RAG iteration. Thus, loops of different sizes can lead to additional RAG iterations, including recursive iterations. A first loop can include close coupled microservices 172, 186 of FIG. 1; a second loop can incorporate qualification microservice 270, evaluation microservice 228, and retrieval microservice 230; larger loops can extend to core subsystem 280 and evaluation microservice 229. RAG iterations can also loop between expansion microservice 220 and retrieval microservice 230.

15. Filtering

Some applications of the disclosed technologies operate in constrained knowledge domains or support a constrained set of tasks. As such, risks of bias, toxicity, or other undesirable artifacts can be much lower than in competing general purpose large LLMs. Moreover, smaller LLMs as used herein can be inherently more stable, e.g. less prone to artifacts, than competing larger LLMs.

Nevertheless, it can be desirable to apply filtering against bias, toxicity or other artifacts. FIG. 2A shows two filter microservices 224, 273 incorporated in the illustrated architecture. As for qualification microservice 270, the illustrated architecture enables filter microservices 224, 273 to be placed at targeted locations immediately downstream of other microservices judged to have likelihood of introducing undesirable artifacts, enabling such artifacts to be nipped in the bud before they can propagate and possibly contaminate otherwise artifact-free outputs.

As an illustration of the contamination risk, consider a given microservice that generates 10 output tokens, 2 of which are contaminated with bias or toxicity. Absent filtering, the various tokens can interact at a subsequent microservice, resulting in an increasing proportion of contaminated outputs. With pinpoint positioning of filter microservices 224, 273, the contaminated tokens can be eliminated promptly, leaving only 8 uncontaminated tokens to reach the subsequent microservice.

As LLMs increase in size, they can be prone to generate an ever-widening range of biased or toxic outputs, and it can be challenging to anticipate, identify, and control all of these. Because of this, bias and toxicity filtering can be more effective in a microservice architecture built from small LLMs (which exhibits relatively few forms of bias and toxicity) than in some comparative products based on large LLMs.

In FIG. 2A, filter microservice 224 is shown coupled to intermodal LLM 223. Because image or audio inputs to microservice 222 can be uncontrolled, there can be a propensity for output of LLM 223 to be contaminated with undesirable artifacts, and filter microservice 224 can eliminate these undesirable artifacts before they propagate further.

Filter microservice 273 is shown coupled to receive output from core microservice 281a. Because operation of LLMs 285 . . . 286 can be less transparent than other smaller and more specialized LLMs used in other microservices, there can be a risk of introducing undesirable artifacts. Filter microservice 273 can eliminate these artifacts before they propagate.

Each filter microservice 224, 273 can be implemented using an LLM, another trained machine learning module, freestanding procedural program logic, or a combination thereof.

Filters can also be used to prune output. To illustrate, expansion microservice 220 can generate 150 language tokens from a client input. Each of these language tokens can correspond to a respective task for the copilot. A filter microservice can trim these tokens to a threshold number, say 25 tokens, to control the amount of downstream computation. Still further, each of the language tokens can have an associated weight indicating a likelihood that the corresponding task will lead to a desired client output. A filter microservice can perform trimming to retain those language tokens having highest weight. Alternatively, a filter microservice can trim the language tokens so as to meet a desired aggregate likelihood of obtaining a desired client output. To illustrate, the desired aggregate likelihood can be in a range 70%-100%, for example 99%. Similar filtering can be applied at retrieval microservice 230, any data producer, or core microservices 281a-281d. Such filters can be integrated into respective associated microservices or can be implemented as separate stand-alone microservices, using an LLM, another trained machine learning module, freestanding procedural logic, or a combination thereof.

16. Dataflow decisions and Iterations

Various microservices in FIGS. 2A-2C can be configured with the capability to make decisions impacting dataflow. Some decision-making can lead to iterations, e.g. of retrieval microservice 230, of core microservices 281a-281d, or iterations spanning multiple microservices, such as retrieval microservice 230 and core microservices 281a-281d. Some examples have been described herein, and additional dataflow decision-making capabilities can also be implemented. In some examples, several microservices can be organized in a control layer, which can be responsible for ensuring the integrity, relevance, veracity, and quality of microservice inputs and outputs. The control layer can include one or more of: a qualification microservice, a data integrity microservice, an evaluation microservice, a filter microservice, or other protection or security microservice.

17. Transformation and Curation

Transformation and curation subsystem 260 can receive data updates from data repositories 236, 242, 252, 256, or 258. These data updates can be transformed into a form compatible with core subsystem 280 or suitable for use as training records for fine-tuning a copilot or any of its components. The data updates can be curated, e.g. to remove extraneous or duplicate information. To illustrate, extraneous portions of data records, such as email headers, or duplicative content in an email thread, can be removed. Transformation and curation can be performed by procedural logic 262, trained ML tool 264 or a combination thereof. The transformed and curated data records can be maintained in one or more databases 266, and can be provided directly to core subsystem 280.

Whereas SQL database 272 or message database 252, 256, 258 may not be in a form directly usable by core subsystem 280, in some examples document store 236 can be used directly and a corresponding data path to core subsystem 280 is shown in FIG. 2A.

Database 266 can also be used for reinforcement learning. Subsystem 290a can receive data records from subsystem 260, and can apply reinforcement learning to fine-tune components of core subsystem 280, or other copilot components.

18. Reinforcement Learning with Human Feedback (RLHF)

In some examples, reinforcement learning subsystem 290a can incorporate human feedback, e.g. with the assistance of one or more experts 204. RLHF can align copilot or microservice outputs with preferences of humans, such as clients or experts. FIG. 2C shows an example implementation 290 of an RLHF subsystem such as 290a.

Examples of the disclosed technologies can support update or fine-tuning of various microservices or their LLMs through an RLHF subsystem 290. That is, while FIG. 2A shows subsystem 290a applied to core subsystem 280, the RLHF technique is not so limited. The architecture of subsystem 290, or a similar design, can also be applied to fine-tune components of expansion microservice 220, retrieval microservice 230, or data producers 232. RLHF can be triggered internally from an evaluation microservice 209 or 227-229 or from another microservice (not shown) configured to monitor outputs of an evaluation microservice 209 or 227-229.

RLHF can replace a base version 292a of an ML tool with a refined version 292b, with the aid of a reward ML tool which evolves from 294a to 294b. To illustrate, ML tool 292a-292b can be core LLM 285 of core microservice 281a. In FIG. 2C, initialization paths are shown as dotted line arrow.

RLHF subsystem 290 can be triggered multiple times. When triggered, RLHF subsystem 290 can obtain a human-annotated dataset 291 based on human feedback (e.g. from expert 204) to output deemed erroneous or of insufficient quality. Records of dataset 291 can include prompts ("P") and human ratings ("IR") of corresponding output.

Each time RLHF subsystem 290 is triggered, RLHF can be performed in two phases.

In a first phase, base ML tool 292a can be used to initialize reward module 294a (shown by dotted line), and then reward model 294a can be trained to learn ranks for any given response R, while base tool 292a is held fixed. Training record prompts P can be fed to static ML tool 292a to develop responses R, which can be ranked by ranking module 293. The responses R and ranks K can be applied to train reward module 294a to eventually obtained trained reward module version 294b.

In a second phase, reward module 294b can be held fixed, and used to train the target ML tool from base version 292a to refined version 292b. In the second phase, the target tool 294b can be initialized to the base version 292a. Prompts P can be fed to tool 292b to obtain responses R, which in turn can be provided to trained reward module 294b to predict ranks K, which in turn can be used to train tool 294b to generate higher ranking responses R. In some examples, human ratings can also be applied to train tool 294b as shown.

After RLHF is completed, refined ML tool 292b can replace base tool 292a in the copilot.

RLHF is not limited to LLMs but can also be applied to microservices implemented using other forms of machine learning.

RLHF can be applied in various ways. In some examples, a response determined to be incorrect by an evaluation microservice or a human evaluator can be sent to one or more human experts to obtain a desired response, and the associated client input and the desired response can be added to a training dataset for a next phase of incremental fine-tuning. In other examples, a copilot can be instructed to generate a plurality of possible responses to the client input, and a reinforcement learning tool (e.g. an LLM) can be trained to select a desired response (according to a human evaluator) from among multiple choices. The trained reinforcement learning tool can then be used to evaluate responses to further inputs. In further examples, responses can be provided to a client user with a prompt that requests the client user themselves to provide feedback.

19. Caches

Any microservice can be implemented with an accompanying cache of prior inputs and outputs. Thus, if a new input matches a previously encountered input, an output response can be retrieved from the cache. Processing or invocation of child microservices can be substantially reduced.

Example Copilot

Figure 3:
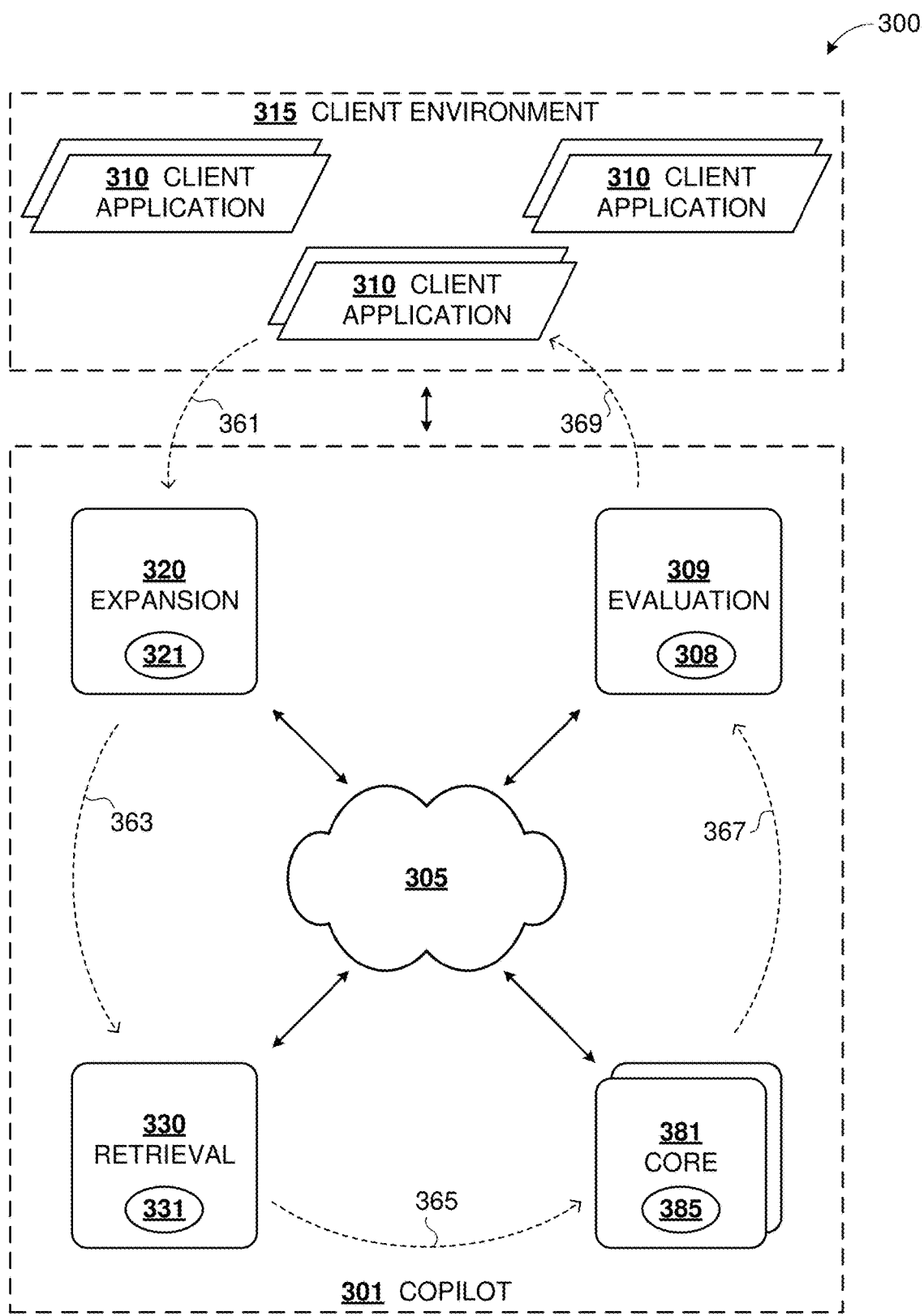
FIG. 3 is a diagram of an example copilot implemented according to the disclosed technologies.

FIG. 3 is a diagram 300 of an example copilot 301 serving one or more first client applications 310 from client environment 315. Copilot 301 can be implemented as software modules executed on one or more hardware processors. The various software modules can implement respective microservices, which can be coupled among themselves to form a weakly connected network. The interconnection between microservices is represented in FIG. 3 by cloud shape 305.

Each microservice can receive input from a first group of microservices comprising one or more other of the microservices, or from one or more second client applications 310. Each microservice can transmit output to a second group comprising one or more other of the microservices, or to one or more third client applications. The first and second group of microservices can be disjoint, can have partial overlap, or can be identical. In some examples, a first client application 310 served by copilot 301 can both provide input to copilot 301 and receive output from copilot 301, but this is not a requirement. In other examples, copilot 301 can receive input from one (second) client application 310 and transmit corresponding output to a different (third) client application 310. In further examples, a client input can result in an update within copilot 301, with no output being provided to any application 310. Still further, copilot operations can sometimes be triggered by an internal event (e.g. a change at a data producer's data repository) leading to an output to one or more (third) applications 310.

Copilot 301 can include expansion microservice 320, retrieval microservice 330, one or more core microservices 381, and evaluation microservice 309, which can be similar to those described in context of FIGS. 2A-2B or elsewhere herein. These or other microservices can incorporate respective trained ML tools (e.g. 321, 331, 385, or 308), including but not limited to LLMs.

Dashed line arrows 361-369 illustrate an exemplary dataflow through copilot 301. As described herein, a network of microservices can support a wide range of dataflows, which can depend on the particular configuration of a given deployment or on the particular input provided to copilot 301. The illustrated dataflow is simplified: each segment 361-369 can invoke one or more other microservices as described herein.

Arrow 361 indicates input from client application 310 to expansion microservice 320. Following expansion, expanded input can be transmitted from expansion microservice 320 to retrieval microservice 330, as shown by arrow 363. Following retrieval augmented generation (RAG), augmented input can be transmitted from retrieval microservice 330 to core microservice(s) 381, as shown by arrow 365. Output from core microservice(s) 381 can be inspected by evaluation microservice 309, as shown by arrow 367. Upon satisfactory evaluation, output can be returned to client application 310 via arrow 369.

Numerous variations and extensions can be implemented within scope of the disclosed technologies. At least one among expansion microservice 320, retrieval microservice 330, one or more core microservices 381 can incorporate an LLM (e.g. 321, 331, 385). Expansion microservice 320 can be configured to receive (361) one or more language tokens and transmit (363) output comprising additional tokens associated with, but distinct from, the received tokens. Retrieval microservice 330 can be configured to receive (363) input, perform RAG by retrieving additional input from one or more data producers (not shown in FIG. 3), and transmit (365) output toward core microservice 381. Retrieval microservice 330 can repeat RAG (e.g. recursively) until a termination condition is satisfied.

The data producer accessed by retrieval microservice 330 can be a database microservice configured to receive an input, retrieve database object(s) relevant to that input, and transmit an output based on the retrieved database object(s). The RAG action can be performed by invoking the database microservice. A database post-processing microservice can transform retrieved database objects from a non-text representation into text, or into a visualization. Alternatively, the data producer accessed by retrieval microservice 330 can be a messaging microservice configured to receive an input, retrieve messages or metadata relevant to that input, and transmit an output based on the retrieved messages or metadata.

Core microservice 381 can incorporate one or more trained ML tools, and can be configured to receive (365) an input, apply at least one of the incorporated ML tools to that input to obtain an output, and transmit (367) that output toward client application 310, e.g. via evaluation microservice 309. The incorporated ML tools can include two tools which are peers trained according to respective levels of client authorization. Core microservice 381 can be configured to selected among these tools according to a level of authorization associated with received input. Core microservice 381 can incorporate one or more long-term memories, each maintaining history for a respective client entity. Core microservice 381 can be configured to determine whether to request a clarification regarding at least a portion of received input, and issue such a request toward a source microservice from which the input was received.

Evaluation microservice 309 can be configured to receive (367) input comprising output from another microservice (e.g. core microservice 381), analyze the received input, and invoke one or more microservices based on the analysis. To illustrate, unsuccessful evaluation by microservice 309 can result in another invocation of expansion microservice 320, retrieval microservice 330, or core microservice 381. Copilot 301 can include another evaluation microservice (similar to 227 or 228 of FIG. 2A, not shown in FIG. 3) whose input is based on output from a data producer, analysis of which can lead to a determination whether retrieval microservice 330 is to perform another RAG iteration. As described above, successful evaluation can transmit (369) output to client application 310.

Copilot 301 can incorporate an intermodal microservice (222) configured to receive input tokens in a first mode and transmit output tokens in a second mode distinct from the first mode.

The data producer accessed by retrieval microservice 330 can include an embedding microservice (237) configured to receive input from retrieval microservice 330 and transmit output comprising vector embedding(s) representative of the received input. The data producer can include a document microservice (234) storing documents in a repository (236) according to an index (238) of vector representations. The document microservice can be configured to receive an input, and return an output comprising one or more documents similar to the received input. The RAG action can be performed by invoking the embedding microservice and the document microservice.

Data objects returned to retrieval microservice 330 can include email, voicemail, text messages, instant messages, video messages, multi-mode messages, or attachments thereto.

Copilot 301 can include a qualification microservice (270) configured to receive an input, compare the received input with a graphical model of a knowledge corpus incorporated in copilot 301, and determine whether the copilot is competent to act on the received input. If competent, then the qualification microservice can transmit an output, based on the received input, toward core microservice 381. If not competent, then the qualification microservice can transmit a notification indicating the lack of competence.

The one or more core microservices 381 can include an ensemble of core microservices. Each core microservice of the ensemble can be trained for a respective cognitive function, at least two of which are distinct. The ensemble of core microservices 381 can include a cycle, some member(s) of which (e.g. 281*c*) can receive input from an upstream neighbor core microservice (281*b*), apply at least one trained ML tool to that input to obtain a corresponding output, and transmit that output to a downstream neighbor core microservice (281*d*).

Examples of copilot 301 can perform causal reasoning with a total parameter count under 150 billion. Copilot 301 can exhibit emergent behavior. Further examples of copilot 301 can be implemented on a single CPU chip coupled to a single GPU chip.

Copilot Operation—Example Method

Figure 4:
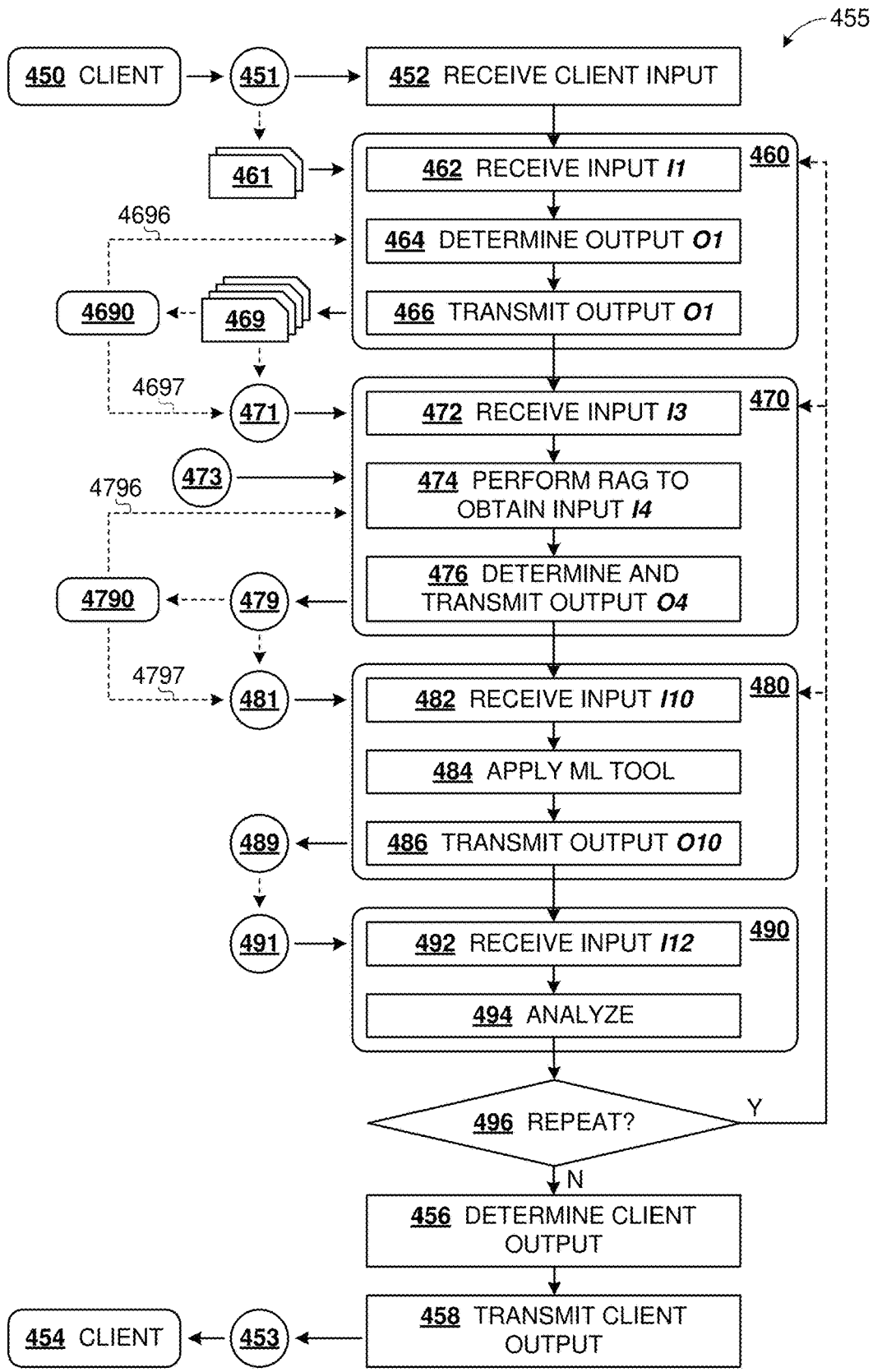
FIG. 4 is a flowchart of an example method of copilot operation according to the disclosed technologies.

FIG. 4 is a flowchart 455 of an example method according to the disclosed technologies. In this method, a copilot processes a client's input to generate an output to the client. To assist with the description, FIG. 4 also indicates data items (shown as circles or beveled rectangles) and microservices (rectangles with rounded corners) associated with various process blocks (rectangles with square corners, or diamond shape for decision blocks). Two client entities are also shown.

At process block 452, input ("client input" 451) can be received from a client 450.

Expansion microservice 460 can be invoked and the method can proceed to process block 462, where first input I1 461 can be received. Input I1 461 can comprise or be derived from client input 451, as indicated by dashed arrow, and can include one or more language tokens shown in the shape of punch cards. At process block 464, output O1 469 can be determined, including tokens associated with, but different from, tokens 461. In examples, input tokens 461 can also be included among output tokens 469. At process block 466, output O1 469 can be transmitted toward retrieval microservice 470.

Retrieval microservice 470 can be invoked and the method can proceed to block 472, where third input I3 471 can be received. Input I3 471 can include or be derived from output O1 469. At process block 474, retrieval augmented generation (RAG) can be performed, to retrieve fourth input I4 473 including one or more data objects related to the third input, from one or more data producers. At process block 476, output O4 479 can be determined and transmitted toward core microservice 480. Output O4 479 can be include or be based on inputs I3 471 and I4 473.

Core microservice 480 can be invoked and the method can proceed to block 482, where tenth input I10 481 can be received. Input I10 481 can include or be derived from output O4 479. At block 484, at least one trained ML tool of core microservice 480 can be applied to the tenth input to determine tenth output O10 489. At block 486, output O10 489 can be transmitted toward evaluation microservice 490.

Evaluation microservice 490 can be invoked and the method can proceed to block 492, where twelfth input I12 491 can be received. Input I12 491 can include or be derived from output O10 489. At block 494, input I12 491 can be analyzed, e.g. to determine its accuracy, relevance, or completeness with respect to client input 451.

At decision block 496, a determination can be made, based on analysis results from block 494, whether to further invoke expansion microservice 460, retrieval microservice 470, or core microservices 480. If the determination is in the affirmative, the method can follow the Y branch from block 496 back to microservices 460, 470, or 480 in varying examples. Otherwise, the method can follow the N branch from block 496 to block 456, where output for the client ("client output") 453 can be determined, e.g. based on output O10 489. At block 458, output 453 can be transmitted to client 454. Clients 450, 454 can be the same or distinct.

Numerous variations and extensions can be implemented within scope of the disclosed technologies. In various examples, microservices 460, 470, 480, 490 can have features described elsewhere herein for similar microservices, e.g. in context of FIGS. 2A-2C. Additionally, the method can extend to the invocation of one or more data producers, intermodal microservices, qualification microservices, or filter microservices as described in context of FIGS. 2A-2C, FIG. 3, or elsewhere herein. The trained ML tool applied at block 484 can be an LLM, LMM, or DNN.

In further examples, output O1 of expansion microservice 460 can be analyzed by evaluation microservice 4690 prior to delivery as input I3 of retrieval microservice 470. That is, output 469 can optionally be forwarded to evaluation microservice 4690. If a predetermined condition is met, output 469 (or another input 471 derived from output 469) can be forwarded to retrieval microservice 470 via path 4697. The predetermined condition can relate output 469 to input 461 or the copilot's domain of competence. Otherwise, if the predetermined condition is not satisfied, a message can be returned via path 4696 to expansion microservice 460 for generation of additional output O1.

Similarly, output O4 of retrieval microservice 470 can be analyzed by evaluation microservice 4790 prior to delivery as input I10 of core microservice 480. That is, output 479 can be forwarded to evaluation microservice 4790. If another predetermined condition is met, output 479 (or another input 481 derived from output 479) can be forwarded to core microservice 480 via path 4797. This predetermined condition can relate output 479 to input 471, output 469, or the copilot's domain of competence. Otherwise, if the predetermined condition is not satisfied, a message can be returned via path 4796 to retrieval microservice 460 for generation of additional input I4 or output O4.

Copilot Customization—First Example Method

Figure 5:
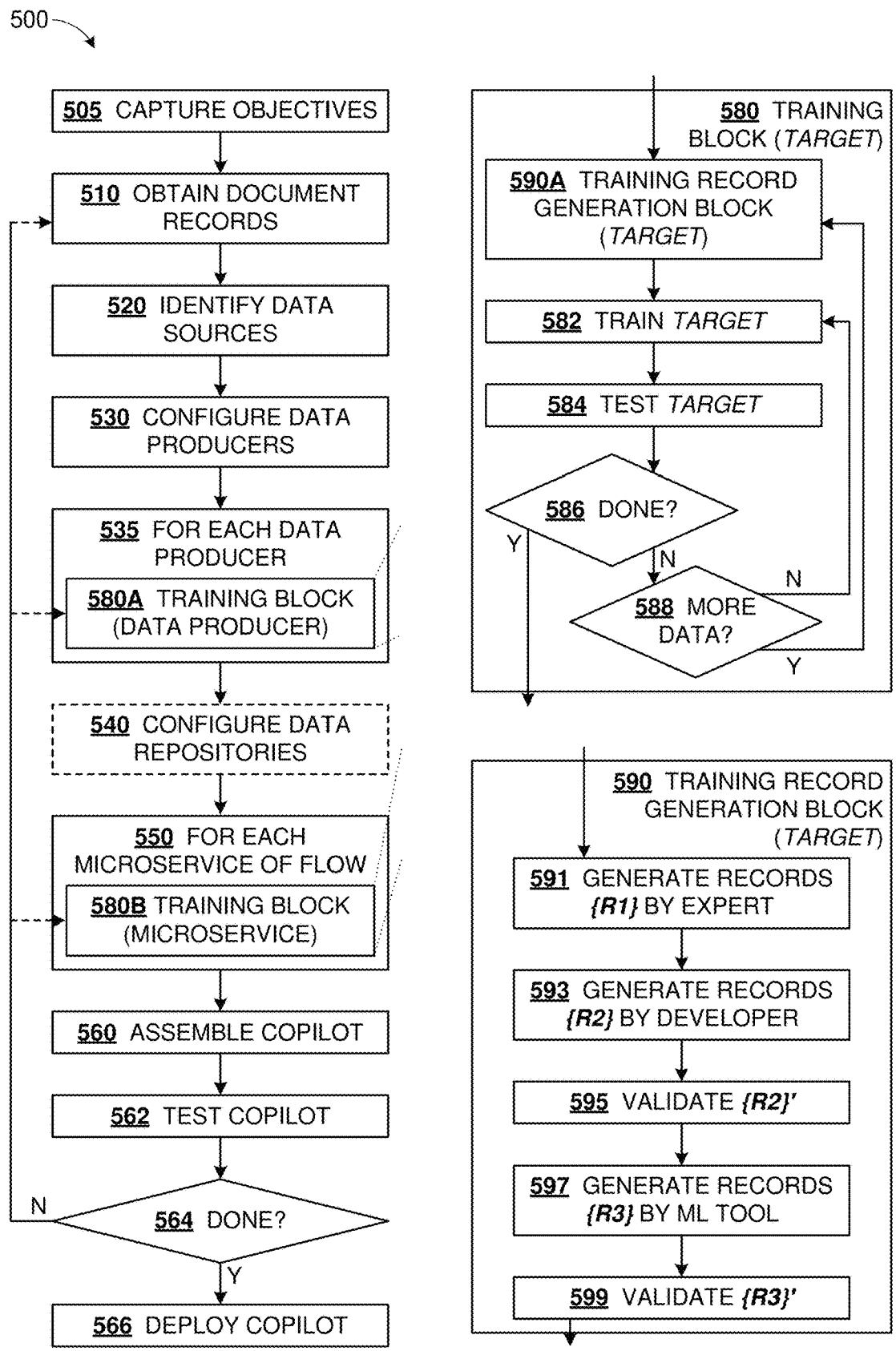
FIG. 5 is a flowchart illustrating a first example customization method according to the disclosed technologies.

FIG. 5 is a flowchart 500 illustrating a first example method for copilot customization. In this method, modules of a copilot are configured, trained, and assembled, based on copilot objectives and associated document records. The copilot is tested and deployed. The copilot can be organized as a network or microservices similar to that described in context of FIGS. 1, 2A-2B, or elsewhere herein.

At process block 505, copilot objectives can be captured. The objectives can take the form of exemplary questions the copilot is intended to answer, or other description of tasks the copilot is expected to perform.

At block 510, one or more document records are obtained, each document record pertinent to one or more of the client objectives. Illustratively, a document record can be an email thread relevant to the objective, but this is not a requirement. Meeting transcripts, presentations, and other document forms can also serve as document records. Formally, "relevance" or "pertinence" can be evaluated based on e.g. a similarity score exceeding a predetermined threshold, e.g. between a candidate document record and a copilot objective, between portions thereof, or between two other data objects, but this is not a requirement, and relevance can also be determined based on experience by an expert or by a trained ML tool. As described further herein, FIG. 13 depicts an example document record in the form of a meeting transcript.

At block 520, one or more data sources supporting the document record(s) can be identified. To illustrate, a document record can describe or reference a piece of information contained in a database table or other document, and such table or document can be identified as a data source at block 520. In some examples, a document record can contain both a parameter (e.g. "delivery delay") and its value (e.g. "2 days") while in other examples, the document record can discuss delivery delays without providing any particular values. In either case, a data table or other document containing values for the delivery delay parameter can be identified as a data source.

In order to provide access to live data sources, at block 530, one or more data producers can be configured to provide interface(s) to respective data source(s). Thus, a copilot can access such data source(s) through the data producer(s).

Data producers can incorporate LLMs, LMMs, or other microservices to interface between e.g. text mode communication among copilot microservices and an API (e.g. SQL) recognized by the data source. It can be beneficial to fine-tune these interfacing microservices for better performance with the specific data source(s). Block 535 describes a loop over the data producer(s) configured at block 530, and for each data producer, block 580A performs a first training regimen on the data producer. Performing the training regimen on the data producer can be performed on a single component of the data producer, on multiple components, or on the entire data producer. Illustratively, training can be performed on an input-side interface microservice (e.g. text-to-table ##), on an output-side interface microservice (e.g. table-to-text ## or table to other document), and/or on the complete data producer (e.g. input text to output text-or-document ##). Because of specialized knowledge required for certain data source API's, input side training and output side training can be performed under developer guidance, and a further round of end-to-end training or testing (e.g. inputted text to outputted text) can be performed under expert guidance. Further details of an example training regimen are described below.

Other data source(s) identified at block 530, such as historical archived data, may not be live. It can be computationally more efficient to integrate such data as static data (subject to occasional update) in a data repository. Accordingly, at block 540, some data source(s) can be integrated into a data repository. Some data sources may already be in text form. Other data sources can be cast into text. Illustratively, database tables relevant to a document record can be cast into tabular text mode data, into charts, or into descriptive (non-tabular) text. Block 540 can be optional, and accordingly is shown in dashed outline.

Similar to fine-tuning of data producers, various other copilot microservices (shown e.g. in FIG. 1) can also be fine-tuned. Accordingly, block 550 can iterate over each of a plurality of microservices in a copilot flow and, at block 580B, a second training regimen can be performed on the respective microservice.

At block 560, the fine-tuned data producer(s) and fine-tuned microservices can be assembled into a copilot. In some examples, this can entail hooking the components together so that each has names or addresses (or other awareness) of other components, and the components are thereby able to communicate. In other examples, some or all of the components can already be linked together, and the assembly at block 560 can entail switching the various fine-tuned components from a training mode to an inference mode. Assembly can include any data repositories configured at optional block 540 and microservices not requiring customization.

At block 562, the copilot can be tested, and at decision block 564 a decision can be made whether customization is complete, e.g. whether the copilot satisfies a predetermined performance criterion. If yes, the method can follow the Y branch from block 564 to block 566, at which the copilot can be deployed. However, if customization is not complete, e.g. the performance criterion is not met, the method can follow the N branch from block 564 to do additional work at one or more prior process blocks, e.g. returning to block 510, 580A, or 580B. For example, the copilot's scope can be expanded by obtaining additional document records at block 510, or additional training can be performed at block 580A or 580B, following which the method can eventually return to (repeat) test block 562. The method can continue iterating until the performance criterion is met and, following the Y branch from block 564, the copilot can be deployed at block 566.

Numerous variations and extensions can be implemented within scope of the disclosed technologies, some of which have already described above.

Inset block 580 illustrates a training block which can be used in some examples to implement training regimen 580A or 580B. Thus, a similar training regimen 580 can be applied to data producers or other microservices, generically termed the target of training block 580. Initially, at block 590A, training records can be generated. These training records can be partitioned into disjoint subsets. At block 582, a first subset can be applied to train the target and at block 584, a second subset can be applied to test the target. A second performance criterion can be used to determine whether training is complete. Thus, at decision block 586, a determination can be made whether the training is complete, e.g. whether the second performance criterion is met. If the second criterion is met, the training is complete and the method can follow the Y branch from block 586 out of block 580. Otherwise, additional training can be performed with the same training data or with additional training data.

To illustrate, multiple iterations of block 582 with the same training data can gradually improve performance of the training target, but can also asymptotically approach a limit or even decrease performance, in which case additional training data can be required. At decision block 588, a third criterion can be used to determine whether additional training data is needed. If no, the method can follow branch N from block 586 back to block 582 for additional training with the same training data. Otherwise, the method can follow the Y branch to block 590A to obtain additional training records, which can be used to train and test the target at another iteration of blocks 582, 584. Illustratively, the third criterion can be: whether a most recent iteration of test block 584 shows an improvement over a previous iteration below a predetermined threshold. Measuring test performance on a scale 0-100%, the predetermined threshold can be in a range 1-20% or 2-10%. If the test improvement is below this threshold, then additional training data may be needed.

Inset block 590 illustrates a training record generation block for training the target, which can be used in some examples to implement training regimen 590A. A training record can include an input to the target and a desired response. At block 591, seed training records {R1} can be generated by an expert. At block 593, a person distinct from the expert (e.g. a copilot developer) can generate candidate training records {R2}, a subset of which {R2}'⊆{R2} can be validated at block 595. At block 597, a trained ML tool can be used to synthesize additional training records {R3}, a subset of which {R3}'⊆{R3} can be validated at block 599. In varying examples, one or more of {R1}, {R2}, {R3} can be omitted along with corresponding process blocks. In some examples at least one of {R1} or {R2}' are generated, in addition to {R3}'. Validation at blocks 595, 599 can be performed by the expert, or by a trained ML tool. This validation tool can be integrated with a tool synthesizing training records {R3} at block 597.

The deployed copilot can be configured to receive input from a client and process the input (e.g. using at least some of the microservices fine-tuned at block 580B and data producer(s) fine-tuned at block 580A) to obtain a result, which can be transmitted to the client.

As shown in FIG. 1, the assembled copilot can include an expansion microservice (171), a retrieval microservice (172), a qualification microservice (173), a core microservice (174), an evaluation microservice (176), or a protection microservice (175), generally as described herein.

At block 560, these modules can be coupled among themselves, and to client interface 110, as shown in FIG. 1.

Block 510 can be partially or wholly automated. A trained ML tool can be prompted to identify candidate document record(s) pertinent to one or more of the copilot objectives. The candidate document record(s) can be received from the trained ML tool, and a subset of the candidate document record(s) can be validated as some or all of the document record(s) obtained at block 510.

Block 520 can be partially or wholly automated. A trained ML tool can be prompted to identify candidate data source(s) supporting the document record(s). The candidate data source(s) can be received from the trained ML tool, and a subset of the candidate data source(s) can be validated as some or all of the data source(s) identified at block 520.

In some examples, a data source identified at block 520 may not have a suitable pre-existing data producer. To illustrate, the data source may be in a language other than English, for which translators and data producers have not yet been developed. In such case, a data producer can be built at block 530.

In additional examples, a data source linked to a data producer can be a copy of a subset of a master data source in the target corpus. The subset can incorporate a most recent time period of the master data source, and older data can progressively be translated (if necessary) and moved to a data repository. Because a data repository can sometimes be accessed more efficiently than a data producer, such an approach can increase computational efficiency. In further examples, only a portion of the master data source may be relevant to the copilot objectives or document records, and other portions can be omitted from the data producer's copy.

Still further extensions and variations can be applied to the method of FIG. 5, as described in context of FIGS. 6-12, other Figures, customization in support of interviews (FIGS. 14-21) or recorded work sessions (FIGS. 23-29), or elsewhere herein.

Copilot Customization—Second Example Method

Figures 6, 7:
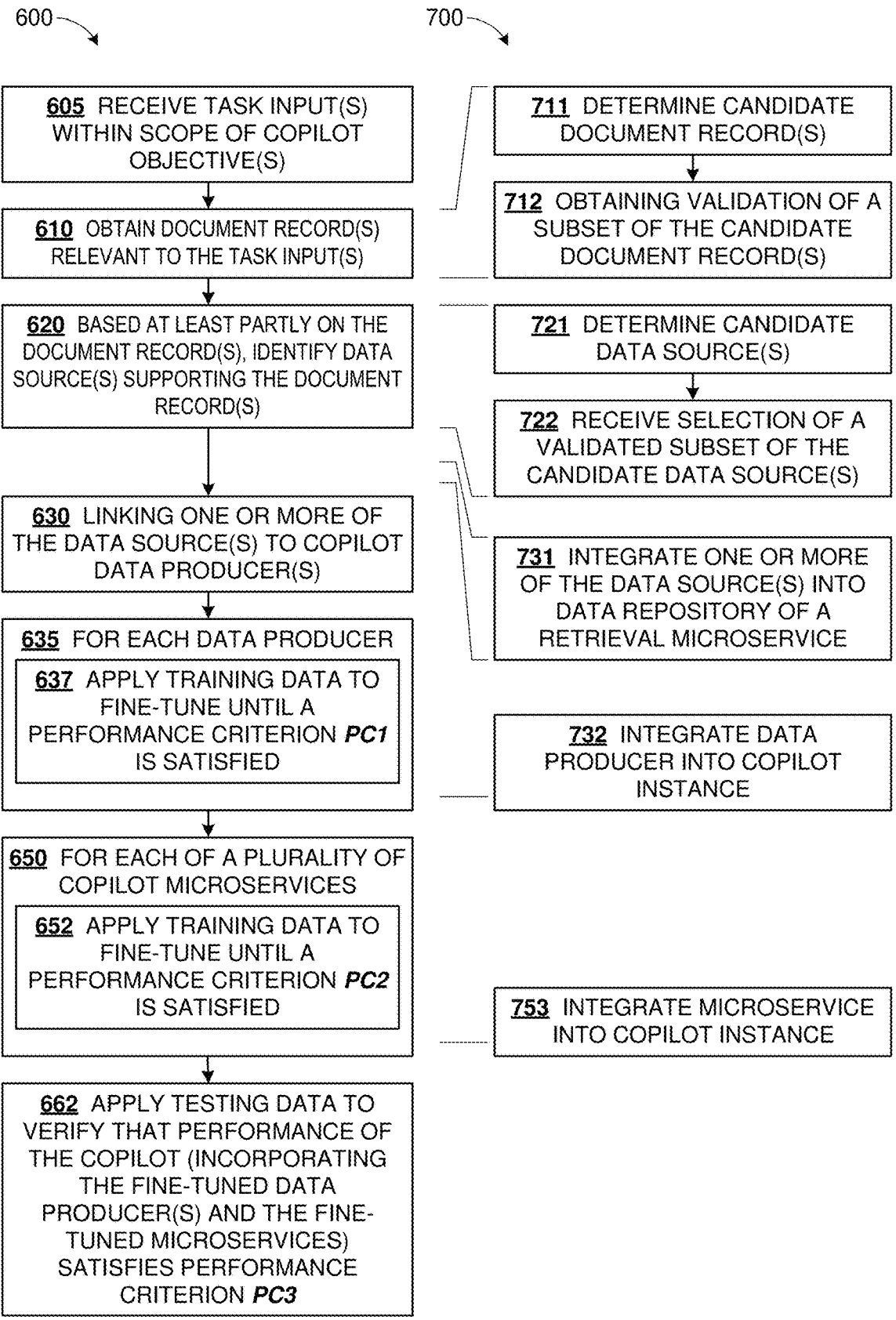
FIG. 6 is a flowchart illustrating a second example customization method according to the disclosed technologies.
FIG. 7 is a diagram illustrating example variations and extensions of the method of FIG. 6, according to the disclosed technologies.

FIG. 6 is a flowchart 600 illustrating a second example method for copilot customization. This method can be performed by one or more computers. In this method, modules of a copilot are configured, trained, and assembled, based on copilot tasks and associated document records. The copilot is tested and, upon satisfying a performance criterion, can be used for inference.

At process block 605, one or more task inputs can be received. The task inputs can be within scope of respective copilot objective(s). Illustratively, the task inputs can be questions, or other prompts for which the copilot is expected to provide competent response.

At process block 610, one or more document records can be obtained which are relevant to the task input(s). In some examples, the document record(s) can be directly identified by the computer(s) performing the instant method, e.g. using a trained ML tool or other data mining technique to retrieve the document record(s) from a target corpus. In other examples, the document record(s) can be obtained from a client, e.g. via a GUI. In further examples, the document record(s) can be synthesized, e.g. by a trained ML tool. As described further herein, FIG. 13 depicts an example meeting transcript which serve as a document record. At process block 620, one or more data sources can be identified based at least partly on the document record(s), as data sources which the document record(s) rely on.

At block 630, one or more of the identified data source(s) can be linked to respective data producer(s). Loop block 635 indicates that the enclosed block is performed for each of the data producer(s). Thus, at block 637, training data is applied to fine-tune the instant data producer until a first performance criterion PC1 is satisfied. Illustratively, a variation of training regimen 580 of FIG. 5 can be used, but this is not a requirement. Training records can be obtained, e.g. from a user or repository, instead of being generated at block 590A, although some training records can also be synthesized.

Loop block 650 indicates that the enclosed block is performed for each of a plurality of microservices of a copilot instance, e.g. as shown in FIG. A1A-A1B or 1, or described elsewhere herein. Thus, at block 652, training data is applied to fine-tune the instant microservice until a second performance criterion PC2 is satisfied. Illustratively, a variation of training regimen 580 of FIG. 5 can be used, but this is not a requirement. Training records can be obtained, e.g. from a user or repository, instead of being generated at block 590A, although some training records can also be synthesized.

At block 662, testing data can be applied to the copilot instance (incorporating the fine-tuned data producer(s) and fine-tuned microservices) to verify that its performance satisfies a third performance criterion PC3.

The copilot instance can be configured to receive new task inputs within scope of the copilot objective(s) and, in response, generate and deliver corresponding outputs in accordance with those copilot objective(s). Task inputs can be received from a client interface similar to 110 of FIG. 1, and the outputs can be delivered to the same client interface.

Numerous variations and extensions can be implemented within scope of the disclosed technologies. Some variations and extensions are illustrated in FIG. 7, diagram 700. FIG. 7 is presented as a series of process blocks which can be introduced into FIG. 6 at respective positions indicated by lead lines.

In some examples, block 610 can implement blocks 711, 712. At block 711, one or more candidate document records relevant to the task input(s) can be determined and, at block 712, validation of a subset of the candidate document record(s) can be obtained. Thus, the validated subset can form all or part of the document record(s) obtained at block 610.

In some examples, block 620 can implement blocks 721, 722. At block 721, one or more candidate data sources relevant to the document record(s) can be determined and, at block 722, validation of a subset of the candidate data source(s) can be obtained. Thus, the validated subset can form all or part of the data source(s) identified at block 620.

In further examples, some data source(s) identified at block 620 can be integrated at block 731 into a data repository (similar to 178 of FIG. 1) instead of a data producer. The data repository can be coupled to a retrieval microservice (172) of the copilot instance. This can be suitable for static or infrequently updated data.

In some examples, data producer(s) or other microservices can be fine-tuned in a sandbox or development environment separate from the copilot instance being customized. Then, at block 732 (after block 637 within loop block 635), a fine-tuned data producer can be integrated into the copilot instance. Similarly, at block 735 (after block 652 within loop block 650), a fine-tuned microservice can be integrated into the copilot instance.

Example Dataflow Diagram

Figure 8:
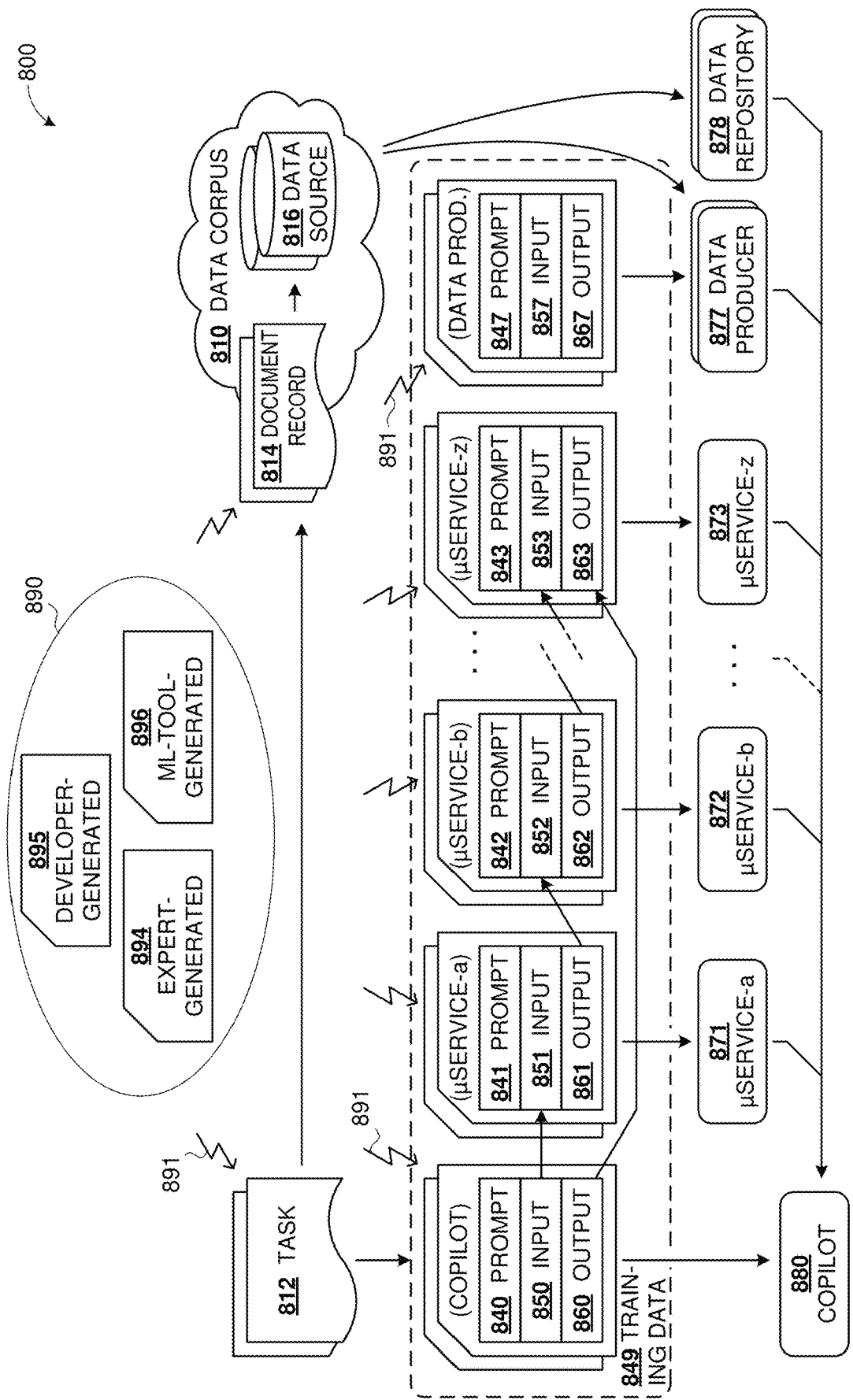
FIG. 8 is a dataflow diagram illustrating an example of copilot customization according to the disclosed technologies.

FIG. 8 is a dataflow diagram 800 illustrating an example of copilot customization. This dataflow begins with tasks 812 and ends with a customized copilot 880.

Initially, tasks 812 can be used to obtain document records 814. As described further herein, FIG. 13 depicts an example document record in the form of a meeting transcript. In varying examples, document records 814 can be provided by an expert, extracted from corpus 810 by a developer or trained ML tool, or synthesized by another trained ML tool, in any combination. That is, some document records may be retrieved from corpus 810, while others may not. Obtaining document records corresponds e.g. to block 510 of FIG. 5, block 610 of FIG. 6, or FIG. 10 (1015) described below.

Document records 814 can be used to identify data sources 816, which can be part of corpus 810. In varying examples, document records 814 can be identified by an expert, a developer, or a trained ML tool, in any combination. Identifying data sources corresponds e.g. to block 520 of FIG. 5, block 620 of FIG. 6, or FIG. 10 (1025). Some static or slowly updating data sources 816 can be integrated into data repository 878 (similar to 178 of FIG. 1), as described in context of blocks 540 or 731. Other data source(s) 816 can be coupled to or integrated with data producer(s) 877

Dashed outline 849 shows assorted training data used to customize components 871-873 and 877 of copilot 880. Initially, copilot training input 850 can be extracted from task 812. Illustratively, a task can be a question "how many widgets did we manufacture last month?" and this can be replicated as input 850. A corresponding output 860 can be provided by an expert or a developer. Additional input-output pairs 850, 860 can be derived by a software tool, e.g. by examining records or data items in data sources 816.

Shown in FIG. 8 are training records for each of microservices 871-873 and data producer 877. Thus, microservice-b 872 has training records, each with prompt 842, input 852, and desired output 862, and similarly for the other training targets.

Training records 849 can be bootstrapped, as indicated by inset 890 and zig-zag arrows 891. A few training records (either input-output pairs or desired outputs) 894 can be provided by a domain expert (illustratively numbering 5-50, or 10-30), additional training records 895 can be provided by a developer (illustratively numbering 10-200, or 20-100), and further training records 896 can be synthesized by a trained ML tool. Bootstrapping can be applied to any of the training records marked by zig-zag arrows 891, and can also be applied to generate tasks 812 or document records 814.

Because of the sequential nature of at least portions of the processing flow shown e.g. in FIG. 1, desired outputs 861 of training records for microservice-a 871 can be used as inputs 852 of training records for a next microservice-b 872, and similarly for other microservice pairs. To illustrate, expansion microservice 871 can be trained to provide expanded output 861 based on client input 850, 851, and retrieval microservice 872 can use expanded output 861 as training input 852. However, some microservices can have independent training records, as shown for data producer 877. Combinations of independent and chained training records can also be used. A first microservice-a 871 in a flow can have training inputs 851 which are the same, or partially overlap, training record inputs 850 for the overall copilot. Additionally or alternatively, the last microservice-z 873 in a flow can have training outputs 863 which are the same, or partially overlap, training record outputs 860 for copilot 880. In all cases, however, training records used for testing can be distinct from training records used for training.

Certain input-output pairs may be accompanied by a prompt 840-843, 847 which contains additional instruction for copilot 880, microservice 871-873, or data producer 877 as to what kind of response (e.g. outputs 860-863, 867) is sought for input 850-853, 857. In varying examples, prompts 840-843, 847 can be fixed or can be generated using a rules-based technique (e.g. similar to DSPy), by a trained machine learning tool, or manually, in any combination. In examples, a given training record input 850-853, 857 can be classified according to rules, and a prompt can be selected based on that classification. Prompts can be modified over the course of training iterations as shown e.g. in block 580.

Fine-tuned microservices 871-873, data producer(s) 877, and data repository 878 can be part of, or can be integrated into, copilot 880. The copilot training records (840, 850, 860) can be used to test copilot 880, e.g. as described for blocks 562, 662.

Example Document Record

FIG. 13 depicts an example meeting transcript 1300 which can serve as a document record. Transcript 1300 is a record of a meeting between an aircraft manufacturer UAM and their customer NT Airlines. Dialog passages are numbered 01-13 for convenience of description.

Initially, meeting transcript 1300 can be relevant to a copilot objective to monitor or address delivery delays (e.g. based on "delivery delays" at passage 05) or another copilot objective to monitor customer requirements (e.g. based on "wishlist" at passage 08). Thus, transcript 1300 can be identified as a document record, e.g. at block 510 of FIG. 5, block 610 of FIG. 6, or block 1204 of FIG. 12.

In some examples, transcript 1300 can provide answers to certain questions (tasks). To illustrate, a question "how can delivery delays be addressed?" is answered at passage 05, through "local logistics providers" or "regional assembly capabilities." Alternatively, a question "what customization options are anticipated?" has answers at passage 07: "cabin configurations" and "in-flight entertainment systems." Thus, given either of these questions as a training task (812 of FIG. 8), transcript 1300 can be identified as a document record (814) as described in context of FIG. 8.

In further examples, document record 1300 can be used to identify corresponding data sources, similar to blocks 520, 620, or 1206. To illustrate, "local logistics providers" (passage 05) can lead to identification of provider directories for inclusion in a data repository or data producer microservice for an instant copilot. As another illustration, "cabin configurations" (passage 07) can lead to identification of databases, or other documentation for manufacturing builds, as data sources.

Meeting transcript 1300 is exemplary—as described herein, many other types of document records can be similarly applied.

Progressively Refined Training—Example Method

Figure 9:
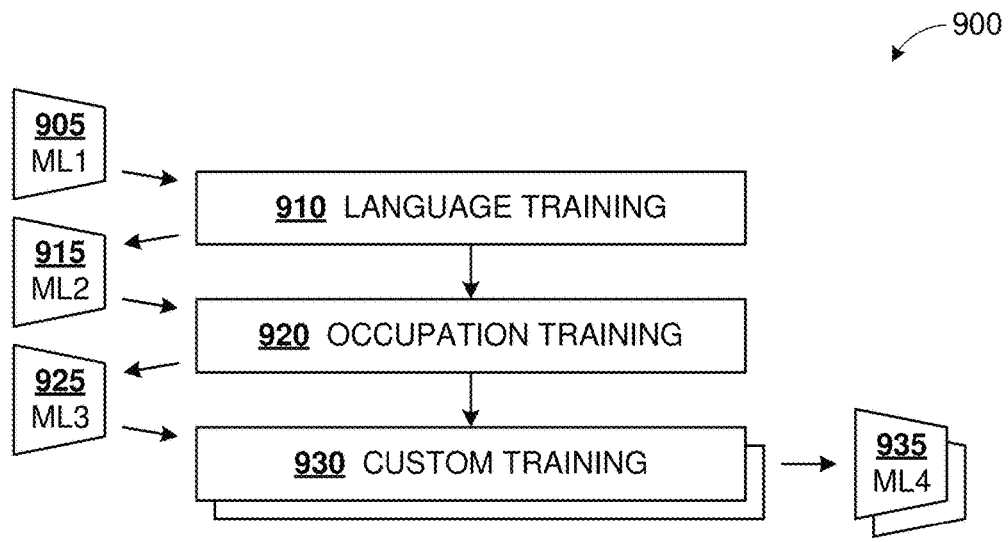
FIG. 9 is a flowchart illustrating an example method for progressively refined training of a machine learning tool according to the disclosed technologies.

FIG. 9 is a flowchart 900 illustrating an example method for progressively refined training of a machine learning tool. In this method, successive training phases refine the tool capabilities. An underlying concept is that multiple customized deployments can share similar or related objectives, while having their own individual characteristics. The commonality between such objectives across deployments is dubbed an "occupation." Illustratively, copilots can be used to perform certain tasks associated with human occupations such as engineers, market analysts, or customer service representatives. The effort and computation burden required for occupational training can be shared among multiple custom deployments within that occupation. Particularly, a single occupation-trained ML tool can be used to train multiple custom ML tools for respective distinct deployments. Moreover, successively narrowing training phases commonly require correspondingly less training data or computation time. Illustratively, 10 computation hours of occupational training and 10 customizations of 1 hour each can result in 10 customized ML tools in 20 hours of computation, for an average of 2 hours for each customized tool. In comparison, doing occupation and custom training separately for each tool would require 10×(10+1)=110 computation hours. Thus, an occupation-trained machine learning tool can reduce the overall effort and computational burden required to customize the machine learning tool for a particular deployment. The method of FIG. 9 can be applied for copilot microservices, e.g. as shown in FIG. 1, individually or in groups (including an entire copilot) and can also be applied to auxiliary tools such as used in FIG. 10 below.

At process block 910, tool ML1 905 can be trained to perform general language tasks with at least a first predetermined performance level. Resulting tool ML2 915 can be dubbed a "language-trained" ML tool. At process block 920, language-trained tool ML2 915 can be trained to perform general tasks of a given occupation with at least a second predetermined performance level. Resulting tool ML3 925 can be dubbed an "occupation-trained" ML tool.

At process block 930, occupation-trained tool ML2 can be trained to perform custom tasks of the given occupation with at least a third predetermined performance level. Resulting tool ML4 935 can be a customized ML tool. Process block 930 can be repeated multiple times as indicated, for respective customized copilots, to generate respective customized ML tools 935.

In variations, any one or more of blocks 910, 920, 930 can be omitted from the instant method.

Example Usage of Customized ML Tools

Figure 10:
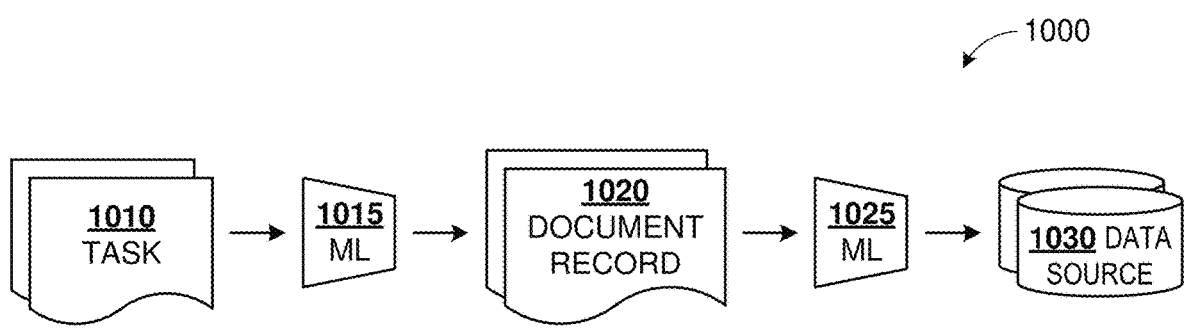
FIG. 10 is a diagram illustrating example usage of trained machine learning tools according to the disclosed technologies.

FIG. 10 is a diagram 1000 illustrating example usage of trained machine learning tools to aid in obtaining document record(s) or identifying data source(s) as discussed in context of blocks 510, 520 of FIG. 5 or blocks 610, 620 of FIG. 6.

Task(s) 1010 can be input to trained ML tool 1015 to obtain document record(s) 1020. In some examples, tool 1015 can be trained to retrieve pertinent document record(s) from a corpus similar to 810 of FIG. 8. In other examples, tool 1015 can be trained to synthesize new document record(s) not present in the corpus.

Document record(s) 1020 can be inputted to trained ML tool 1025 to identify data source(s) 1030, which can be data source(s) within the corpus, or external data source(s). In some examples, document record(s) 1020 or data source(s) 1030 can be validated prior to use.

Tools 1015, 1025 can be generated using the method of FIG. 9, but this is not a requirement, and other training methods can also be used.

Fine-Tuning Copilot Components—Example Method

Figure 11:
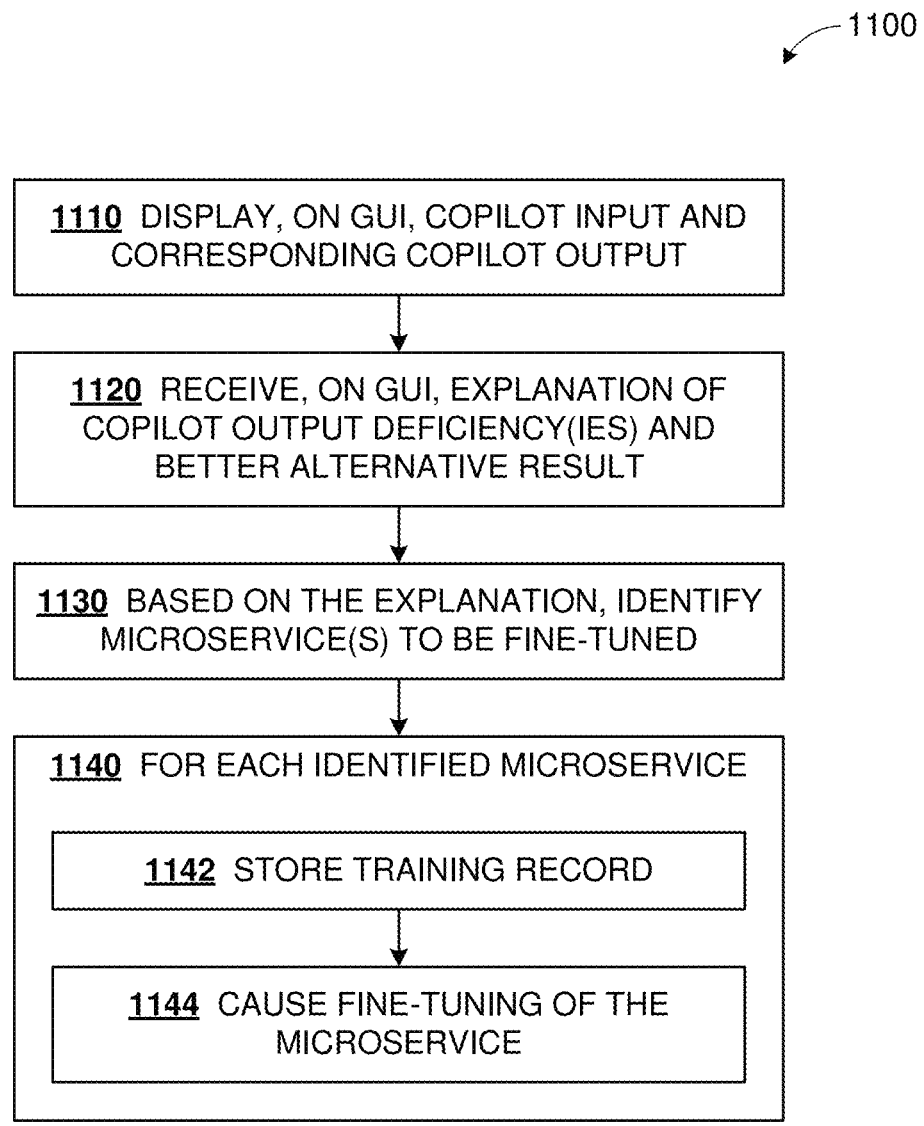
FIG. 11 is a diagram illustrating an example method for fine-tuning copilot components according to the disclosed technologies.

FIG. 11 is a diagram 1100 illustrating an example method for fine-tuning copilot components. This method can be used to monitor, maintain, or improve performance of a copilot customized according to the disclosed technologies. The method can be performed on one or more computers.

Initially, at process block 1110, a copilot input and a corresponding copilot output can be displayed on a GUI, the combination of input and corresponding output being dubbed a "copilot transaction." In varying examples, all copilot transactions, a random selection of copilot transactions, or selected copilot transactions can be displayed. For example, transactions evaluated as unsatisfactory by evaluation microservice 176 can be displayed, while transactions evaluated as satisfactory can be omitted. A predetermined evaluation threshold can be used for the selection.

On the GUI, two user inputs can be received at block 1120: (1) an explanation of one or more deficiencies of the displayed output and (2) an alternative result that improves on the one or more deficiencies. Had the alternative result been output by the copilot instead of at least a deficient portion of the actual output, a better evaluation of the copilot output could have been obtained. Illustratively, these user inputs can be provided by a domain expert.

Based at least partly on the explanation, one or more microservices in the copilot (e.g. as shown in FIG. 1) can be identified for further training at block 1130. Illustratively, evaluation of the explanation can variously lead to determination that (a) the output is outside the copilot's domain of expertise, based on which qualification microservice (173) can be identified for additional training; (b) the output misses key terms in the alternative result, based on which expansion microservice (171) and retrieval microservice (172) can be identified for additional training; or (c) the output contains confidential information, based on which protection microservice (175) can be identified for additional training.

Iteration block 1140 can execute enclosed process blocks 1142, 1144 for each identified microservice. A training record can be stored at block 1142, the training record including the input and the alternative result. At block 1144, the microservice can be fine-tuned using the training record. In examples, the training record can be queued, e.g. with additional training records, for a next batch of incremental training.

Numerous variations and extensions can be implemented within scope of the disclosed technologies, some of which have been described above.

Collected Aspects of Customization—Example Flowchart

Figure 12:
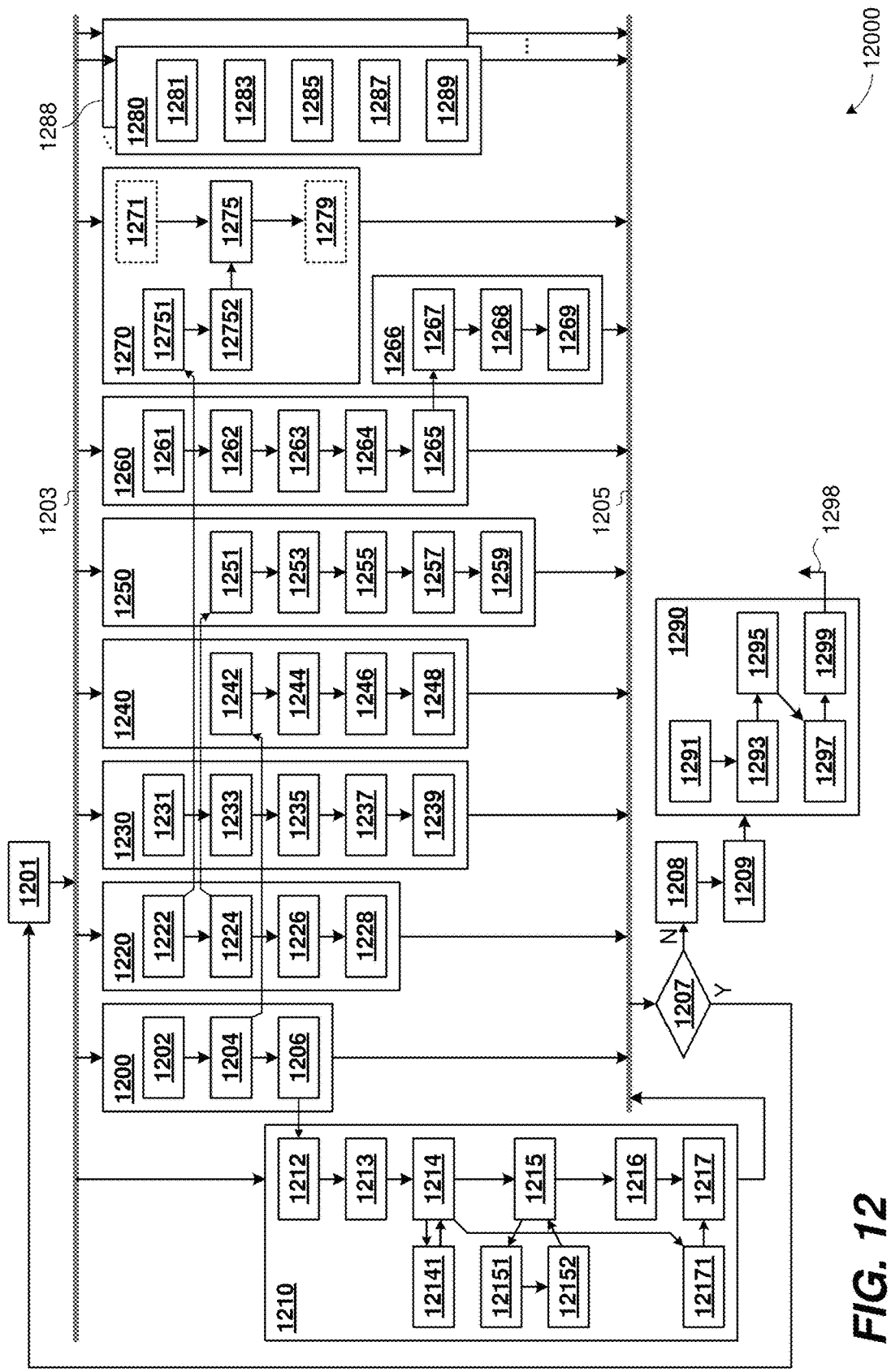
FIG. 12 is a flowchart illustrating collected example aspects of copilot customization according to the disclosed technologies.

FIG. 12 is a flowchart 12000 of a method illustrating collected example aspects of copilot customization. This method covers diverse aspects of customization, some of which are described elsewhere herein. Features described here and those described elsewhere can be implemented in any combination. Moreover, an embodiment can implement flowchart 1200 partially, wholly, or with modifications.

Block 1201 can initialize the method and orchestrate performance of some or all of composite blocks 1200, 1210, 1220, 1230, 1240, 1250, 1260, 1266, 1270, 1280 via fork 1203. These composite blocks can be performed sequentially, in parallel, or independently on subsequent passes between fork 1203 and join 1205. After completion of some or all of these composite blocks, the method proceeds via join 1205 to decision block 1207 where a determination can be made whether any further passes are required between fork 1203 and join 1205. If yes, the method can follow the Y branch from block 1207 back to block 1201 to orchestrate further passes through composite blocks 1200, 1210, 1220, 1230, 1240, 1250, 1260, 1266, 1270, 1280. If no further passes are needed, the method can follow the N branch from block 1207 to block 1208, where copilot assembly can be completed. At block 1209, one or more instances of the customized copilot can be deployed following which, in some examples, composite block 1290 can be performed with any one or more of the deployed copilot instances. As described further below, composite block 1290 can trigger fine-tuning of various copilot microservices, e.g. repeating certain blocks or composite blocks between fork 1203 and join 1205, as indicated by arrow 1298.

Composite block 1200 describes a process block flow related to obtaining document records and data sources, similar to that described in context of blocks 505, 510, 520 of FIG. 5, 605, 610, 620 of FIG. 6, or FIG. 10. At process block 1202, one or more copilot objectives or use cases can be identified. One or more experts, evaluators, hardware or software resources can also be identified. At process block 1204, the expert(s) can provide description(s) of the copilot objectives which, in some examples, can be a job description. Relevant document records can also be obtained based the copilot objectives or description(s) thereof. At block 1206, data sources supporting these document records can be identified. These data sources can include particular data sources which an expert or trained ML tool could use to achieve the copilot objective(s), which could be functions of an associated job. As indicated by respective arrows, document records from block 1204 can be applied to composite block 1240, and data sources form block 1206 can be applied to composite block 1210.

Composite block 1210 depicts a process flow which integrates the data source(s) into data producer(s) and trains the latter, similar to that described in context of blocks 530, 535, 580A and 580, 630, 635, or 637. At process block 1212, samples can be acquired from the identified data sources and, at block 1213, suitable data producer microservice(s) can be identified. To illustrate, if a sample of a given data source is determined to be an email, then an email messaging microservice similar to 251 of FIG. 2A can be selected to interface with the given data source. Similarly, a sample found to be an extract of an SQL database can lead to selection of a data producer similar to 240. At block 1214, training data can be obtained, similar to blocks 590A and 590. Block 12141 can be invoked from block 1214 to perform preprocessing on candidate training data, to improve data integrity. Better quality training data can lead to more efficient training or better performing copilots.

Block 12141 can variously reformat data (e.g. SQL or audio data into text), check for duplication, remove noise in the form of extraneous utterances in a transcript (e.g. "um," "er") or unintelligible words, convert informal speech into formal sentences, correct spelling or punctuation errors, or convert synonymous variants into standard terms. In some examples, block 12141 can be implemented using one or more auxiliary microservices, collectively dubbed "data integrity microservices." These auxiliary microservices can include intermodal microservices or other microservices present in the architecture of a trainee copilot, or can be microservices dedicated to customization according to FIG. 12. Like other microservices, a data integrity microservice can incorporate an LLM, LMM, DNN, or other trained ML tool.

At block 1215, each data producer can be trained, similar to block 582, without or with its associated data source. Block 1215 can be assisted by blocks 12151, 12152. In some instances, more training data may be required (e.g. following the Y branch from block 588 leading to block 590A) and additional training data can be obtained at block 12151. The additional training data can be preprocessed at block 12152, which can be similar to block 12141.

At block 1216, the trained data producer can be integrated into a test configuration, which can variously involve coupling the data producer to its associated data source, coupling the data producer to other data sources having similar types of data objects (e.g. email or SQL data), or coupling the data producer to one or more other microservices such as a retrieval microservice, an evaluation microservice, or other data producers. The test configuration can be tested at block 1217, similar to block 584, using test data obtained at block 12171. As shown, and described elsewhere herein, a portion of test data obtained at block 1214 can be reserved for testing. Some preprocessed training data from 12152 can also be used. Depending on test results, the method can exit composite block 1210, or can perform further iterations of at least some process blocks 1212-1217, similar to the branches of decision block 586.

Composite block 1220 depicts a process flow for allocating and deploying certain data source(s) such as historical data (or other infrequently updated or static data), similar to that described in context of block 540, or block 731 of FIG. 7. These data source(s) are dubbed "repository data." Such data can be stored in a tiered storage environment, can be used for training of a core microservice or other microservices, or can be integrated in a data repository available to a retrieval microservice in a deployed copilot.

At process block 1222, some or all of the identified or available repository data can be earmarked for training. Because historical data can be voluminous, a selection of the repository data can be made, e.g. by random sampling, or by stratified sampling according to date, topic, or another classifier. At block 1224, the identified or available repository data can be allocated among storage tiers classified from hot to cold: the former having low latency or high bandwidth; the latter having high latency or low bandwidth. To illustrate, with 10 years historical data available, one most recent year's repository data can be allocated to a hot storage tier for ready access e.g. by a retrieval microservice, another two years' data can be allocated to a warm storage tier, and the remaining five years' data can be allocated to a cold storage tier. At block 1226, repository data earmarked as readily available to a deployed copilot can be placed in its appropriate storage tier (commonly, hot storage), e.g. integrated (or available for integration) into a repository similar to 178 or 236. Some copilots can implement a facility to migrate data, e.g. to a warmer storage tier, as needed. At block 1228, some or all repository data can be preprocessed to improve quality, e.g. by microservice(s) similar to block 12141. In a variation, block 1228 can be invoked independently from any of blocks 1222, 1224, 1226.

Composite block 1230 depicts a process flow for customizing an intermodal microservice similar to 184 or 222. At block 1231, the non-text data modes desired for achieving copilot objectives can be identified, e.g. by an expert or developer. At block 1233 training datasets for each mode can be obtained, e.g. in a manner similar to block 590, and these datasets can be cleaned at block 1235, in a manner similar to block 12141. At block 1237, training data records can be extracted from the training datasets and labeled by an expert, human or ML tool. Then, at block 1239, an ML tool for or within an intermodal microservice can be trained, e.g. using supervised learning and the labeled training data records.

Composite block 1240 depicts a process flow for customizing an expansion microservice similar to 171, 220, or 871 of FIG. 8. At process block 1242, labeled training records can be formed from document records received from block 1204. Each training record can include a possible input from a client, and one or more expansions (e.g. expanded inputs or expanded queries) as desired output from the expansion microservice. These training records can be prepared by an expert or developer, similar to blocks 591-595. At block 1244, the set of training records can be augmented by synthesized training records, similar to block 597. At block

1246, at least the synthesized records can be reviewed by an expert according to the expert's judgment of the quality of each reviewed record, and unsatisfactory candidate records can be discarded. Then, at block 1248, an ML tool for or within the expansion microservice can be trained, e.g. by supervised learning.

Composite block 1250 depicts a process flow for customization of a retrieval microservice similar to 172 or 230. The retrieval microservice can implement recursive RAG, but this is not a requirement. Through fine-tuning, the retrieval microservice can learn to utilize available data producers (177, 232) and other data source(s) embedded in a data repository (178, 236).

At process block 1251, repository data can be configured to be accessible to the retrieval microservice, e.g. based on blocks 1224 or 1226. At block 1253, a data repository (again, similar to 178 or 236) containing policies or procedures can be established. In some examples, policies and procedures relevant to a client input can be extracted and appended to a request directed from the retrieval microservice toward a core microservice, as a guide or constraint that can improve core microservice performance. In additional examples, the policies and procedures can guide operations of the retrieval microservice itself. To illustrate, data producers accessible to a given client can be specified in a policy guide, based e.g. on the client's authorization level, and the retrieval microservice can access data producers accordingly.

Some examples can apply vector embedding to index data objects in a data repository. An embedding scheme can be established, initialized, or configured at block 1255. The embedding scheme can be selected, configured, or modified according to the requirements of a given copilot deployment or its objectives. To illustrate, different embedding schemes can be employed according to a mode of the repository data (e.g. text, audio, image), and an embedding scheme can be distorted to provide finer granularity in some regions (e.g. according to job, occupation, job function, or topic) and coarser granularity in others. Finer granularity in a narrow knowledge domain can allow detailed knowledge in that narrow domain to be economically represented and distinguished. Thus, the expressiveness of an embedding scheme can be tailored to particular copilot objectives or target knowledge domains. At block 1257, vector embeddings can be generated for document records or other objects in a repository, and can be stored in an index similar to vector database 238. Then, at block 1259, an optional recursion module can be configured for the retrieval microservice. The recursion module can be procedural logic or a trained ML tool. The recursion module can be integrated within the retrieval microservice, or can be invoked as a distinct microservice. In some examples, an evaluation microservice (186) can serve as the recursion module. The recursion module can be available pretrained and can, with fine-tuning, learn when to terminate recursive operation of the retrieval microservice.

Composite block 1260 depicts a process flow for integration of the expansion microservice (171, 220) with the retrieval microservice (172, 230), similar to 560 or 753. At block 1261, a customized expansion microservice (e.g. from composite block 1240) can be coupled to receive input from a client interface (110, 216), similar to the arrow joining inputs 850, 851 of FIG. 8). At block 1262, the expansion microservice can be coupled to deliver output to a retrieval microservice (230, 172), similar to the arrow joining output 861 to input 852. At block 1263, the retrieval microservice can be coupled to invoke one or more data producers (177, 232). In this configuration, the retrieval microservice can be trained. At block 1264, labels can be applied to expansion microservice outputs to create training data for the retrieval microservice and, at block 1265, the retrieval microservice can be trained, e.g. by supervised learning. In a variation, block 1264 can be omitted and the retrieval microservice can be trained, in situ, by reinforcement learning.

Composite block 1266 depicts a process flow for customization of core prompting microservice, which can be a trained ML tool having a similar role as logic 272. Composite block 1266 can follow block 1265. At block 1267, training data records can be extracted from outputs of the trained retrieval microservice and, at block 1268, these records can be labeled with desired core model prompts, At block 1269, a core prompting microservice can be trained by supervised learning. Optionally, further training can be performed with reinforcement learning.

Composite block 1270 depicts a process flow for customization of a core microservice similar to 174 or 285. At process block 12751, training data records can be extracted from repository data (e.g. from 1222). At process block 12752, these training records can be supplemented by synthesized training data (597, 896). The training records can be used to train a core model at process block 1275. In some examples, multiple core models can be used, e.g. in mixture-of-LLM or ensemble-of-LLM architectures, even with three or more hierarchical layers. Accordingly, additional instances of block 1275 (not shown) can be implemented. Moreover, core model training can incorporate multiple training phases, e.g. with different configurations of individual ML tools constituting the core microservice. These additional phases are represented in FIG. 12 by optional blocks 1271, 1279. Training phases can include, e.g. reinforcement learning. In variations, core model training can draw on data source(s) identified at blocks 520, 620, or 721, including those integrated into data producers or data repositories (see composite blocks 1210, 1220), or content from a target corpus (810).

Composite blocks 1280 ... 1288 depicts similar process flows applied for customization of other microservices. Exemplary microservices include embedding microservices, evaluation microservices, filter microservices, qualification microservices, other protection microservices, distribution microservices, or task microservices. At block 1281, training data can be generated from output of an upstream microservice and, at block 1283, records of the training data can be labeled. Additional labeled training data records can be synthesized at block 1285 and validated at block 1287. Then, the accumulated training data can be used to train the instant micoservice at block 1289.

After deployment of an integrated customized copilot at block 1209, additional fine-tuning can be performed at composite block 1290, which can operate similarly to FIG. 11. At block 1291, an input/output pair from the deployed copilot can be displayed on a GUI. At block 1293, an explanation of one or more deficiencies in the output can be received on the GUI, along with an alternative result which would be more acceptable to an evaluator than the actual output for the given input. Then, at process block 1295, a determination can be made, by a human expert or a trained ML tool, as to which microservices could benefit from additional training to avoid the identified deficiencies. For each identified microservice, a training record can be created and stored at block 1297, and that microservice can be fine-tuned at block 1299. In some instances, block 1299 can invoke one or more blocks within the preceding composite blocks of FIG. 12, as indicated by arrow 1298.

Training Interview Skills—Example Method

Figure 14:
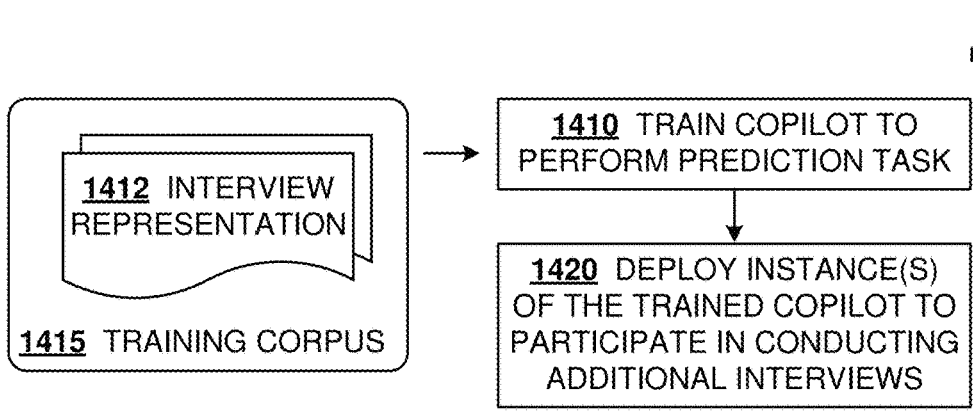
FIG. 14 is a flowchart of an example method for training interview skills according to the disclosed technologies.

FIG. 14 is a flowchart 1400 of an example method for training a copilot with interviewer skills. In this method, interview representations are used to train the copilot, which is then deployed to participate in conducting additional interviews.

At process block 1410, the copilot is trained to perform a prediction task. The training can be performed using a training corpus 1415 containing representations 1412 of interviews. Each interview can include an alternating sequence of prompts (from one or more interviewers) and responses (from one or more subjects).

At process block 1420, one or more instances of the trained copilot can be deployed to participate in conducting interviews of skilled personnel.

Figure 15:
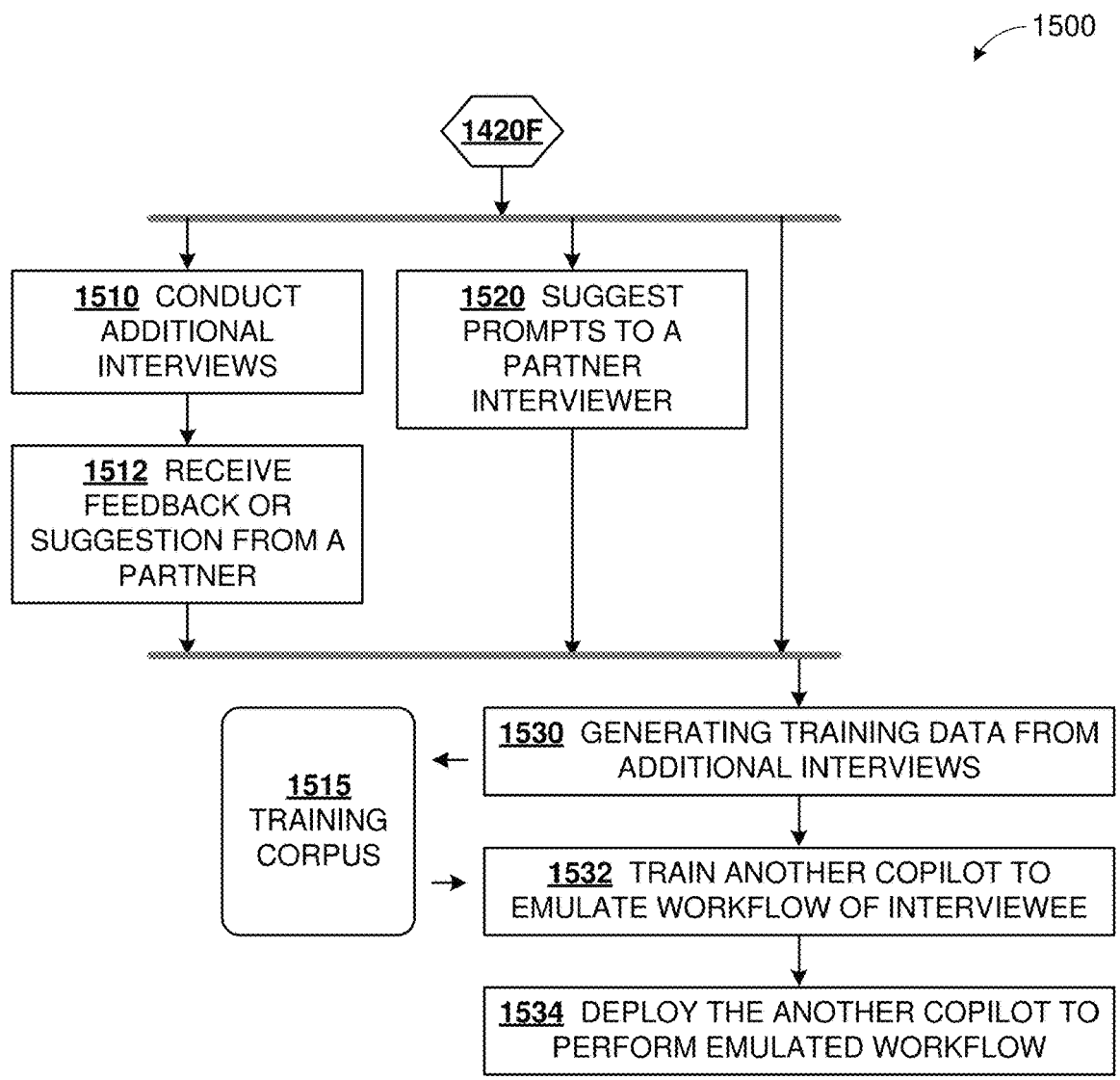
FIG. 15 is a composite flowchart illustrating example extensions to the method of FIG. 14, according to the disclosed technologies.

Numerous variations and extensions can be implemented within scope of the disclosed technologies, some of which are illustrated in FIG. 15.

FIG. 15 is a composite flowchart 1500 illustrating some example extensions. The hexagon connector labeled 1420F, at the top of FIG. 15, indicates that flowchart 1500 can be entered following process block 1420 of FIG. 14. As a composite flowchart, FIG. 15 combines various paths along which the method of FIG. 14 can be extended. That is, any given extension can implement merely a portion of flowchart 1500. Particularly, different instances of the trained copilot can follow different paths, and a given copilot can follow different paths at respective times or for respective interviews.

Some instances of the trained copilot can follow a path from connector 1420F to process block 1510, where this copilot can conduct the additional interviews. Some of these instances can optionally proceed to block 1512, where the copilot can receive feedback or suggestions from a partner. The partner can be a human or another trained ML tool, even another instance of the trained copilot. The feedback or suggestions can be received during the interview, but this is not a requirement.

Some instances of the trained copilot can follow a path from connector 1420F to process block 1520. Here, instead of conducting the interview, the copilot can monitor an interview conducted by a partner interviewer (and, optionally, other interviewers) and can suggest prompts to the partner.

With or without the abovementioned extensions, the method can proceed to block 1530, where the additional interviews can be used to generate training data, e.g. for incorporation in training corpus 1515. At block 1532, the training data from corpus 1515 can be used to train a second copilot to emulate workflow of at least one of the interviewed skilled personnel. At block 1534, this second copilot can be deployed to emulate at least part of the workflow for which it has been trained.

Any of the trained copilots of FIGS. 14-15 can incorporate a network of microservices as described in context of FIGS. 1, 2, 3, or elsewhere herein. A copilot can incorporate an expansion microservice, a retrieval microservice, one or more core microservices, and one or more evaluation microservices. A copilot can include at least one LLM, LMM, or DNN. Some disclosed copilots can be compact, having total parameter counts below 10 billion, 20 billion, 40 billion, 80 billion, or 160 billion.

The interview representations stored in corpus 1415 and used for training at block 1410 can include at least one script. This script can be a transcript of an actual interview. Illustratively, the script can be extracted by a human or software transcriber from an audio or video recording of the interview. Alternatively, the script can be prepared by an author having domain expertise, without representing any specific actual interview.

The prediction task, for which the copilot is trained at block 1410, can be a next prompt prediction task or, in variations, prediction of another delineation of interview dialog, such as next word, next sentence, or next paragraph.

Training at block 1410 or block 1532 can be performed in multiple phases. Three or more such phases can target progressively narrower knowledge domains. As described elsewhere herein, training phases can also be distinguished by the specific task for which the copilot is trained, which microservices are trained in which configuration, types of training data used, or training modality (e.g. unsupervised, supervised, or reinforcement learning). The training at block 1410 can be a second training process preceded by a first training process on the trainee copilot, for which the training objective is to perform chain-of-thought reasoning, tree reasoning, or graphical reasoning.

In some examples, an interview can include two subjects having different but related job descriptions, such as doctor and nurse; journalist and editor; or actor and director. Interviews can also include multiple subjects having a same job description, or just a single subject. Similarly, an interview can include multiple interviewers, e.g. conducting different portions of the interview at different times or for different topics, or working concurrently as a team. Other interviewers can be conducted by a single interviewer.

An interview representation can also include annotation prepared by one or more annotators, which can be trained ML tools or humans, in any combination. The annotation can include a workflow map. Some interview representations can include one or more static workflow maps, showing an end product produced by the annotator. Other interview representations can include one or more dynamic workflow maps, showing a map evolving over the course of the interview as the annotator digests content of the interview.

The prediction task can be a first objective of the training at block 1410, and this training can include a second training objective, namely generation of workflow maps similar to those provided as annotation. Like a prediction task, a workflow map generation task can be learned using any of unsupervised, supervised, or reinforcement learning. In unsupervised learning, a trainee ML tool can compare its own postulated workflow map, or portion thereof, with that received as training input, to learn the task autonomously. In supervised learning, a comparator can compare a workflow map (or portion thereof) outputted from the trainee ML tool, with a desired output to determine a loss function and apply training using e.g. backpropagation. In reinforcement learning, an evaluator can offer feedback on a workflow map (or portion thereof) outputted from a trained ML tool, used to create additional training records for update of the tool, when there is no predetermined "correct" workflow map available as a reference.

To support learning from workflow maps and generation of workflow maps, some copilots can include, in a core microservice, long short-term memory (LSTM) or other memory. In particular, these workflow maps can be generated by the trained copilot at block 1530 and can be incorporated into the training process (for workflow emulation) at block 1532.

Assisting Interviewer(s)—Example Method

Figure 16:
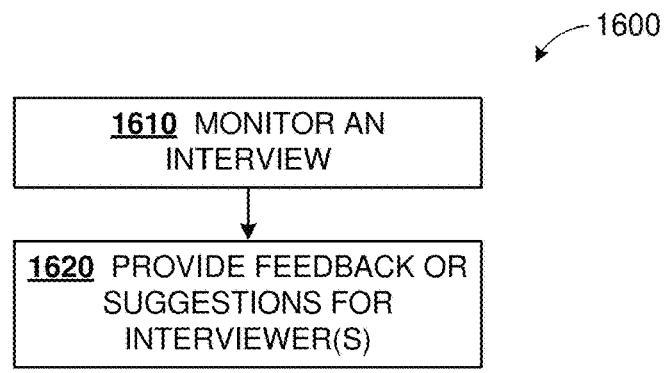
FIG. 16 is a flowchart of an example method for assisting one or more interviewers, according to the disclosed technologies.

FIG. 16 is a flowchart 1600 of an example method for assisting one or more interviewers. In this method, an interview is monitored and feedback or suggestions are offered to an interviewer. The method can be performed by a trained copilot, and can improve the effectiveness of resulting interviews used for training copilots or other ML tools. Incorporation of feedback or suggestions can often reduce the number of interviews required by a factor of 3-10, to achieve a predetermined performance level by a trainee tool.

At process block 1610, an interview of one or more skilled personnel can be monitored. The interview can be conducted by one or more interviewers. Then, at block 1620, based on the monitoring, feedback or suggestions can be provided to at least one of the interviewer(s).

Figure 17:
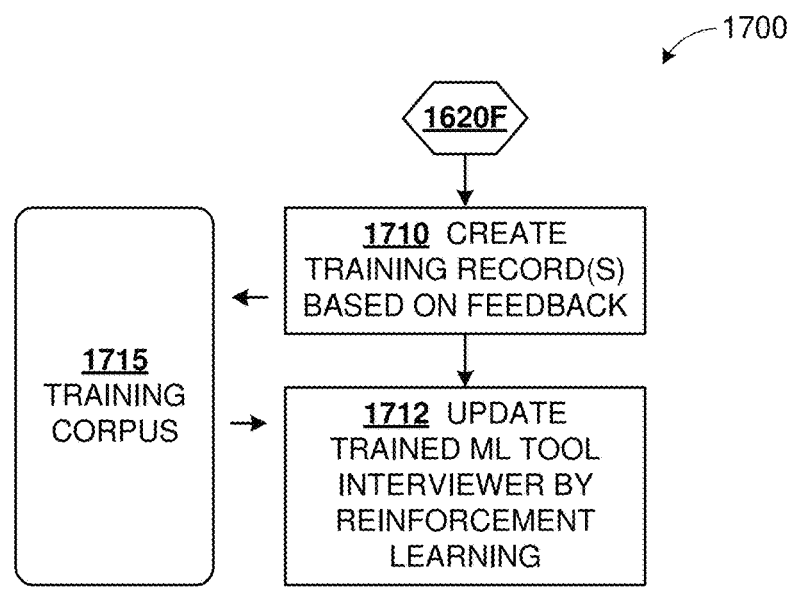
FIG. 17 is a flowchart illustrating example extensions to the method of FIG. 16, according to the disclosed technologies.
Figure 18:
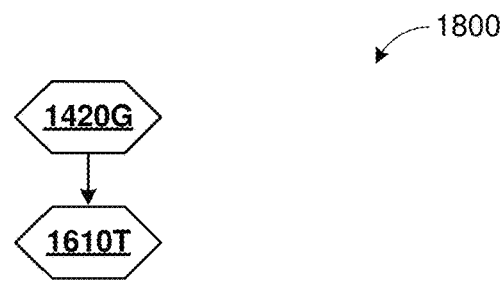
FIG. 18 is a flowchart of an example relationship between the methods of FIGS. 14 and 16.

Numerous variations and extensions can be implemented within scope of the disclosed technologies, some of which are illustrated in FIGS. 17-18.

FIG. 17 is a flowchart 1700 illustrating some example extensions to the method of FIG. 16. The hexagon connector labeled 1620F, at the top of FIG. 17, indicates that flowchart 1700 can be entered following process block 1620 of FIG. 16. FIG. 17 can be applied in situations where at least one of the interviewers is a trained ML tool, such as another copilot.

At process block 1710, one or more training data records can be created based on the feedback. Illustratively, these training data records can be stored as part of training corpus 1715. Then, at process block 1712, the trained ML tool interviewer can be updated, or caused to be updated, using the training record(s) created at block 1710, which can be retrieved from corpus 1715. Block 1712 can be performed by reinforcement learning. In some examples, blocks 1710, 1712 can be performed by a different trained ML tool than blocks 1610, 1620, but this is not a requirement. In other examples, one or both of blocks 1710, 1712 can be performed by the same trained copilot performing blocks 1610, 1620. Alternatively, one or both of blocks 1710, 1712 can be performed by a human.

FIG. 18 is a flowchart 1800 of an example relationship between the methods of FIG. 14 and FIG. 16. Connector 1420G indicates that flowchart 1800 can be entered following block 1420 of FIG. 14, e.g. after performing the method of FIG. 14. Connector 1610T indicates that flowchart 1800 can exit to block 1610, e.g. to perform the method of FIG. 16. Thus, FIG. 18 indicates that the method of FIG. 16 can be performed by a copilot trained by the method of FIG. 14. Variations or extensions of FIG. 14 can also be used to train the instant trained copilot, and this trained copilot can also perform variations or extensions of FIG. 16, in any combination.

Additional variations or extensions can also be implemented. For example, block 1620 can be performed during or after the interview. The monitored interview can include a single interviewer or a single subject, in any combination.

Any of the trained ML tools of FIGS. 16-17 can incorporate a network of microservices as described in context of FIGS. 1, 2, 3, or elsewhere herein. The ML tools can incorporate an expansion microservice, a retrieval microservice, one or more core microservices, and one or more evaluation microservices. The ML tools can include at least one LLM, LMM, or DNN. Some disclosed ML tools can be compact, having total parameter counts below 10 billion, 20 billion, 40 billion, 80 billion, or 160 billion. These ML tools can be copilots.

A training record generated at block 1710 or used at block 1712 can include a static or dynamic first workflow map. In some examples, this workflow map can be included in the feedback created at block 1620 while, in other examples, the workflow map can be created by an annotator distinct from the trained copilot performing block 1620. In some examples, the first workflow map can be used at block 1712 to improve a function of the trained ML interviewer to generate second workflow maps for conducted interviews.

In further examples, FIG. 16, or any of such variations or extensions discussed above, can be further extended. Training data can be generated from the interview monitored at block 1610. This training data can be used to train a further copilot to emulate workflow of at least one of the skilled personnel. The further copilot can be deployed, or caused to be deployed, to perform at least part of the emulated workflow.

Example Dataflows and Role Interrelationships

FIGS. 19A-19E are diagrams 1901-1905 illustrating dataflows and relationships between various roles which can be present in examples of the disclosed technologies. Some of the roles depicted in FIGS. 19A-19E are indicated in legend 1906 and include: annotator (labeled as "A"), evaluator ("E"), interviewer ("I"), subject ("S"), and writer ("W", sometimes denoted "author"). Any of these roles can be adopted by humans of suitable expertise, each of whom can be subject-matter experts ("SME") in one or more appropriate knowledge domains. Several of these roles can also be emulated by suitably trained ML tools.

While FIGS. 19A-19E show numerous dataflows, software or human actors in numerous roles, and numerous data structures, there is no requirement that any given dataflow, actor, role, or data structure be realized in any given embodiment of the disclosed technologies. Rather, the variety of dataflows or role relationships serves to illustrate many ways in which innovative features can be combined to reduce human effort and produce better performing trained ML tools, such as copilots, relative to comparative approaches.

Initially, FIG. 19A shows interviews 1910, each conducted by one or more interviewers 1911, with one or more subjects 1913 providing responses to interviewers 1911. The proceedings of interviews 1910 can be captured as recordings 1912, which can be transcribed to obtain scripts 1914. Either or both of recording 1912 and script 1914 can be stored as interview representation 1942 in training database 1940.

However, interview representations 1942 can also be obtained in other ways. One or more writers 1915 can use their expertise to simply author scripts 1916. One or more trained synthesizers 1931B can also synthesize additional scripts 1936. Still further, scripts 1916, 1936 can be enacted by actors (who may or may not be skilled personnel) as actual interviews 1910, whereby script 1916, 1936 can be converted into recording 1912.

In some examples, interview representations 1942 (whether scripts 1914, 1916, or 1936; or recording 1912) can be augmented with respective annotations 1922 developed by annotators 1920. Annotators 1920 can include human annotators 1921A or trained ML tools 1923B, in any combination. Annotators 1920 can prepare annotations 1922 from evaluation of live interviews 1910, recordings 1912, or scripts 1914, 1916, 1936.

FIG. 19A also depicts composite block 1930 in which trainee ML tool 1931A can be trained as a synthesizer and then deployed as synthesizer 1931B. Evolution from trainee ML tool 1931A to trained ML tool 1931B is shown by dotted line. Initially, interview-derived scripts 1914 or authored scripts 1916 can be inputted to trainee tool 1931A, which can be directed to produce candidate synthesized scripts

1932. Evaluator 1933 can analyze candidate scripts 1932 and generate feedback 1934 which can be used to fine-tune or update trainee synthesizer 1931A, e.g. by reinforcement learning. After a number of cycles (often, 1-5) around this loop within training block 1932, evaluator 1933 can determine that scripts 1932 are of sufficient quality that training of ML tool 1931A is complete. Then, this ML tool can be deployed as trained synthesizer 1931B, and can be used to generate additional scripts 1936 for training database 1940.

Figure 19B:
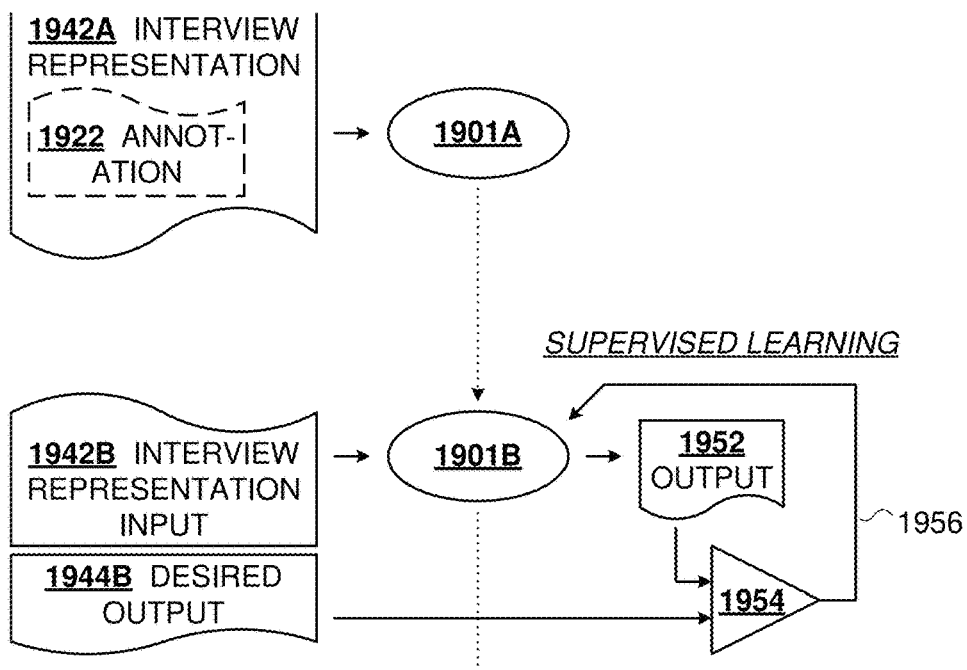

FIG. 19B shows phased training of a trainee ML tool 1901A→1901B→1901C. As illustrated, these phases are distinguished by training modality. In variations, additional training phases can be used, distinguished by respective factors, or some illustrated phase(s) can be omitted.

Initially, trainee 1901A can be trained by unsupervised learning. Inputs can be interview representations 1942A (optionally including annotations 1922) and trainee 1901A can be directed to a prediction task, such as next prompt prediction. After the unsupervised learning phase (which can be terminated when trainee 1901A meets or exceeds a predetermined performance level at its prediction task), the partially-trained trainee tool, now dubbed 1901B, can be further trained in a supervised learning modality. Here, each interview representation (or a portion thereof) can be dissected into a trainee input 1942B and a corresponding desired output 1944B. Trainee 1901B can receive portion 1942B (but not portion 1944B), and generate thereby output 1952. Comparator 1954 can develop feedback 1956 based on comparison of actual output 1952 with desired output 1944B. Feedback 1956 can be used to update parameters (e.g. weights) of trainee tool 1901B, e.g. by backpropagation or by another method.

The supervised learning phase can be terminated, e.g. after exhaustion of training records 1942B/1944B, or when trainee 1901B meets or exceeds a predetermined performance criterion. The performance criterion can be measured in terms of deviation between actual output 1952 and desired output 1944B as measured by comparator 1954. Then, the trained tool, now dubbed 1901C, can be further trained in a reinforcement learning modality.

Tool 1901C can conduct interviews 1950, each interview with one or more subjects 1955. Interviews 1950 can be monitored by evaluators 1957, and reinforcement training data 1958 can be generated based on these evaluations. Reinforcement learning can be used to update trained ML tool 1901C in one or more update cycles.

Figures 19C, 19D, 19E:
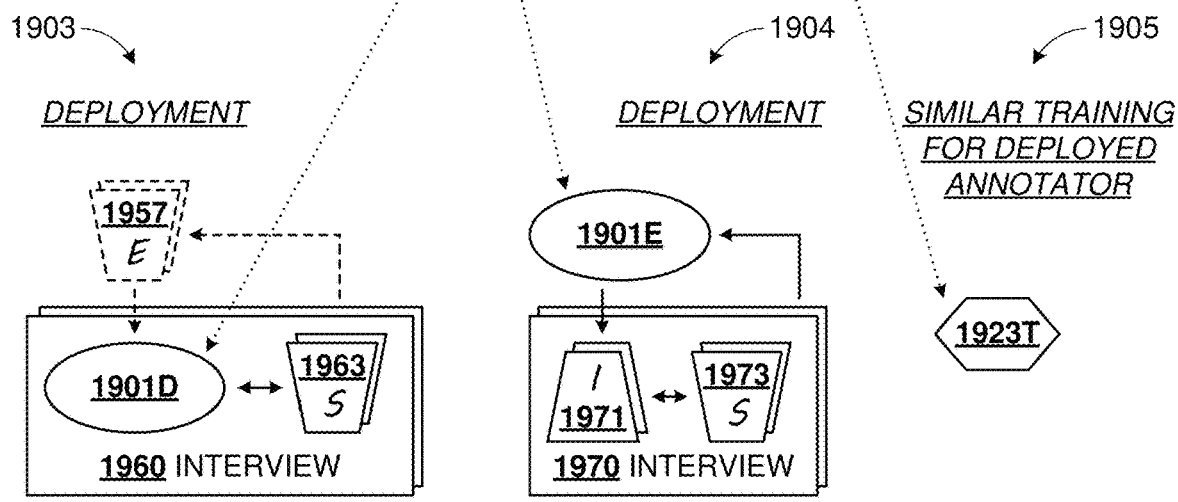

FIG. 19C shows a variation where trained ML interviewer, now dubbed 1901D can conduct interviews 1960 of subjects 1963, optionally with the assistance of one or more evaluators 1957 who can offer feedback or suggestions to interviewer 1901D.

FIG. 19D shows a variation wherein trained ML interviewer, now dubbed 1901E, can serve as an evaluator, monitoring one or more interviews of subjects 1973 conducted by interviewers 1971. Based on such monitoring, interviewer/evaluator 1901E can provide feedback or suggestions to at least one of interviewers 1971.

Thus, the training phases of FIG. 19B can train an interviewer or an evaluator. Similar training can also be implemented for an annotator, in which case trained ML tool 1901C can be deployed as annotator 1923B of FIG. 19A, as indicated by connector 1923T in FIG. 19E.

Annotation—First Example

Figure 20:
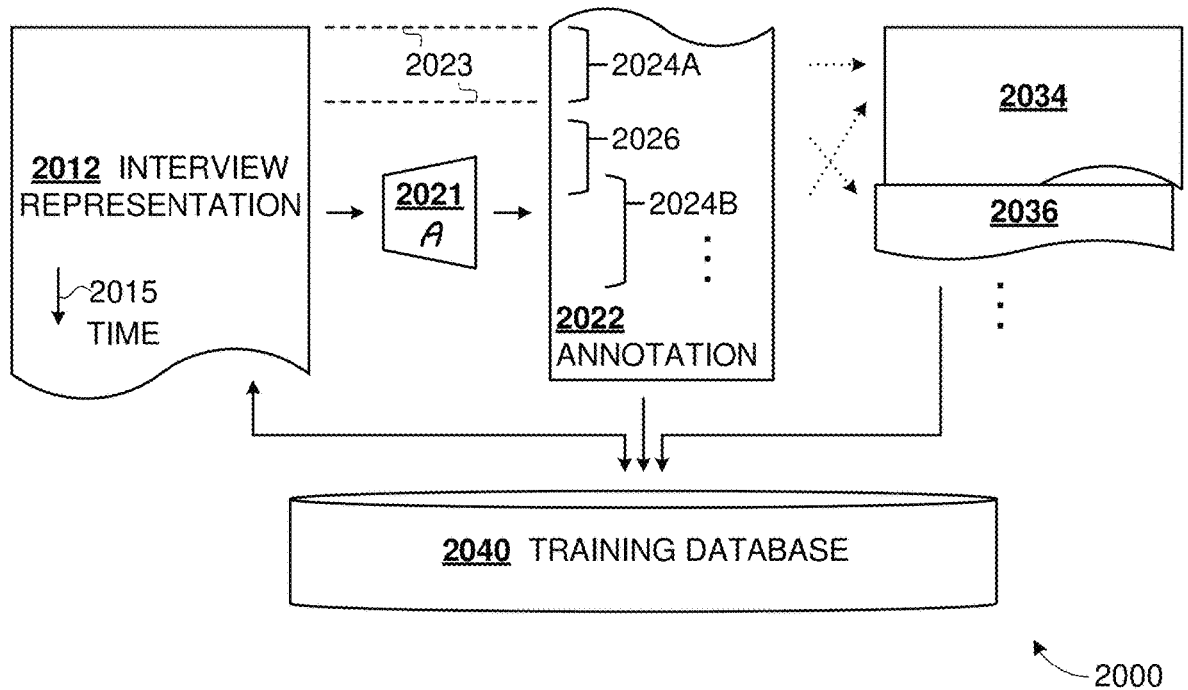
FIG. 20 is a dataflow diagram illustrating a first example of annotation according to the disclosed technologies.

FIG. 20 is a dataflow diagram 2000 illustrating a first example of annotation. In this example, an interview representation is annotated by an annotator to allocate various portions of the interview representation to respective topics. Results of the annotation can be attached to the original interview representation or otherwise added to a training database. Annotation to allocate segments of a recorded work session among workflows can be similar, and can offer similar advantages.

Initially, interview representation 2012 can be provided to annotator 2021. As disclosed herein, interview representation 2012 can be a script or recording, and may already have another annotation attached. In some examples, representation 2012 can be extracted from training database 2040. Often, at least part of representation 2012 can be arranged linearly following temporal progress of an associated interview. In this illustration, time 2015 flows downward as shown. Upon analysis of representation 2012, annotator 2021 can allocate various temporal segments to respective topics. As illustrated, an initial portion of representation 2012 can be allocated to topic 2024 as shown by brace 2024A. Dashed lines 2023 show the correspondence between brace 2024A and a temporal portion of interview representation 2012. A slightly later portion can be allocated to topic 2026, and a further portion can also be allocated to topic 2024 as shown by brace 2024B. While an interview representation can sometimes be allocated as contiguous non-overlapping portions to respective topics, this is not a requirement. As illustrated in FIG. 20, there can be a gap between braces 2024A and 2026, demonstrating that some portions of representation 2012 are not allocated to any topic. Also shown in FIG. 20 is an overlap between braces 2026 and 2024B, demonstrating that the common portion of these two braces can be allocated to more than one topic.

In some examples, annotation 2022 listing a correspondence between topics and portions of interview representation 2012 can be added to training database 2040, e.g. alongside or attached to representation 2012.

In further examples, the allocation map 2022 can be used to dissect interview representation into segments for each topic. Thus, segment 2034 can be prepared by extracting and combining the portions of interview representation 2012 corresponding to braces 2024A, 2024B. Segment 2036 can be prepared by extracting the portion corresponding to brace 2026. These interview representation segments 2034, 2036 can be incorporated into training database 2040 in addition to, or instead of, complete representation 2012.

Topic-wise dissection of interview representation 2012 can be advantageous. Training data specific to a particular topic can be used to train an ML tool precisely for that topic. In several aspects, a single-topic ML tool can be smaller than an ML tool covering multiple topics, and can be trained with smaller volumes of training data, yet can offer superior performance because of its single-topic focus.

A single-topic trained ML tool can be combined with other single- or multiple-topic ML tools to conduct or evaluate an entire interview, each ML tool handling its respective topic(s).

Annotation—Second Example

Figure 21:
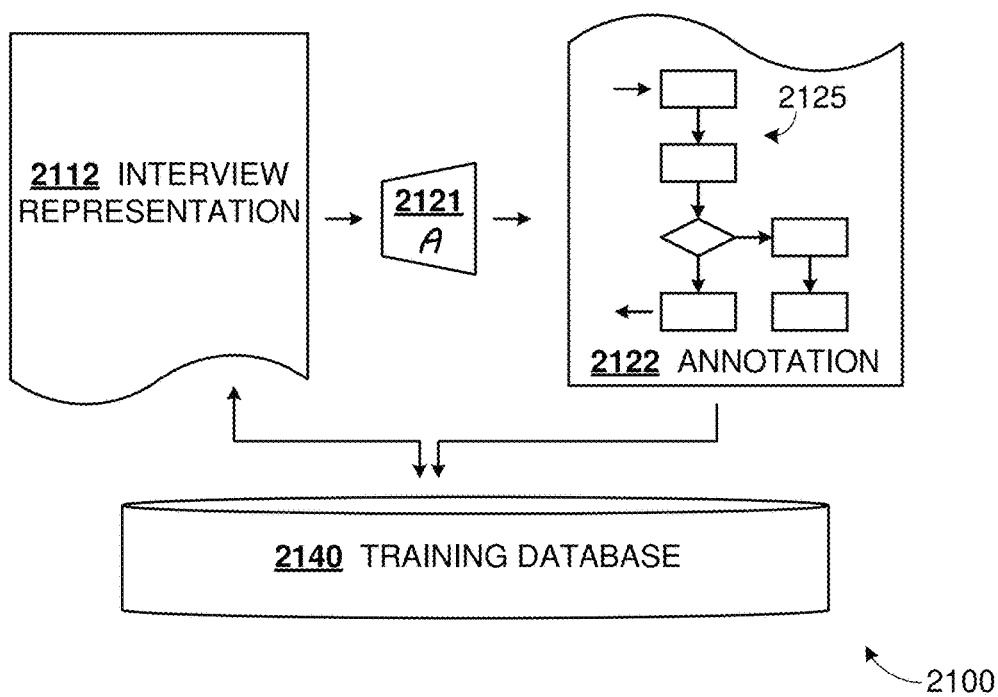
FIG. 21 is a dataflow diagram illustrating a second example of annotation according to the disclosed technologies.

FIG. 21 is a dataflow diagram 2100 illustrating a second example of annotation. In this example, an interview representation is annotated by an annotator with a workflow extracted or inferred from the interview representation. Results of the annotation can be attached to the original interview representation or otherwise added to a training database. Annotation to infer or extract a workflow map from a recorded work session can be similar, and can offer similar advantages.

Initially, interview representation 2112 can be provided to annotator 2121. As disclosed herein, interview representation 2112 can be a script or recording, and may already have another annotation attached. In some examples, representation 2112 can be extracted from training database 2140.

Some interviews can elicit a subject's description of a workflow for performing a particular job function. Annotator 2121 can capture this workflow description as a map, shown in FIG. 21 as flowchart 2125. Other workflow descriptions can also be used, including without limitation: graphs (including knowledge graphs associated with prerequisites, input, or output of a workflow), decision trees, pseudo-code, Javascript or other comparably expressive programming or scripting languages. These descriptions of a workflow are collectively termed "workflow maps." For example, flowchart 2125 shows input and output arrows to/from the workflow, several process blocks, including a decision block serving as a branch point. In some examples, a decision tree can guide a workflow toward a defined goal.

In some examples, annotation 2122 can be added to training database 2140, e.g. alongside or attached to representation 2112.

While flowchart 2125 is illustrated as a completed workflow map, this is not a requirement. In other examples, annotation 2122 can show the evolution of map 2125 as the annotator progresses through interview representation 2112. In this case, annotation 2122 can be a dynamic workflow map.

As described herein, inclusion of workflow maps in a training database can help a trainee ML tool organize an interview or an interview representation efficiently, e.g. in an LSTM within a core microservice, allowing a given ML tool to be implemented more compactly than without the workflow map. The workflow map can also aid the trainee ML tool by providing a context for developing understanding of interview representations (proxies for the interviews themselves) provided as training data. In this way, the ML tool can be trained more quickly, e.g. less volume of training data or less learning cycles, than without the workflow map.

FIGS. 20-21 are exemplary. Other forms of annotation can also be derived from, or can accompany, an interview representation or a recorded work session. In further examples, annotations 2022, 2122 (or other annotations) can be evaluated by an evaluator which can be a microservice incorporating an LLM, LMM, DNN, other trained ML tool. The evaluator microservice can be trained using techniques described in context of FIGS. 5, 12, 19B or elsewhere herein.

Example Data Organization

Figure 22A:
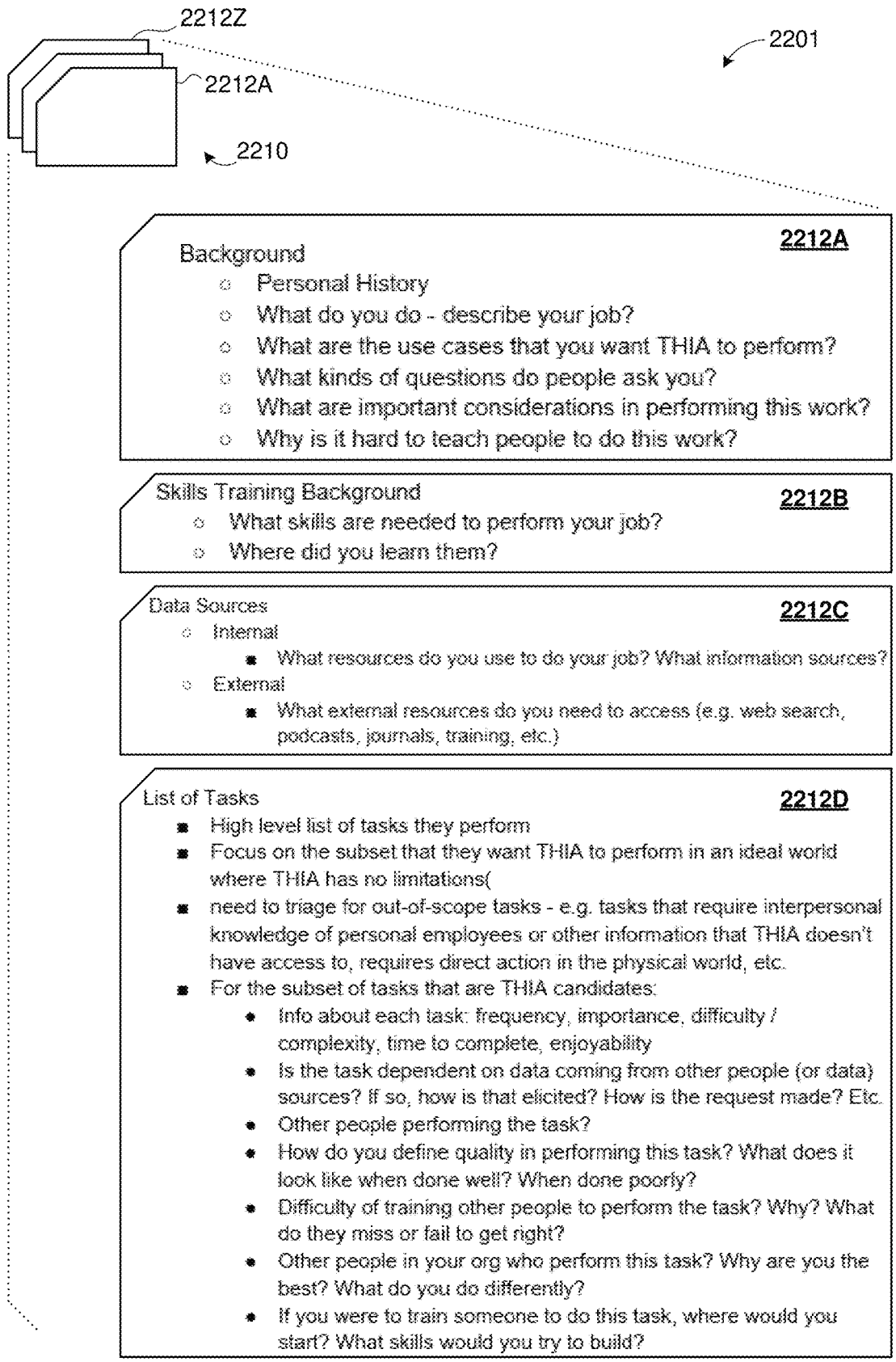

FIGS. 22A-22B are parts 2201-2202 of a diagram illustrating example organization of data extracted from an interview. Such organization can be provided to a trained copilot as a template to be filled in at the time of conducting or monitoring an interview, or can be included as annotation in training data as a guide from which a trainee copilot can learn interviewing skills (e.g. at block 1410 of FIG. 14). In some examples, a copilot can be trained to generate a similarly organized summary of interview findings. This copilot can be an evaluator monitoring an interview or a same copilot conducting the interview.

Extracted data 2210 can be organized in exemplary multiple planes 2212A-2212Z. These planes can be distinguished according to one or more factors, e.g. type of information (e.g. description of a job function, vs. background), temporal order during the interview, topic, purpose of extracting data in this plane, which among multiple interviewers conducted questioning in this plane, or which among multiple subjects responded to questioning in this plane. Although planes 2212A-2212Z are shown in linear fashion, this is not a requirement and the various planes can be organized hierarchically, according to a directed or undirected graph, or in another way.

Background information of a subject is shown on plane 2212A, and information about skills and training can be collected on plane 2212B. The subject may access one or more resources for fulfillment of their job or a function of the job, and these are gathered on plane 2212C. Shown on plane 2212D are a list of job functions and attributes of each function. In some examples, a single plane 2212D can be used to accommodate attributes of all job functions while, in other examples, plane 2212D can contain a list of the job functions, with each function having its particular attributes collected on a distinct respective plane (not shown).

Plane 2212E is directed to gathering workflow information, while 2212F refers to a recording of the subject in action performing their job. This recording can be collected separately from a verbal interview but maintained alongside a transcript of the interview in a common interview representation.

Plane 2212G collects interview data that has relevance for training an expansion microservice of a copilot emulating the subject's workflow, and plane 2212Z similarly collects data related to training a core microservice of that copilot.

Numerous variations and extensions can be implemented within scope of the disclosed technologies. Some interview data can be replicated over multiple planes as appropriate. Other interview data can be discarded as not relevant to any identified purpose.

Trained Annotator—Example Method

Figure 23:
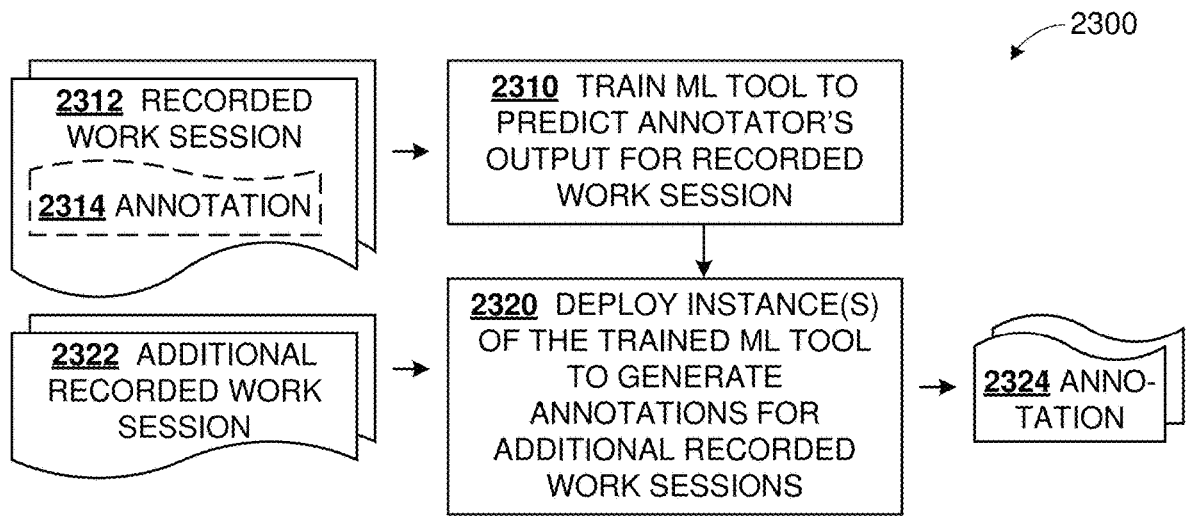
FIG. 23 is a flowchart of an example method with a trained annotator, according to the disclosed technologies.

FIG. 23 is a flowchart 2300 of an example method with a trained annotator. In this method, an ML tool is trained to annotate a work session and then deployed. Workflow maps generated through automation can be used to train workflow emulators. Generation of workflow maps by ML tools can reduce effort required from skilled personnel for training emulators, can generate the workflow maps faster than skilled personnel, can reduce the time required to develop the emulators, and can also improve the quality of the workflow maps and the performance of resulting workflow emulators. A recorded work session can be considerably less burdensome on a skilled subject than participating in an interview. Given that a work session can record work that the skilled subject would have performed anyway, the incremental effort required from the skilled subject can be negligible, often less than 5% of the duration of the work session (e.g. 3 minutes for an hour-long session). For such reasons, automation applied to recorded work sessions can significantly increase the volume of training data or the number of customized emulators that can be created with a fixed amount of incremental effort from skilled subjects, even beyond that achievable from interviews.

At process block 2310, an ML tool can be trained to predict an annotator's output for one or more recorded sessions 2312 of skilled personnel at work. In some training phases, training data provided to the trainee copilot at block 2310 can include an annotator's annotation 2314, but this is not a requirement.

Then, at block 2320, one or more instances of the trained ML tool (an annotator) can be deployed to generate respective annotations 2324 for additional recorded work sessions 2322.

Numerous variations and extensions can be implemented within scope of the disclosed technologies. The ML tool can be a stand-alone tool, a copilot (which can have a microservice network architecture), or can be incorporated within a microservice of such a copilot. The ML tool can incorporate an LMM or other LLM. In some examples, each annotation generated at block 2320 can be a workflow map. Annotation 2314, and the training objective of the prediction task at block 2310 can also be workflow maps. In other examples, each annotation 2324 generated at block 2320 can demarcate segments of a respective work session 2322. The deployed ML tool (block 2320) can perform annotation live on at least one recorded work session 2322.

The training can include multiple phases, variously distinguished by one or more of: scope of knowledge of training data; configuration of the trainee ML tool; training objective; or training modality. Unsupervised, supervised, or reinforcement learning can be used singly or in any combination. In unsupervised learning, annotator's output 2314 can be pre-existing and can be included with a recorded work session 2312 provided as input for block 2310. In supervised learning, annotator's output can be pre-existing but can be excluded from training data provided as input for block 2310. Rather, the annotator's output can be compared with output from the trainee ML tool to determine a loss function, from which feedback can be provided to update parameters of the ML tool, e.g. by backpropagation. In reinforcement learning, pre-existing annotator's output is not required. Rather, annotator's output predicted by the ML tool can be rated by a human evaluator or a reward model, to generate feedback for updating parameters of the ML tool.

In some examples, reinforcement learning can be performed in an iterative loop. To illustrate, on a first iteration, a trainee ML tool can be trained with annotations generated by a human annotator. On a second iteration, the trainee tool can generate its own annotations for, say, 50 recordings. These annotations can be used to train a reward model. A subset, say 10 in number, of the reward model's rankings can be reviewed by a human evaluator. These 10 rankings can be used to assess performance of the ML tool, and can also be used to update the reward model, while rankings of all 50 annotations (including 10 reviewed or corrected by the human evaluator) can be used to update the ML tool. The feedback can improve performance of the ML tool and the reward model. Thus, on a third iteration, the ML tool can generate annotations for, say, 500 recordings. Again, the ML tool's performance is determined, and only a subset of results (say, still about 10) is reviewed by the human evaluator. In such a bootstrap approach, the fraction of results reviewed by a human can decrease as the ML tool's performance improves. Iterations can proceed until a desired performance level is obtained, while the human evaluator's effort is kept low.

Figure 24:
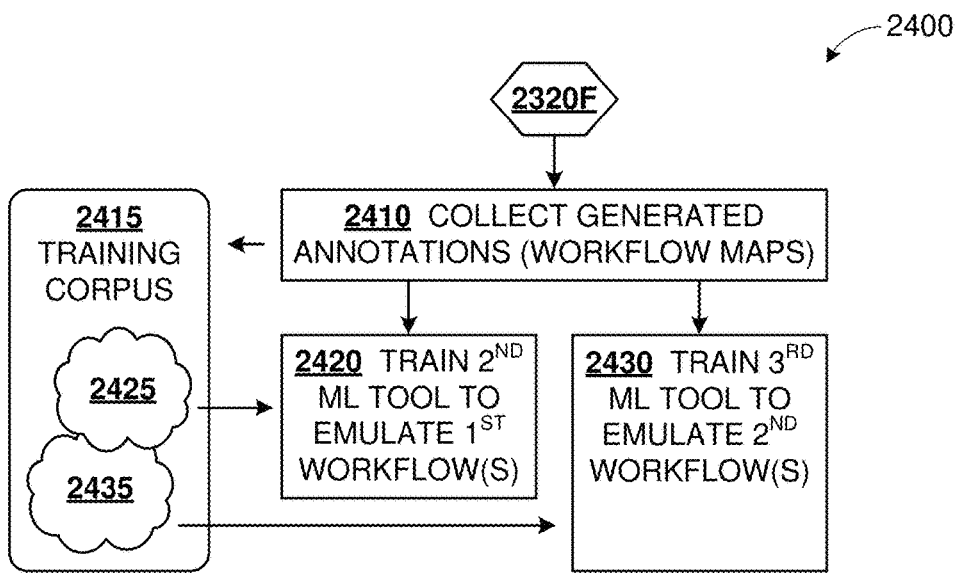
FIG. 24 is a composite flowchart illustrating example extensions to the method of FIG. 23, according to the disclosed technologies.

Some extensions are illustrated in composite flowchart 2400 of FIG. 24. Hexagon connector labeled 2320F, at the top of FIG. 24, indicates that flowchart 2400 can be entered following process block 2320 of FIG. 23. As a composite flowchart, FIG. 24 combines various paths along which the FIG. 23 can be extended. That is, any given extension can implement merely a portion of flowchart 2400. Particularly, different instances of the trained copilot can follow different paths in FIG. 24, and a given copilot can follow different paths at respective times or for respective work sessions.

At block 2410, the generated annotations include workflow maps and can be collected in a training corpus 2415. At block 2420, at least portions 2425 of the collected annotations (e.g. retrieved from the training corpus) can be used to train a second ML tool to emulate one or more of the workflows. In some examples, the second ML tool can be trained to emulate all desired workflows represented in the training corpus while, in other examples, only a portion of the workflows are emulated by the second ML tool. In such examples, a third ML tool can be trained at block 2430, using at least second portions 2435 of the collected annotations, to emulate second workflows distinct from those emulated by the second ML tool. Like the annotator ML tool of block 2320, each of the second or third ML tools can be implemented as a stand-alone tool, a copilot (which can have a microservice network architecture), or can be incorporated within a microservice of such a copilot.

Segmented Workflow Maps—Example Method

Figure 25:
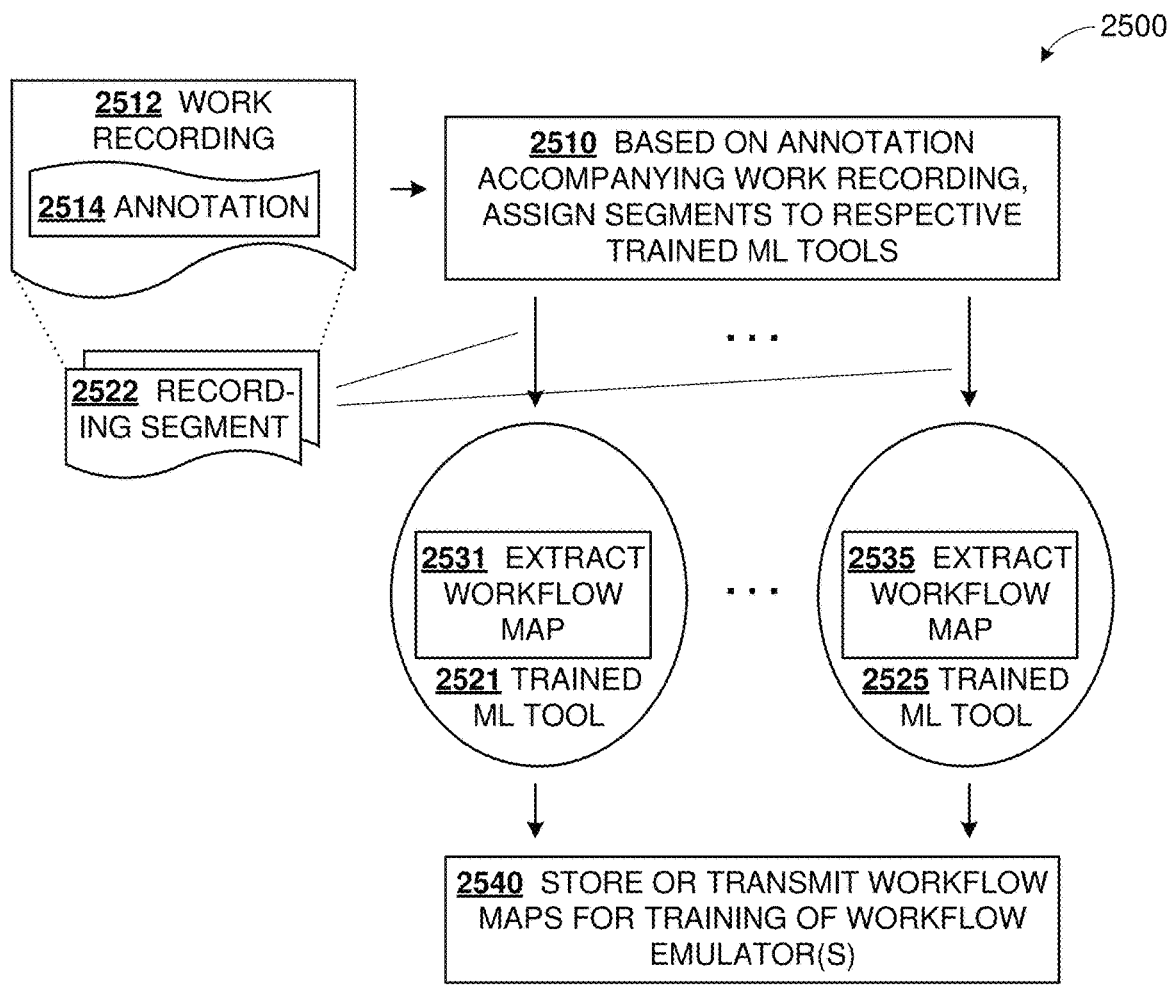
FIG. 25 is a dataflow diagram illustrating an example method with segmented workflow maps, according to the disclosed technologies.

FIG. 25 is a dataflow diagram 2500 illustrating an example method with segmented workflow maps. In this method, segments of a recording are assigned to respective trained ML tools, each of which extracts one or more workflow maps from its respective segment. The maps are available for subsequent use in training one or more emulators. Partitioning of a complex recording into segments can enable focused workflow map extraction by specially trained ML tools, which can offer numerous advantages. The specialized ML tools, singly or collectively, can be more compact, can require less computing resources, can require less training data, can be trained more quickly and efficiently, and can provide better performance, both in terms of efficient extraction and quality of output, when compared to another monolithic ML tool trained to extract workflow maps from a larger set of workflows. As described herein, the computational burden for training an N-parameter ML tool can often scale as $N^2$. As an illustration, 10 specialized tools having 100 million ("M") parameters and trained with 100M training records each, can require computation effort proportional to $10\times(100M\times100M)=10^{17}$. In comparison, a single 1 billion ("B") parameter model trained with 1 B training records can require computation effort proportional to $1B\times1B=10^{18}$. Specialization of ML tools can provide 1 order of magnitude reduction in customization computation, or even more, as well as improved safety and other benefits disclosed herein as advantages of a microservice network architecture.

Initially, work recording 2512 is available along with annotation 2514, both of which can be inputted to process block 2510. At block 2510, based on these inputs 2512, 2514, segments 2522 can be assigned to respective trained ML tools 2521 . . . 2525. ML tools 2521 . . . 2525 can execute respective process blocks 2531 . . . 2535 and can extract maps of respective workflows shown in the segments. Then, at block 2540, the extracted workflow maps can be stored or transmitted for use in training one or more of the workflows.

Numerous variations and extensions can be implemented within scope of the disclosed technologies. Some workflow maps can be flowcharts, but the instant method also supports other types of maps associated with workflows. As an illustration, a business trip from Oregon to Maryland can involve multiple maps addressing various aspects of the workflow. In one aspect, a workflow map can be a flowchart providing detailed route instructions such as: drive 100 miles on Highway A, take exit B to Highway C, and so forth. In another aspect, the trip workflow can be aided by prerequisite knowledge, such as a road map of the United States, including listings of gas stations or rest areas. Such prerequisite knowledge can be a workflow map in the form of a knowledge graph. Some prerequisite knowledge graphs can be read-only. In a further aspect, the trip workflow can require output in the form of an expense statement, listing e.g. hotel, meals, and gasoline purchased on Day 1, Day 2, and so forth. This output can also be organized as a list or another graph type, and can also be a workflow map in the form of a knowledge graph, representing knowledge to be acquired through performance or emulation of the workflow, or subsequently outputted. An emulator can be trained to write data into an output knowledge graph as the workflow is emulated. In cases where a single workflow has multiple workflow maps, one or more trained ML tools can extract respective maps.

At least one of trained ML tools 2521 . . . 2525 can be a copilot, e.g. implemented as a weakly connected network of microservices. Alternatively, at least two among trained ML tools 2521 . . . 2525 can be implemented as respective microservices within a copilot organized as a weakly connected network of microservices. The instant method, or any of its variations or extensions can be embodied as computer-readable media storing instructions executable by one or more hardware processors. When executed, these instructions can cause the hardware processor to perform the method of FIG. 25 or any of its variations or extensions.

Figure 26:
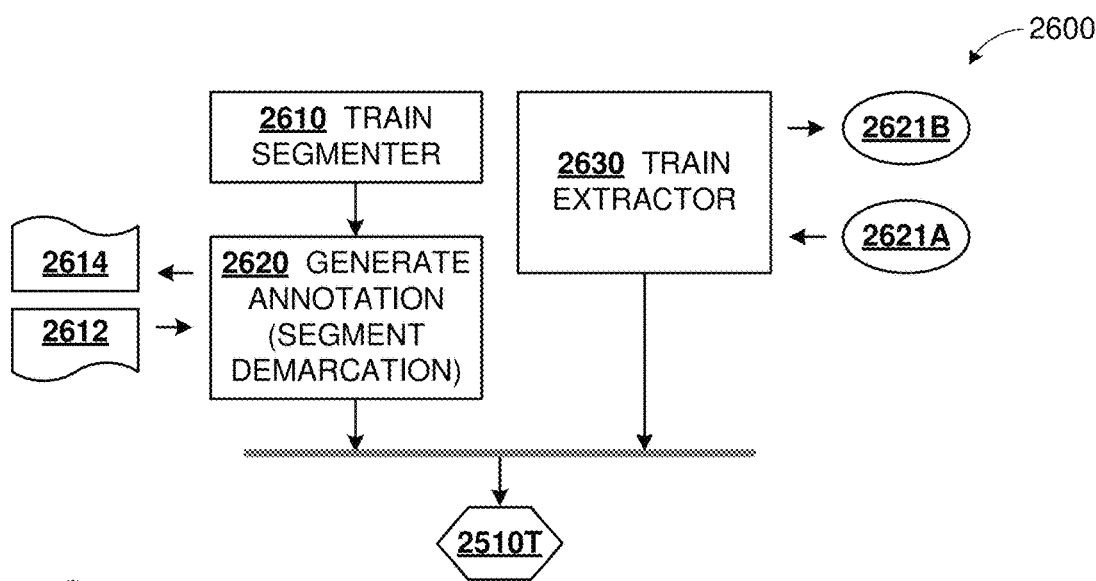
FIGS. 26, 27, and 28 are composite flowcharts illustrating example extensions to the method of FIG. 25, according to the disclosed technologies.
Figure 27:
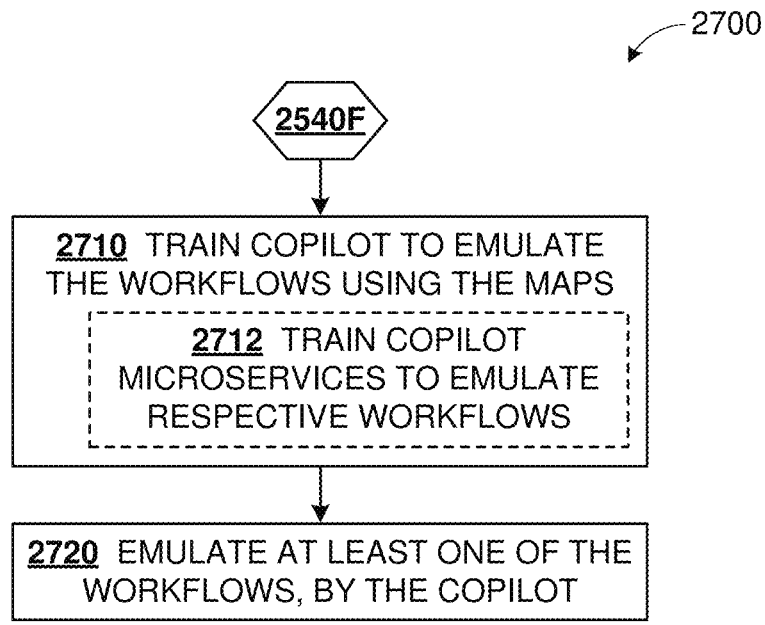
Figure 28:
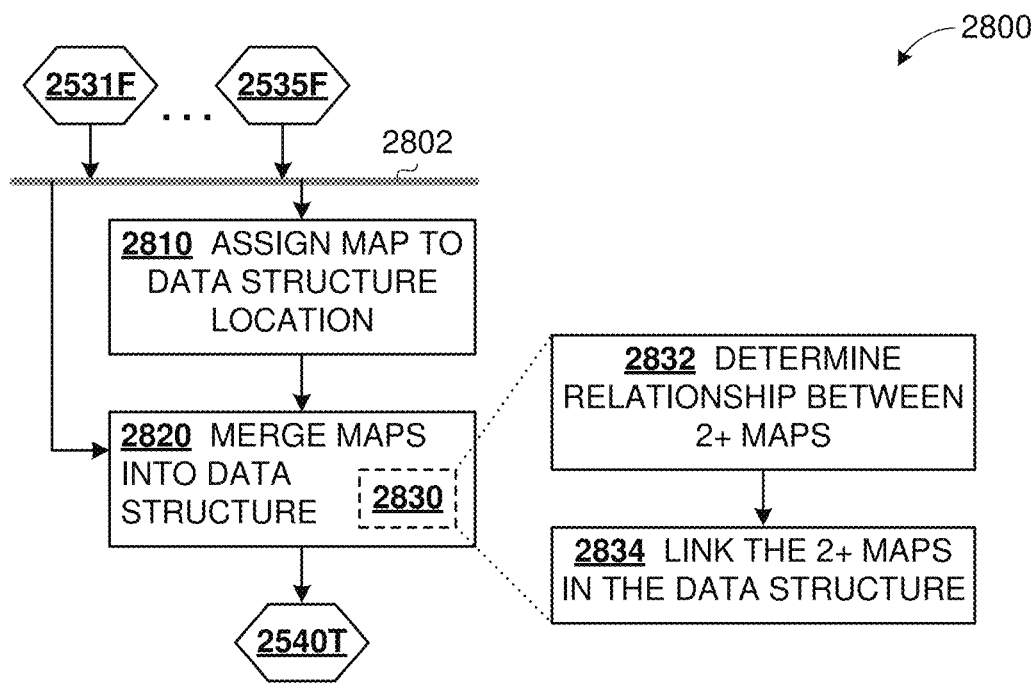

FIGS. 26, 27, and 28 are composite flowcharts 2600, 2700, 2800 illustrating some example extensions to the method of FIG. 25.

FIG. 26 shows extensions performed prior to block 2510 of FIG. 25. Hexagon connector 2510T indicates that flowchart 2600 can exit to block 2510, to perform the method of FIG. 25.

At block 2620, annotation 2614 in the form of segment demarcation can be generated from recording 2612. Recording 2612 and annotation 2614 can be used as inputs 2512, 2514 to block 2510. Block 2620 can be performed by another trained ML tool dubbed a "segmenter." The segmenter can be trained at block 2610 with a plurality of training data records, each record including a recorded session of skilled personnel performing one or more of the workflows, and an annotator's output demarcating respective segments of the recorded session associated with the one or more workflows.

In another extension, a trained ML tool can be trained at block 2630 to extract a workflow map. Block 2630 can operate on a trainee ML tool 2631A to obtain a trained ML tool 2631B dubbed an "extractor." Tool 2631B can be used as one of tools 2521 . . . 2525, and blocks similar to 2630 can also be applied to train others of tools 2521 . . . 2525. Training at block 2630 can be performed with a plurality of training data records, each record including a recorded session of skilled personnel performing one or more of the workflows, and an annotator's output comprising one or more workflow maps of at least some of these workflows.

Turning to FIG. 27, flowchart 2700 illustrates extensions which can follow block 2540, as indicated by hexagon connector 2540F. At block 2710, a copilot or other ML tool can be trained to emulate the workflows using the maps stored or transmitted at block 2540. The copilot can have a microservice network architecture as described herein. In further examples, block 2710 can incorporate block 2712, where each of a plurality of the copilot's microservices can be trained to respectively emulate one or a subgroup of the workflows. Partitioning of a complex job into separable workflows can enable focused workflow emulation by specially trained ML tools. Similar benefits accrue as described in context of FIG. 25.

As a further extension, the copilot trained at block 2710 can be used to emulate at least one of the workflows at block 2720.

FIG. 28 shows additional extensions which can be performed subsequent to workflow extraction at blocks 2531 . . . 2535 of FIG. 25, but before block 2540. Flowchart 2800 can be entered upon completion of some or all of blocks 2531 . . . 2535, as indicated by connectors 2531F . . . 2535F and join 2802. At block 2820, the extracted workflow maps can be merged into a composite data structure. In further examples, block 2820 can be implemented using block 2830, itself comprising blocks 2832, 2834. At block 2832, a relationship between two or more of the maps can be determined. Various techniques can be used, including semantic similarity, visual pattern matching, topological pattern matching, or external cues, in any combination. To illustrate, two or more workflows can be parts of a job, and a job description or task descriptions can provide the cues establishing a relationship between the workflows. Then, at block 2834, the two or more maps can be linked based on the determined relationship. After completion of block 2820, the method extension exits to block 2540 of FIG. 25, as indicated by connector 2540T.

In some examples, relationships can be determined between elements of knowledge graphs. To illustrate, vertices of a knowledge graph can be noun tokens, and edges of the graph can be verbs or other relationships linking two noun tokens. Other knowledge graph architectures can also be used, e.g. with verb tokens as vertices, or a combination of nouns and verbs, or other classes of data items. Relationship determination can be performed by exhaustive search, using indexes, by trained neural networks, or by other techniques.

In an additional extension, block 2810 can precede block 2820. At block 2810, at least one of the maps being merged can be assigned to a predetermined location in the composite data structure. The job description can also provide a skeleton of the composite data structure, having the predetermined locations at which various workflow maps can be attached at block 2810.

Distributed Task Processing—Example Microservice Network Architecture

Figure 29:
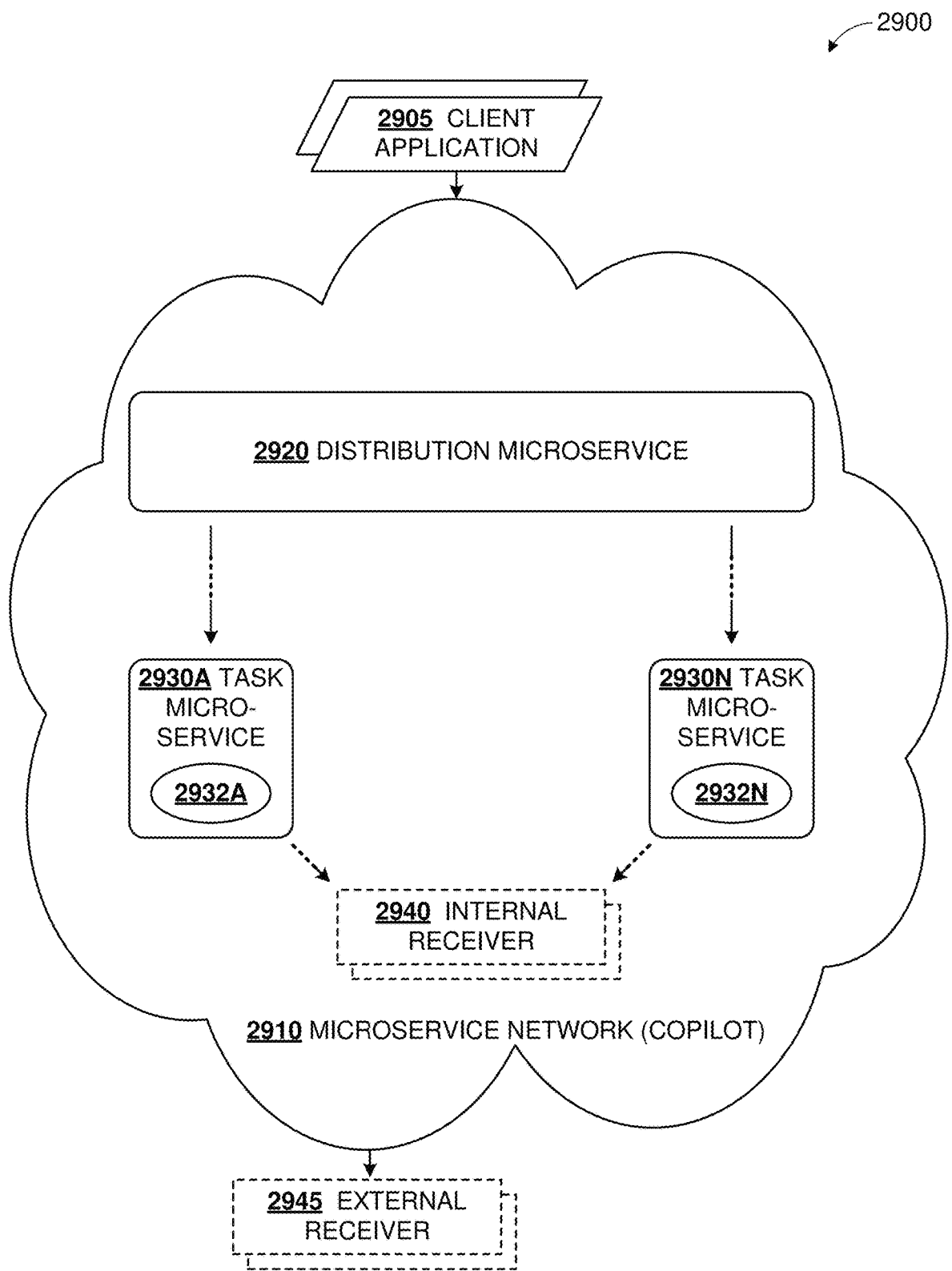
FIG. 29 is a diagram illustrating a microservice network architecture with which some examples of the disclosed technologies can implement distributed task processing.

FIG. 29 is a diagram 2900 illustrating a microservice network architecture with which some examples of the disclosed technologies can implement distributed task processing. FIG. 29 shows a microservice network 2910 (which can be a copilot) coupled to receive input from one or more client applications 2905. In some examples, output from microservice network 2910 can be directed to one or more external receivers 2945. In further examples, output from constituent microservices 2930A . . . 2930N can be directed to one or more internal receivers 2940. Microservice network 2910 can be implemented as computer-readable media storing instructions executable by one or more hardware processors. These instructions can be organized as a plurality of modules which, when executed, implement respective microservices including distribution microservice 2920 and a plurality of task microservices 2930A . . . 2930N, each incorporating a respective trained ML tool 2932A . . . 2932N. Such disclosed architectures, with variations or extensions, combine the benefits of subdividing complex tasks into simpler tasks, discussed in context of FIG. 25 or elsewhere herein, with the numerous advantages inherent in the microservice network architecture, as also described herein.

Task microservices 2930A . . . 2930N can be trained to emulate respective tasks. To illustrate, some tasks can be performed by a computing device, while other tasks can require external equipment for input or output, e.g. sensing or control. A task microservice 2930A . . . 2930N can cause the latter tasks to be performed in cooperation with coupled external equipment.

Distribution microservice 2920 can be configured to identify a task based on input from client application 2905, and forward the identified task toward a given one of task microservices 2930A . . . 2930N, the given task microservice 2930 being configured to emulate the identified task. Outputs from the given task microservice 2930 can variously lead toward external receiver 2945 or internal receiver 2940. Dashed line arrows within copilot 2910 indicate that an actual copilot architecture can have more microservices than those illustrated, and any of the illustrated paths can pass through other microservices, not shown. In examples, distribution microservice 2920 can identify multiple tasks from a single client input, and can route each identified task to a respective task microservice 2930.

Numerous variations and extensions can be implemented within scope of the disclosed technologies.

In some examples, the identified tasks can be generation of workflow maps, and copilot 2910 can implement the method described in context of FIG. 25, or a variation or extension thereof. Task microservices 2930A . . . 2930N can be trained according to the method described in context of FIG. 23, in particular block 2310, or an extension or variation thereof. Distribution microservice 2920, if implemented as a trained ML tool, can be trained as described in context of FIG. 26, in particular block 2610, or an extension or variation thereof.

In other examples, the identified tasks can be emulation of workflows, and task microservices 2930A . . . 2930N can be trained as described in context of FIG. 27, in particular block 2712, or an extension or variation thereof. Distribution microservice 2920, if implemented as a trained ML tool, can be implemented using similar techniques as described in context of FIG. 26, e.g. block 2610, or an extension or variation thereof.

Distribution microservice 2920 can also incorporate another trained ML tool. In examples, training data for distribution microservice 2920 can include a plurality of training data records, each record including a recorded session of one or more experts performing one or more among the tasks (e.g. workflows or generation of workflow maps), and an annotator's output identifying, for each of one or more portions of the recorded session, a respective task among the tasks. Distribution microservice 2920 can be implemented using similar techniques as described in context of FIG. 26, e.g. block 2610, or an extension or variation thereof.

Additional Examples

The following are additional examples of the disclosed technologies.

Methods and apparatus are disclosed for customizing a copilot. Document records related to copilot objectives or tasks are obtained and used to identify corresponding data sources. Data sources can be integrated into data producers or data repositories, to be used by a retrieval microservice. Data producers and other microservices are individually fine-tuned for the custom application, before or after integration into the copilot. The integrated copilot is tested end-to-end, and can be further refined. Disclosed techniques range from fully automated to human-in-the-loop (e.g. guided by an expert) to fully interactive. Some techniques produce tools which can automate certain customization operations. Training data, tasks, or document records blend expert-generated, developer-generated, or synthesized items.

Example 1 is a method, including: (a) capturing copilot objectives; (b) obtaining one or more document records, each document record pertaining to one or more of the copilot objectives; (c) identifying one or more data sources supporting the document record(s); (d) configuring one or more data producers to provide one or more interfaces with the data source(s); for each of the data producer(s): (e) executing a respective first training regimen on the each data producer; for each of a plurality of microservices of a copilot flow: (f) executing a respective second training regimen on the each microservice; (g) assemble a copilot incorporating the microservices and the data producer(s): (h) test the copilot; and in at least a first case, in which the copilot satisfies a predetermined performance criterion: (i) deploying the copilot.

Example 2 includes the subject matter of Example 1, and further specifies that act (h) determines that the copilot does not satisfy the predetermined performance criterion, and the method further comprises: until the copilot satisfies the predetermined performance criterion: performing one or more additional iterations of at least one among acts (a)-(g); and repeating act (h).

Example 3 includes the subject matter of any of Examples 1-2, and further specifies that executing the first or second training regimen on a target comprises: (ef1) generating training records including disjoint first and second subsets of records; (ef2) applying the first subset of records to train the target; and (ef3) applying the second subset of records to test the target.

Example 4 includes the subject matter of Example 3, and further specifies that the testing at act (ef3) determines that neither a predetermined second performance criterion nor a third criterion is met, and the method further comprises: iterating acts (ef2)-(ef3) until the testing at act (ef3) determines that the predetermined second performance criterion or the third criterion is met.

Example 5 includes the subject matter of any of Examples 3-4, and further specifies that the testing at act (ef3) determines that a predetermined second performance criterion is not met, and the method further comprises: iterating, until act (ef6) establishes that the predetermined second performance criterion is met: (ef4) generating additional training records including disjoint first and second additional subsets of records; (ef5) applying the first additional subset of records to train the target; and (ef6) applying at least the second additional subset of records to test the target.

Example 6 includes the subject matter of any of Examples 3-5, and further specifies that act (ef1) comprises act (ef1a) or act (ef1b): (ef1a): by an expert, generating a first group of the training records; or (ef1b): by a person distinct from the expert, generating first candidate training records and, by the expert, validating a subset of the first candidate training records as a second group of the training records; and act (ef1) further comprises act (ef1c): (ef1c) by a trained machine-learning tool, generating second candidate training records and, by the expert, validating a subset of the second candidate training records as a third group of the training records.

Example 7 includes the subject matter of any of Examples 1-6, and further specifies that the deployed copilot is configured to: receive input from a client; and process the input, using at least some of the microservices and the data producer(s), to obtain a result; and transmit the result to the client.

Example 8 includes the subject matter of any of Examples 1-7, and further includes: (i) configuring at least one of the identified data source(s) into a data repository; wherein the assembled copilot further incorporates the data repository.

Example 9 includes the subject matter of any of Examples 1-8, and further specifies that the document record(s) comprise one or more of: a meeting transcript; an email conversation; or a presentation.

Example 10 includes the subject matter of any of Examples 1-9, and further specifies that: the microservices include an expansion microservice, a retrieval microservice, a qualification microservice, a core microservice, a protection microservice, and an evaluation microservice; and wherein act (g) comprises: coupling the expansion microservice to receive input from a client interface or an intermodal microservice; coupling the retrieval microservice to receive input from the expansion microservice, the data producer(s), and a data repository; coupling the qualification microservice to receive input from the retrieval microservice; coupling the core microservice to receive input from the qualification microservice; coupling the protection microservice to receive input from the core microservice; coupling the evaluation microservice to receive input from the protection microservice; and coupling the evaluation microservice to provide output to the client interface or the retrieval microservice.

Example 11 includes the subject matter of any of Examples 1-10, and further specifies that act (b) comprises: prompting a trained machine learning tool to identify one or more candidate document records pertinent to one or more of the copilot objectives; receiving the candidate document record(s) from the trained machine learning tool; and validating a subset of the candidate document record(s) as at least some of the obtained document record(s).

Example 12 includes the subject matter of any of Examples 1-11, and further specifies that act (c) comprises: prompting a trained machine learning tool to determine one or more candidate data sources supporting one or more of the document record(s); receiving the candidate data source(s) from the trained machine learning tool; and validating a subset of the candidate data source(s) as at least some of the identified data source(s).

Example 13 is one or more computer-readable media storing instructions which, when executed by one or more hardware processors, cause the one or more hardware processors to perform operations comprising: (a) receiving one or more task inputs within scope of one or more copilot objectives; (b) obtaining one or more document records relevant to the task input(s); (c) based at least partly on the document record(s), identifying one or more data sources supporting the document record(s); (d) linking one or more of the data source(s) to respective data producer(s) of a copilot instance; for each of the data producer(s): (e) applying respective training data to fine-tune the each data producer until a respective first performance criterion is satisfied; and for each of a plurality of microservices of the copilot instance: (f) applying respective training data to fine-tune the each microservice until a respective second performance criterion is satisfied; and (g) apply testing data to verify that performance of the copilot instance, incorporating the fine-tuned data producer(s) and the fine-tuned microservices, satisfies a third performance criterion; wherein the copilot instance is configured to receive new task inputs within scope of the copilot objective(s) and, in response, generate and deliver corresponding outputs satisfying the copilot objective(s).

Example 14 includes the subject matter of Example 13, and further specifies that operation (b) further comprises: (b1) determining one or more candidate document records relevant to the task input(s); and (b2) obtaining validation of a subset of the candidate document record(s); wherein the obtained document record(s) comprise the validated subset of the candidate document record(s).

Example 15 includes the subject matter of any of Examples 13-14, and further specifies that operation (c) further comprises: (c1) determining one or more candidate data sources relevant to the document record(s); and (c2) obtaining validation of a subset of the candidate data source(s); wherein the identified data source(s) comprise the validated subset of the candidate data source(s).

Example 16 includes the subject matter of any of Examples 13-15, and further specifies that the linked one or more data sources are one or more first data sources, and the operations further comprise: (h) subsequent to act (c) and prior to act (g), integrating one or more second data sources of the one or more data sources into a data repository coupled to a retrieval microservice of the copilot instance.

Example 17 includes the subject matter of any of Examples 13-16, and further specifies that the operations further comprise: (i) integrating at least one of the fine-tuned data producer(s) into the copilot instance.

Example 17A is a system including one or more hardware processors with memory coupled thereto; and computer-readable media storing instructions which, when executed by the one or more hardware processors, cause the one or more hardware processors to perform the operations of any one of Examples 13-17, wherein the copilot instance is configured to receive new task inputs within scope of the copilot objective(s) and, in response, generate and deliver corresponding outputs satisfying the copilot objective(s).

Example 17B includes the subject matter of Example 17A and further specifies that (1) the new task inputs direct the copilot instance to conduct or monitor interviews, or (2) the new task inputs direct the copilot instance to annotate an interview or annotate a recorded work session.

Example 18 is a method comprising: (a) producing a language-trained machine learning tool ML2 from a machine learning tool ML1 by training the machine learning tool ML1 to perform general language tasks with at least a first predetermined performance level; (b) producing an occupation-trained machine learning tool ML3 from the language-trained machine learning tool ML2 by training the machine learning tool ML2 to perform occupation-related tasks of a given occupation with at least a second predetermined performance level; and/or (c) producing a custom-trained machine learning tool ML4 from the occupation-trained machine learning tool ML3 by training the machine learning tool ML3 to perform custom tasks of the given occupation with at least a third predetermined performance level.

Example 19 includes the subject matter of Example 18, and further specifies that the custom tasks of the given occupation or the occupation-related tasks comprise identifying one or more pertinent document records from a data corpus in response to a given task description, and the method further comprises: prompting the machine learning tool ML3 or ML4 with a task description within scope of a copilot objective; and receiving the pertinent document record(s) from the machine learning tool ML3 or ML4.

Example 20 includes the subject matter of Example 19, and further includes: validating a subset of the received document record(s).

Example 21 includes the subject matter of any of Examples 18-20, and further specifies that the custom tasks of the given occupation or the occupation-related tasks comprise determining, in response to a given document record, one or more data sources which support the given document record, and the method further comprises: prompting the machine learning tool ML3 or ML4 with a document record pertinent to a copilot objective; and receiving the supporting data source(s) from the machine learning tool ML3 or ML4.

Example 22 includes the subject matter of Example 21, and further includes: validating a subset of the received data source(s).

Example 23 includes the subject matter of any of Examples 18-22, and further specifies that the given occupation comprises interviewing.

Example 24 includes the subject matter of any of Examples 18-23, and further specifies that the given occupation comprises annotating interviews or annotating recorded work sessions.

Example 25 includes the subject matter of any of Examples 18-24, and further specifies that the custom-trained machine learning tool ML4 is a first custom-trained machine learning tool, and the method further comprises: (d) producing a second custom-trained machine learning tool ML5 from the occupation-trained machine learning tool ML3 by training the machine learning tool ML3 to perform second custom tasks of the given occupation with at least a fourth predetermined performance level.

Example 26 includes the subject matter of Example 25, and further includes: (e) deploying machine learning tools ML4 and ML5 at distinct first and second organizations respectively; wherein the training at act (c) uses proprietary data of the first organization without using proprietary data of the second organization, and the training at act (d) uses proprietary data of the second organization without using proprietary data of the first organization.

Example 27 includes the subject matter of any of Examples 18-26, and further includes: (d) deploying machine learning tool ML4 within a first microservice of a copilot, the copilot comprising a weakly connected network of microservices including the first microservice.

Example 28 is a computer-implemented method, including: displaying, on a graphical user interface, an input to a deployed copilot and an output returned by the deployed copilot in response to the input; receiving, on the graphical user interface, (i) an explanation of one or more deficiencies of the output and (ii) an alternative result improving on the one or more deficiencies; based on the explanation, identifying one or more microservices within the deployed copilot to be fine-tuned; and for each of the identified microservice(s): storing a training record comprising the input and the alternative result; and causing fine-tuning of the each microservice using the training record.

Example 29 includes the subject matter of Example 28, and further specifies that the custom tasks of the given occupation or the occupation-related tasks comprise identifying one or more pertinent document records from a data corpus in response to a given task description, and the method further comprises: prompting the machine learning tool ML3 or ML4 with a task description within scope of a copilot objective; and receiving the pertinent document record(s) from the machine learning tool ML3 or ML4.

Example 30 includes the subject matter of Example 29, and further includes: validating a subset of the received document record(s).

Example 31 includes the subject matter of any of Examples 28-30, and further specifies that the custom tasks of the given occupation or the occupation-related tasks comprise determining, in response to a given document record, one or more data sources which support the given document record, and the method further comprises: prompting the machine learning tool ML3 or ML4 with a document record pertinent to a copilot objective; and receiving the supporting data source(s) from the machine learning tool ML3 or ML4.

Example 32 includes the subject matter of Example 31, and further includes: validating a subset of the received data source(s).

Example 33 includes the subject matter of any of Examples 28-32, and further specifies that the given occupation comprises interviewing.

Example 34 includes the subject matter of any of Examples 28-33, and further specifies that the given occupation comprises annotating interviews or annotating recorded work sessions.

Example 35 includes the subject matter of any of Examples 28-34, and further specifies that the custom-trained machine learning tool ML4 is a first custom-trained machine learning tool, and the method further comprises: (d) producing a second custom-trained machine learning tool ML5 from the occupation-trained machine learning tool ML3 by training the machine learning tool ML3 to perform second custom tasks of the given occupation with at least a fourth predetermined performance level.

Example 36 includes the subject matter of Example 35, and further includes:(e) deploying machine learning tools ML4 and ML5 at distinct first and second organizations respectively; wherein the training at act (c) uses proprietary data of the first organization without using proprietary data of the second organization, and the training at act (d) uses proprietary data of the second organization without using proprietary data of the first organization.

Example 37 includes the subject matter of any of Examples 28-36, and further includes: (d) deploying machine learning tool ML4 within a first microservice of a copilot, the copilot comprising a weakly connected network of microservices including the first microservice.

Example 38 is one or more computer-readable media storing instructions which, when executed by one or more hardware processors, cause the one or more hardware processors to perform operations comprising the acts of Example 28; optionally including features and/or acts of any one of Examples 29-37.Example 39 is a system, including: one or more hardware processors with memory coupled thereto; and computer-readable media storing instructions which, when executed by the one or more hardware processors, cause the one or more hardware processors to perform operations comprising the acts of Example 28; optionally including subject matter, e.g. acts, of any one of Examples 29-37.

Example 40 includes the subject matter or any one of Examples 38-39, and further specifies that the custom-trained machine learning tool ML4 is a first custom-trained machine learning tool, and the operations further comprise: (d) producing a second custom-trained machine learning tool ML5 from the occupation-trained machine learning tool ML3 by training the machine learning tool ML3 to perform second custom tasks of the given occupation with at least a fourth predetermined performance level.

Interviewing, for generation of training data from skilled personnel, is automated in various ways. The training data is intended to train other ML tools to emulate workflow elicited from the skilled personnel. A trainee machine-learning (ML) tool can be provided representations of interviews and trained to perform a prediction function. The trained tool can be deployed to participate in conducting additional interviews of skilled personnel. The deployed tool can act as an independent interviewer or as a partner to other interviewers or evaluators, and can give feedback to other interviewers or receive feedback from evaluators. Interview representations can be annotated, e.g. with workflow maps, topic allocations, or commentary. Training of interviewers, evaluators, and annotators is disclosed, as also synthesis of interview representations.

Example A1 is a method, including: training a copilot to perform a prediction task using a training corpus comprising respective representations of one or more interviews, wherein each interview comprises an alternating sequence of (i) prompts from one or more interviewers to one or more subjects and (ii) responses from the one or more subjects; and deploying one or more instances of the trained copilot to participate in conducting additional interviews of skilled personnel.

Example A2 includes the subject matter of Example A1, and further includes: by a given instance of the deployed instance(s) of the trained copilot, conducting the additional interviews.

Example A3 includes the subject matter of any of Examples A1-A2, and further includes: by the given instance of the deployed instance(s) of the trained copilot, receiving feedback or suggestion from a partner monitoring at least one of the additional interviews.

Example A4 includes the subject matter of Example A3, and further specifies that the feedback or suggestion is received during the at least one additional interview.

Example A5 includes the subject matter of any of Examples A3-A4, and further specifies that the feedback or suggestion is received after the at least one additional interview and provides reinforcement learning.

Example A6 includes the subject matter of any of Examples A1-A5, and further includes: by a given instance of the deployed instance(s) of the trained copilot, suggesting prompts to a partner interviewer during at least one of the additional interviews.

Example A7 includes the subject matter of any of Examples A1-A6, and further specifies that the copilot comprises a network of microservices including an expansion microservice, a retrieval microservice, one or more core microservices, and one or more evaluation microservices.

Example A8 includes the subject matter of any of Examples A1-A7, and further specifies that the copilot comprises at least one large language model (LLM) or at least one deep neural network (DNN).

Example A9 includes the subject matter of any of Examples A1-A8, and further specifies that the copilot has less than 160 billion parameters.

Example A10 includes the subject matter of any of Examples A1-A9, and further specifies that at least a given interview of the one or more interviews is represented by a script in the training corpus.

Example A11 includes the subject matter of Example A10, and further specifies that the script comprises an authored text document.

Example A12 includes the subject matter of any of Examples A10-A11, and further specifies that the script comprises a transcript of the given interview.

Example A13 includes the subject matter of Example A12, and further specifies that the script comprises a transcript of the given interview, and the method further includes: extracting the transcript from an audio or video representation of the given interview.

Example A14 includes the subject matter of any of Examples A1-A13, and further specifies that the prediction task is to predict a next prompt.

Example A15 includes the subject matter of any of Examples A1-A14, and further specifies that the training is performed in multiple phases comprising three or more phases targeting progressively narrower knowledge domains.

Example A16 includes the subject matter of any of Examples A1-A15, and further specifies that the one or more subjects comprise at least one first subject having a first job description and at least one second subject having a second job description distinct from but related to the first job description.

Example A17 includes the subject matter of any of Examples A1-A16, and further specifies that at least a given interview of the one or more interviews is represented in the training corpus at least in part by a static or dynamic first workflow map prepared from the given interview by an annotator.

Example A18 includes the subject matter of Example A17, and further specifies that the prediction task is a first objective of the training, and the training further comprises a second training objective to generate second workflow maps for respective ones of the one or more interviews.

Example A19 includes the subject matter of Example A18, and further specifies that the copilot comprises a core microservice incorporating a long short-term memory.

Example A20 includes the subject matter of any of Examples A1-A19, and further specifies that for at least a given interview of the one or more interviews, the one or more interviewers are a single interviewer.

Example A21 includes the subject matter of any of Examples A1-A20, and further specifies that for at least a given interview of the one or more interviews, the one or more subjects are a single subject.

Example A22 includes the subject matter of any of Examples A1-A21, and further specifies that the trained copilot is a first copilot, and the method further comprises: generating training data from the additional interviews; using the training data to train a second copilot to emulate workflow of at least one of the skilled personnel; and causing the trained second copilot to be deployed to perform at least part of the emulated workflow.

Example A23 includes the subject matter of Example A22, and further specifies that the generated training data comprises workflow maps generated by the trained second copilot for the additional interviews.

Example A24 includes the subject matter of any of Examples A1-A23, and further specifies that the training is a second training process, and the method further comprises: in a first training process prior to the second training process, training the copilot to perform chain-of-thought reasoning tasks, tree reasoning tasks, or graphical reasoning tasks.

Example A25 is a system, including: one or more hardware processors with memory coupled thereto; and computer-readable media storing instructions executable by one or more hardware processors, the instructions comprising: a training module which, upon execution, is configured to train a copilot to perform a prediction task using a training corpus comprising respective representations of one or more interviews, wherein each interview comprises an alternating sequence of (i) prompts from one or more interviewers to one or more subjects and (ii) responses from the one or more subjects; and a run-time module in the trained copilot which, upon execution in a deployed instance of the trained copilot, is configured to participate in conducting additional interviews of skilled personnel; Example A25 optionally including subject matter from any one or more of Examples A2-A24.

Example A25A includes the subject matter of Example A25, and further specifies that the run-time module is configured to: (1) monitor the additional interviews, and provide feedback or suggestions to one or more interviewers conducting the additional interviews, or; (2) conduct the additional interviews.

Example A26 is a method, including: by a trained copilot: monitoring an interview of one or more skilled personnel conducted by one or more interviewers; and providing feedback or suggestions for at least one of the one or more interviewers based on the monitoring.

Example A27 includes the subject matter of Example A26, and further specifies that the feedback or suggestions are provided to the at least one interviewer during the interview.

Example A28 includes the subject matter of any of Examples A26-A27, and further specifies that the feedback or suggestions are provided after the interview.

Example A29 includes the subject matter of Example A28, and further specifies that the trained copilot provides feedback, at least one of the interviewers is a trained ML tool, and the method further comprises: creating one or more training data records based on the feedback; and causing updating of the trained ML tool by reinforcement learning using the one or more training data records.

Example A30 includes the subject matter of Example A29, and further specifies that at least a given one of the created training data record(s) comprises, at least in part, a static or dynamic first workflow map.

Example A31 includes the subject matter of Example A30, and further specifies that the updating improves a function of the trained ML tool to generate second workflow maps for respective interviews.

Example A32 includes the subject matter of any of Examples A26-A31, and further specifies that the trained copilot comprises a network of microservices including an expansion microservice, a retrieval microservice, one or more core microservices, and one or more evaluation microservices.

Example A33 includes the subject matter of any of Examples A26-A32, and further specifies that the trained copilot comprises at least one LLM or at least one DNN.

Example A34 includes the subject matter of any of Examples A26-A33, and further specifies that the trained copilot has less than 160 billion parameters.

Example A35 includes the subject matter of any of Examples A26-A34, and further specifies that the one or more interviewers are a single interviewer.

Example A36 includes the subject matter of any of Examples A26-A35, and further specifies that the one or more skilled personnel are a single skilled person.

Example A37 includes the subject matter of any of Examples A26-A36, and further includes: generating training data from the monitored interview; using the training data to train another copilot to emulate workflow of at least one of the skilled personnel; and causing the trained another copilot to be deployed to perform at least part of the emulated workflow.

Example A38 includes the subject matter of any of Examples A26-A37, and further specifies that the trained copilot is one of the one or more instances of any of Examples A1-A25.

Example A39 is a trained copilot, including: one or more hardware processors with memory coupled thereto; and computer-readable media storing instructions which, when executed, cause the one or more hardware processors to perform operations including the monitoring and providing acts of Example A26.

Example A40 includes the subject matter of Example A39 and further includes the subject matter, including acts, or any one or more of Examples A27-A38.

Recorded sessions of skilled personnel at work are used to train a first machine learning (ML) tool to extract workflow maps. These maps are used to train a second ML tool to emulate at least one workflow. The first ML tool is trained to predict an annotator's output. Either ML tool can be a copilot having a microservice network architecture. Further, complex sets of workflows can be subdivided for efficient support with small ML tools for (1) workflow map extraction and (2) emulation. Based on segment demarcation accompanying a recording, segments are assigned to specialized ML extraction tools for workflow map extraction. Extracted workflow maps are used to train workflow emulator(s). Similarly, specialized ML emulation tools can emulate respective tasks. A distribution microservice can identify a task to be emulated and can invoke the appropriate specialized ML tool. Similar microservice network architectures support both applications.

Example B1 is a method, including: training a machine learning (ML) tool to predict an annotator's output for one or more recorded sessions of skilled personnel at work; and deploying one or more instances of the trained ML tool to generate respective annotations for additional recorded work sessions.

Example B2 includes the subject matter of Example B1, and further specifies that each of the generated annotations comprises one or more workflow maps.

Example B3 includes the subject matter of Example B2, and further specifies that the ML tool is a first ML tool, and the method further comprises: collecting or storing the generated annotations in a training corpus; and training a second ML tool, using at least portions of the collected or stored annotations, to emulate at least some workflows described by the workflow maps.

Example B4 includes the subject matter of Example B3, and further specifies that training the second ML tool uses first portions of the collected annotations, the emulated workflows are first workflows, and the method further comprises: training a third ML tool, using second portions of the collected annotations, to emulate second workflows described by the workflow maps; wherein the second workflows are distinct from the first workflows.

Example B5 includes the subject matter of any of Examples B1-B4 wherein, for a given session of the additional recorded work sessions, the generated annotation demarcates segments of the given session associated with respective tasks.

Example B6 includes the subject matter of any of Examples B1-B5, and further specifies that the training comprises: an unsupervised learning phase in which the annotator's output is pre-existing and accompanies a recording of a respective session, of the recorded sessions, as training data provided to the ML tool.

Example B7 includes the subject matter of any of Examples B1-B6, and further specifies that the training comprises: a supervised learning phase in which the annotator's output is pre-existing, is excluded from training data provided to the ML tool, and is compared with output of the ML tool to determine a loss function from which feedback is provided to update parameters of the ML tool.

Example B8 includes the subject matter of any of Examples B1-B7, and further specifies that the training comprises: a reinforcement learning phase in which the annotator's output predicted by the ML tool is rated by a human evaluator or a reward model to generate feedback for updating parameters of the ML tool.

Example B9 includes the subject matter of any of Examples B1-B8, and further specifies that the training comprises a plurality of phases distinguished by one or more of: scope of knowledge of training data; configuration of the ML tool; training objective; or training modality.

Example B10 includes the subject matter of any of Examples B1-B9, and further specifies that the ML tool is a copilot comprising a weakly connected network of microservices.

Example B11 includes the subject matter of any of Examples B1-B10, and further specifies that the annotations are generated live during at least some of the additional work sessions.

Example B11A is one or more computer-readable media storing instructions executable by one or more hardware processors, the instructions including: first instructions which, upon execution, cause the training act of Example B1 to be performed, and second instructions which, upon execution in a deployed instance of the trained ML tool, cause the generation action of Example B1 to be performed; and optionally including the subject matter of any one or more of Examples B2 or B5-B11.

Example B11B includes the subject matter of Example B11A, and further includes: third instructions which, upon execution, cause the storing act of Example B2 to be performed; fourth instructions which, upon execution, cause the training act of Example B2, on the second ML tool, to be performed; fifth instructions which, upon execution, cause the training act of Example B3, on the third ML tool, to be performed, wherein the second workflows are distinct from the first workflows.

Example B11C is a system including: one or more hardware processors with memory coupled thereto; and computer-readable media storing instructions which, when executed, cause the one or more hardware processors to perform operations including: the training act of Example B1; and, by one or more deployed instances of the trained ML tool machine learning (ML), the generating act of Example B1; and optionally operations of Examples B2 or B3; and optionally including the subject matter of any one or more of Examples B2 or B5-B11.

Example B12 is a method, including: based on annotation accompanying a recording of skilled personnel at work, assigning two or more segments of the recording to respective trained machine learning (ML) tools; extracting maps of respective workflows shown in the segments by the respective trained ML tools; and storing or transmitting the maps for use in training one, two, or more emulators of the workflows.

Example B13 includes the subject matter of Example B12, and further specifies that at least one of the maps comprises a flowchart.

Example B14 includes the subject matter of any of Examples B12-B13, and further specifies that at least one of the maps comprises a knowledge graph supporting input or output of the respective workflow.

Example B15 includes the subject matter of any of Examples B12-B14, and further specifies that the skilled personnel are first skilled personnel, and the method further comprises: prior to the assigning, training at least one of the ML tools on training data records, each training data record comprising: a recorded session of second skilled personnel performing one or more of the workflows; and an annotator's output comprising one or more workflow maps of the one or more workflows.

Example B16 includes the subject matter of any of Examples B12-B15, and further includes: prior to the assigning, generating the annotation by another trained ML tool.

Example B17 includes the subject matter of Example B16, and further specifies that the skilled personnel are first skilled personnel, and the method further comprises: prior to the generating, training the another trained ML tool on training data records, each training data record comprising: a recorded session of third skilled personnel performing one or more of the workflows; and an annotator's output demarcating respective segments of the recorded session associated with the one or more workflows.

Example B18 includes the subject matter of any of Examples B12-B17, and further includes: training a copilot, using the maps, to emulate the workflows.

Example B19 includes the subject matter of Example B18, and further specifies that the copilot comprises a weakly connected network of microservices, and the training comprises: training each of a plurality of the microservices to emulate, respectively, one or more of the workflows.

Example B20 includes the subject matter of any of Examples B18-B19, and further includes: emulating, by the trained copilot, at least one of the workflows.

Example B21 includes the subject matter of any of Examples B12-B20, and further includes: prior to the storing or transmitting, merging the maps into a composite data structure.

Example B22 includes the subject matter of Example B21, and further specifies that at least one of the merged maps is assigned to a predetermined location in the composite data structure.

Example B23 includes the subject matter of any of Examples B21-B22, and further specifies that the merging comprises: determining a relationship between two or more of the maps; and linking the two or more maps in the composite data structure.

Example B24 includes the subject matter of any of Examples B12-B23, and further specifies that at least one of the trained ML tools is a copilot comprising a weakly connected network of microservices.

Example B25 includes the subject matter of any of Examples B12-B24, and further specifies that at least two of the trained ML tools are respective microservices within a common copilot comprising a weakly connected network of microservices.

Example B26 includes the subject matter of any of Examples B12-B25, and further includes: prior to the assigning, generating the annotation by another microservice within the common copilot.

Example B27 includes one or more computer-readable media storing instructions executable by one or more hardware processors which, when executed, cause the one or more hardware processors to perform the method of any of Examples B12-B26, e.g. the instructions can include first, second, and third instructions which, upon execution, respectively cause the assigning act, (by the respective trained ML tools) the extracting act, and the storing or transmitting act of Example B12 to be performed.

Example B27A includes the subject matter of Example B27, and further specifies that the instructions include: fourth instructions which, upon execution, cause a copilot to be trained, using the maps, to emulate the workflows, wherein the copilot includes a weakly connected network of microservices, and causing the copilot to be trained further includes: causing each of a plurality of the microservices to be trained to emulate, respectively, one or more of the workflows.

Example B27B is a system, including: one or more hardware processors with memory coupled thereto; and computer-readable media storing instructions which, when executed, cause the one or more hardware processors to perform operations comprising: based on annotation accompanying a recording of skilled personnel at work, assigning two or more segments of the recording to respective trained machine learning (ML) tools; extracting maps of respective workflows shown in the segments by the respective trained ML tools; and storing or transmitting the maps for use in training one or more emulators of the workflows; optionally wherein at least two of the trained ML tools are respective microservices within a common copilot comprising a weakly connected network of microservices; the operations optionally further including, prior to the assigning, generating the annotation by another trained ML tool.

Example B28 includes one or more computer readable media storing instructions executable by one or more hardware processors, wherein the instructions include: a plurality of modules which, when executed (e.g. by some of the one or more hardware processors), implement respective microservices, the microservices forming a weakly connected network configured as a copilot to one or more client applications; wherein the network of microservices includes a distribution microservice and a plurality of task microservices, each task microservice comprising a respective trained machine learning (ML) tool; wherein the task microservices are trained to perform respective tasks; wherein the distribution microservice is configured to: identify a first task based on input from a given one of the client applications; and forward the first task toward a given one of the task microservices; and wherein the given task microservice performs the first task.

Example B29 includes the subject matter of Example B28, and further specifies that the the instructions further include: a training module configured to train, upon execution, the given task microservice using a plurality of training data records, each training data record comprising: a workflow map corresponding to the first task.

Example B30 includes the subject matter of Example B29, and further specifies that the workflow map is an input workflow map, the first task is extraction of an output workflow map from a recorded session, and the each training data record further comprises: the recorded session of one or more experts performing at least the first task.

Example B31 includes the subject matter of any of Examples B29-B30, and further specifies that the first task is emulation of a workflow associated with the workflow map.

Example B32 includes the subject matter of any of Examples B28-B31, and further specifies that the distribution microservice is another trained ML tool.

Example B33 includes the subject matter of Example B32, and further specifies that the instructions further include: a training module configured to train, upon execution, the distribution microservice using a plurality of training data records, each training data record comprising: a recorded session of one or more experts performing one or more among the tasks; and an annotator's output identifying, for each of one or more segments of the recorded session, a respective task among the tasks.

Example B34 includes the subject matter of any of Examples B28-B33, and further specifies that the copilot further comprises an expansion microservice, a retrieval microservice, a core microservice, and an evaluation microservice.

Example B35 includes the subject matter of any of Examples B28-B34, and further specifies that the plurality of task microservices includes first and second task microservices, a training corpus includes distinct first and second segments of each of a plurality of interview scripts, and the instructions further include: one or more first training modules configured to train, upon execution, the first task microservice using the first segments as training data records; and one or more second training modules configured to train, upon execution, the second task microservice using the second segments as training data records.

Example B36 includes the subject matter of any of Examples B28-B34, and further specifies that the plurality of task microservices includes first and second task microservices, a training corpus includes distinct first and second segments of each of a plurality of recorded work sessions, and the instructions further include: one or more first training modules configured to train, upon execution, the first task microservice using the first segments as training data records; and one or more second training modules configured to train, upon execution, the second task microservice using the second segments as training data records.

Example B37 includes the subject matter of any of Examples B28-B36, and further specifies that the given task microservice is configured to transmit a result of performing the first task toward a receiver external to the copilot.

Example B38 includes the subject matter of Example B37, and further specifies that the receiver is a first receiver and a second task microservice, distinct from the given task microservice, is configured to transmit a result of performing its respective task toward a second receiver within the copilot, or toward a third receiver external to the copilot.

Example B39 is a system including: one or more hardware processors with memory coupled thereto; and computer readable media storing instructions executable by the one or more hardware processors, wherein the instructions include: a plurality of modules which, when executed, implement respective microservices, the microservices forming a weakly connected network configured as a copilot to one or more client applications; wherein the network of microservices includes a distribution microservice and a plurality of task microservices, each task microservice comprising a respective trained machine learning (ML) tool; wherein the task microservices are trained to perform respective tasks; wherein the distribution microservice is configured to: identify a first task based on input from a given one of the client applications; and forward the first task toward a given one of the task microservices; and wherein the given task microservice is configured or trained to perform the first task.

Example B40 includes the subject matter of Example B39, and further incorporates the subject matter of one or more of Examples B29-B38.

A Generalized Computer Environment

Figure 30:
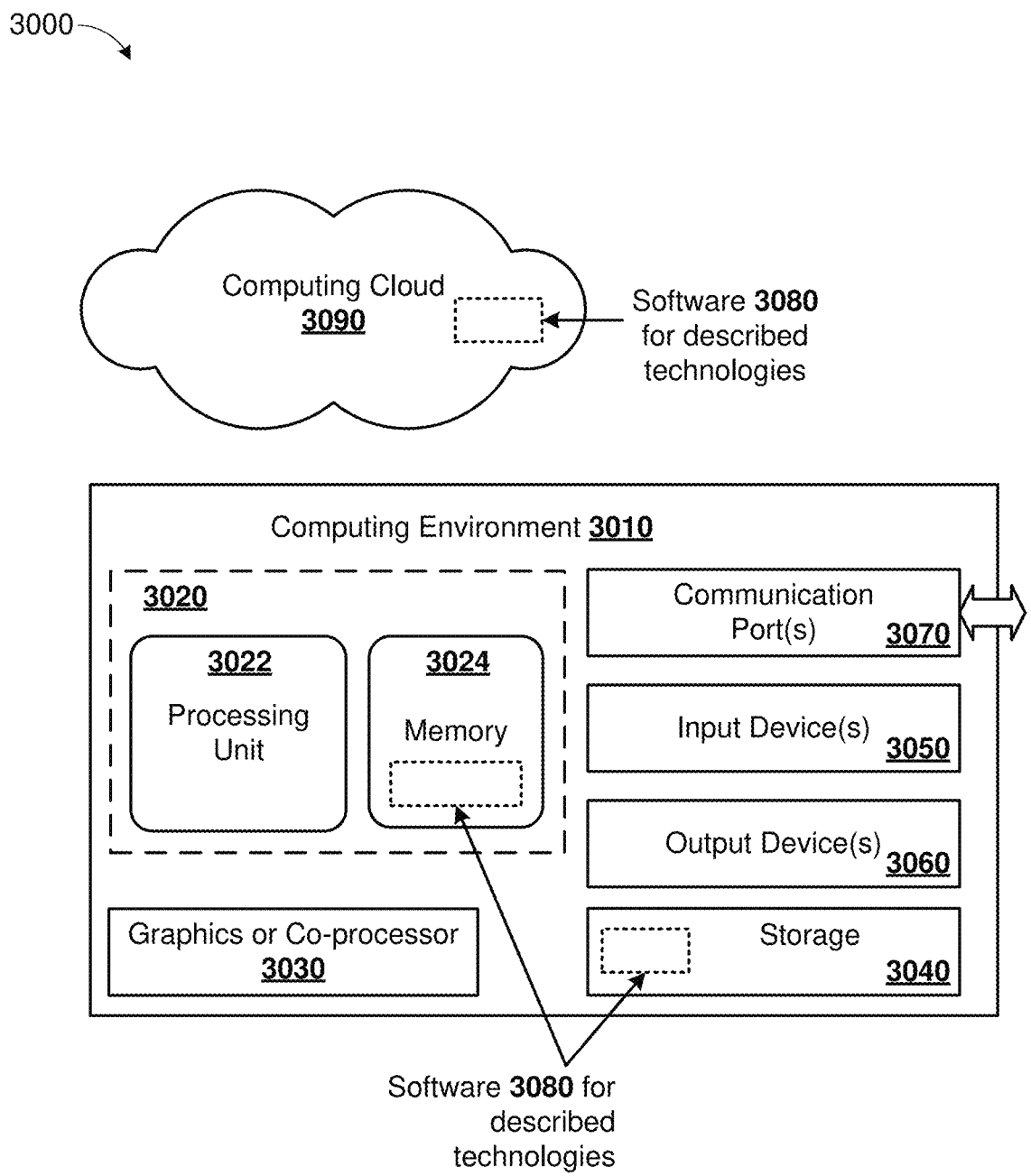
FIG. 30 is a diagram schematically depicting a computing environment suitable for implementation of disclosed technologies.

FIG. 30 illustrates a generalized example of a suitable computing system 3000 in which described examples, techniques, and technologies for customizing machine learning tools, incorporating automation in interviews, extracting annotations from recorded work sessions, associated training of machine-learning tools, or systems containing such tools, including construction, deployment, operation, and maintenance of software, can be implemented according to disclosed technologies. The computing system 3000 is not intended to suggest any limitation as to scope of use or functionality of the present disclosure, as the innovations can be implemented in diverse general-purpose or special-purpose computing systems.

With reference to FIG. 30, computing environment 3010 includes one or more processing units 3022 (e.g. a CPU) and memory 3024. In FIG. 30, this basic configuration 3020 is included within a dashed line. Processing unit 3022 executes computer-executable instructions, such as for implementing any of the methods or objects described herein for incorporating automation in interviews, extracting annotations from recorded work sessions, associated training of machine-learning tools, customizing or operating machine-learning tools, microservices, associated LMMs, LLMs, or copilots, or various other architectures, software components, procedural logic, handlers, managers, modules, or microservices described herein. Processing unit 3022 can be a general-purpose central processing unit (CPU), a processor in an application-specific integrated circuit (ASIC), or any other type of processor. In a multi-processing system, multiple processing units execute computer-executable instructions to increase processing power. Computing environment 3010 can also include one or more graphics processing units or co-processors 3030 (e.g. a GPU). Tangible memory 3024 can be volatile memory (e.g., registers, cache, or RAM), non-volatile memory (e.g., ROM, EEPROM, or flash memory), or some combination thereof, accessible by processing units 3022, 3030. The memory 3024 stores software 3080 implementing one or more innovations described herein, in the form of computer-executable instructions suitable for execution by the processing unit(s) 3022, 3030. The memory 3024 can also store interview representations, recordings, annotations, workflow maps, job descriptions, task descriptions, document records, scripts, data sources, tool parameters, inputs, outputs, classifications, training data, input data, output data, histories, evaluation results, cached data; other configuration data, data structures including data tables, working tables, change logs, output structures, data values, indices, or flags, as well as other operational data.

A computing system 3010 can have additional features, such as one or more of storage 3040, input devices 3050, output devices 3060, or communication ports 3070. An interconnection mechanism (not shown) such as a bus, controller, or network interconnects the hardware components of the computing environment 3010. Typically, operating system software (not shown) provides an operating environment for other software executing in the computing environment 3010, and coordinates activities of the hardware and software components of the computing environment 3010.

The tangible storage 3040 can be removable or non-removable, and can include magnetic disks, magnetic tapes or cassettes, CD-ROMs, DVDs, or any other medium which can be used to store information in a non-transitory way and which can be accessed within the computing environment 3010. The storage 3040 stores instructions of the software 3080 (including instructions and/or parameter data) implementing one or more innovations described herein, training data, interview representations, recordings, annotations, databases, libraries, other data repositories, or other data.

The input device(s) 3050 can be a mechanical, touch-sensing, or proximity-sensing input device such as a keyboard, mouse, pen, touchscreen, trackball, a voice input device, a scanning device, or another device that provides input to the computing environment 3010. The output device(s) 3060 can be a display, printer, speaker, optical disk writer, or another device that provides output from the computing environment 3010.

The communication port(s) 3070 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 3000 can also include a computing cloud 3090 in which instructions implementing all or a portion of the disclosed technologies are executed. Any combination of memory 3024, storage 3040, and computing cloud 3090 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 31:
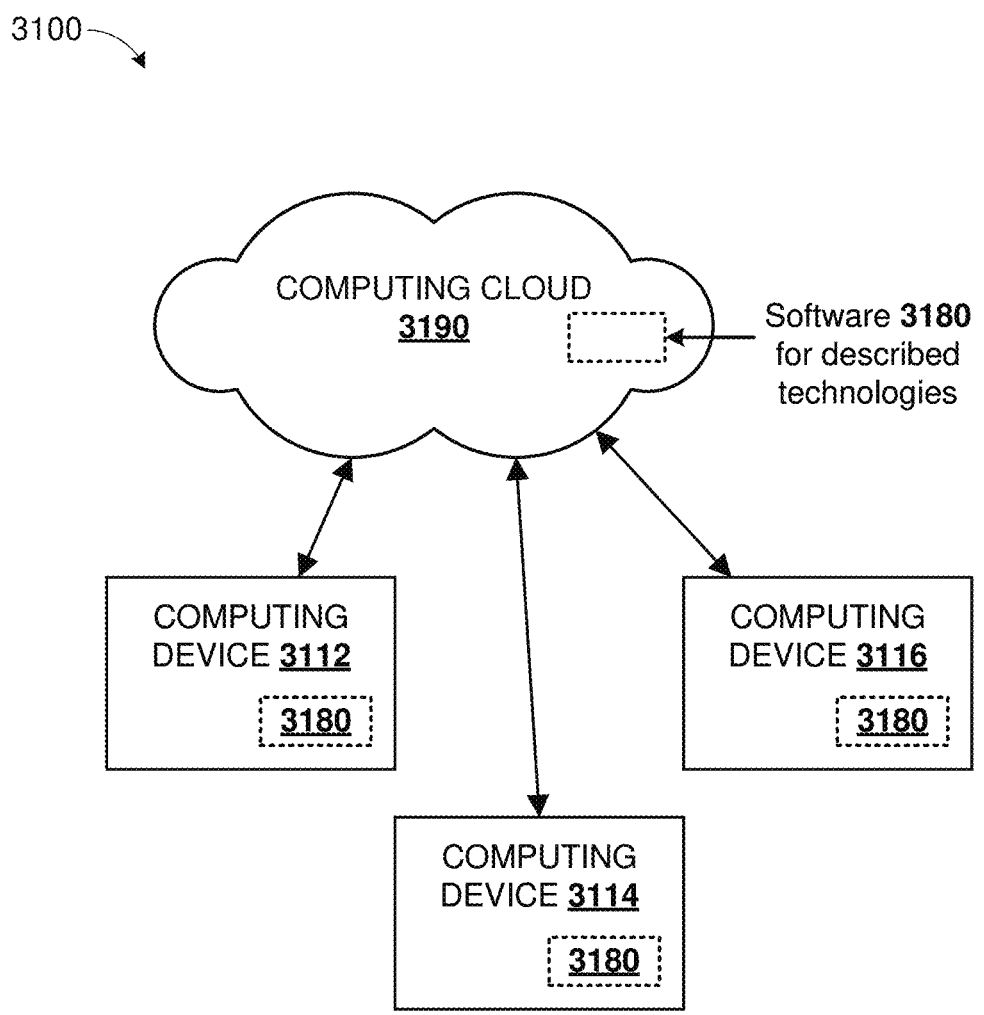
FIG. 31 is a diagram schematically depicting computing devices operating in conjunction with a computing cloud for implementation of disclosed technologies.

FIG. 31 depicts an example cloud computing environment 3100 in which the described technologies can be implemented. The cloud computing environment 3100 comprises a computing cloud 3190 containing resources and providing services or microservices. The computing cloud 3190 can comprise various types of cloud computing resources, such as computer servers, data storage repositories, networking resources, and so forth. The computing cloud 3190 can be centrally located (e.g., provided by a data center of a business or organization) or distributed (e.g., provided by various computing resources located at different locations, such as different data centers and/or located in different cities or countries).

The computing cloud 3190 can be operatively connected to various types of computing devices (e.g., client computing devices), such as computing devices 3112, 3114, and 3116, and can provide a range of computing services thereto. One or more of computing devices 3112, 3114, and 3116 can be computers (e.g., servers, virtual machines, embedded systems, desktop, or laptop computers), mobile devices (e.g., tablet computers, smartphones, or wearable appliances), or other types of computing devices. Communication links between computing cloud 3190 and computing devices 3112, 3114, and 3116 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 3112, 3114, and 3116 can also be connected to each other.

Computing devices 3112, 3114, and 3116 can utilize the computing cloud 3190 to obtain computing services and perform computing operations (e.g., data processing, data storage, and the like). Particularly, software 3180 for performing the described innovative technologies can be resident or executed in the computing cloud 3190, in computing devices 3112, 3114, and 3116, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and do not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "assemble," "assess," "assign," "author," "capture," "classify," "collect," "combine," "compare," "compute," "conduct," "configure," "couple," "create," "demarcate," "deploy," "detect," "determine," "diagnose," "discard," "distribute," "embed," "emulate," "evaluate," "execute," "expand," "extract," "filter," "fine-tune," "flag," "forward," "generate," "identify," "incorporate," "index," "infer," "input," "integrate," "interview," "invoke," "iterate," "learn," "link," "maintain," "measure," "merge," "modify," "monitor," "notify," "obtain," "optimize," "output," "perform," "predict," "prepare," "pretrain," "process," "produce," "prompt," "provide," "query," "rank," "read," "receive," "record," "represent," "request," "respond," "return," "retrieve," "run," "segment," "select," "send," "serve," "sort," "store," "suggest," "target," "test," "train," "transcribe," "transform," "translate," "transmit," "update," "use," "utilize," "validate," or "write," to indicate computer operations in a computer system. These terms denote actual operations that can be and sometimes are performed or controlled by a computer. The actual computer operations that correspond to these terms will vary depending on the particular implementation and are readily discernible by one of ordinary skill in the art having this disclosure at hand.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In some examples, values, procedures, or apparatus may be referred to as "optimal," "lowest," "best," "maximum," "extremum," or the like. It will be appreciated that such descriptions are intended to indicate that a selection among a few or among many alternatives can be made, and such selections need not be lower, better, less, or otherwise preferable to other alternatives not considered.

Any of the disclosed methods can be implemented as computer-executable instructions or a computer program product stored on one or more computer-readable storage media, such as tangible, non-transitory computer-readable media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 30, computer-readable storage media include memory 3024, and storage 3040. The terms computer-readable media or computer-readable storage media do not include signals and carrier waves. In addition, the terms computer-readable media or computer-readable storage media do not include communication ports (e.g., 3070) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Haskell, Java, JavaScript, Julia, Keras, Lisp, Matlab, Octave, Perl, Prolog, Python, R, Ruby, Rust, SAS, Scala, SPSS, Swift, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computer, hardware, and communication technologies are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed technologies may be applied, it should be recognized that the illustrated embodiments are only preferred examples and should not be taken as limiting the scope of the claims. Rather, the scope of the invention is defined by the following claims. We therefore claim all that comes within the scope and spirit of these claims.

We claim:
1. A method, comprising:
  (a) capturing copilot objectives;
  (b) obtaining one or more document records, each document record pertaining to one or more of the copilot objectives;
  (c) identifying one or more data sources supporting the document record(s);
  (d) configuring one or more data producers to provide one or more interfaces with the data source(s);
  for each of the data producer(s):
    (e) executing a respective first training regimen on the each data producer;
  for each of a plurality of microservices of a copilot flow:
    (f) executing a respective second training regimen on the each microservice;
  wherein executing the first or second training regimen on a target comprises:
    (ef1) generating training records including disjoint first and second subsets of records;
    (ef2) applying the first subset of records to train the target; and
    (ef3) applying the second subset of records to test the target; and
  further wherein:
    act (ef1) comprises act (ef1a) or act (ef1b):
      (ef1a) by an expert, generating a first group of the training records; or
      (ef1b) by a person distinct from the expert, generating first candidate training records and, by the expert, validating a subset of the first candidate training records as a second group of the training records; and
    act (ef1) further comprises act (ef1c):
      (ef1c) by a trained machine-learning tool, generating second candidate training records and, by the expert, validating a subset of the second candidate training records as a third group of the training records;
  (g) assemble a copilot incorporating the microservices and the data producer(s);
  (h) test the copilot; and
  in at least a first case, in which the copilot satisfies a predetermined performance criterion:
    (i) deploying the copilot.

2. The method of claim 1, wherein act (h) determines that the copilot does not satisfy the predetermined performance criterion, and the method further comprises:
  until the copilot satisfies the predetermined performance criterion:
    performing one or more additional iterations of at least one among acts (a)-(g); and
    repeating act (h).

3. The method of claim 1, wherein the deployed copilot is configured to:
  receive input from a client; and
  process the input, using at least some of the microservices and the data producer(s), to obtain a result; and
  transmit the result to the client.

4. The method of claim 1, further comprising:
  (i) configuring at least one of the identified data source(s) into a data repository;
  wherein the assembled copilot further incorporates the data repository.

5. The method of claim 1, wherein the document record(s) comprise one or more of:
  a meeting transcript; an email conversation; or a presentation.

6. The method of claim 1, wherein act (b) comprises:
  prompting a trained machine learning tool to identify one or more candidate document records pertinent to one or more of the copilot objectives;
  receiving the candidate document record(s) from the trained machine learning tool; and
  validating a subset of the candidate document record(s) as at least some of the obtained document record(s).

7. The method of claim 1, wherein act (c) comprises:
  prompting a trained machine learning tool to determine one or more candidate data sources supporting one or more of the document record(s);
  receiving the candidate data source(s) from the trained machine learning tool; and
  validating a subset of the candidate data source(s) as at least some of the identified data source(s).

8. One or more computer-readable media storing instructions which, when executed by one or more hardware processors, cause the one or more hardware processors to perform operations comprising:
  (a) receiving one or more task inputs within scope of one or more copilot objectives;
  (b) obtaining one or more document records relevant to the task input(s), the obtaining including:

(b1) determining one or more candidate document records relevant to the task input(s); and (b2) obtaining validation of a subset of the candidate document record(s);

wherein the obtained document record(s) comprise the validated subset of the candidate document record(s);

(c) based at least partly on the document record(s), identifying one or more data sources supporting the document record(s);

(d) linking one or more of the data source(s) to respective data producer(s) of a copilot instance;

for each of the data producer(s):

(e) applying respective training data to fine-tune the each data producer until a respective first performance criterion is satisfied; and for each of a plurality of microservices of the copilot instance:

(f) applying respective training data to fine-tune the each microservice until a respective second performance criterion is satisfied; and (g) apply testing data to verify that performance of the copilot instance, incorporating the fine-tuned data producer(s) and the fine-tuned microservices, satisfies a third performance criterion;

wherein the copilot instance is configured to receive new task inputs within scope of the copilot objective(s) and, in response, generate and deliver corresponding outputs satisfying the copilot objective(s).

9. The one or more computer-readable media of claim 8, wherein the linked one or more data sources are one or more first data sources, and the operations further comprise:

(h) subsequent to act (c) and prior to act (g), integrating one or more second data sources of the one or more data sources into a data repository coupled to a retrieval microservice of the copilot instance.

10. The one or more computer-readable media of claim 8, wherein the operations further comprise:

(i) integrating at least one of the fine-tuned data producer(s) into the copilot instance.

11. The one or more computer-readable media of claim 8, wherein the new task inputs direct the copilot instance to conduct or monitor interviews.

12. The one or more computer-readable media of claim 8, wherein the new task inputs direct the copilot instance to annotate an interview or annotate a recorded work session.

13. A method, comprising:

(a) capturing copilot objectives;

(b) obtaining one or more document records, each document record pertaining to one or more of the copilot objectives;

(c) identifying one or more data sources supporting the document record(s);

(d) configuring one or more data producers to provide one or more interfaces with the data source(s);

for each of the data producer(s):

(e) executing a respective first training regimen on the each data producer;

for each of a plurality of microservices of a copilot flow:

(f) executing a respective second training regimen on the each microservice;

wherein executing the first or second training regimen on a target comprises:

(ef1) generating training records including disjoint first and second subsets of records;

(ef2) applying the first subset of records to train the target; and (ef3) applying the second subset of records to test the target;

wherein, for at least a first case for which the testing at act (ef3) determines that neither a predetermined second performance criterion nor a third criterion is met, the method further comprises:

(ef4) iterating acts (ef2)-(ef3) until the testing at act (ef3) determines that the predetermined second performance criterion or the third criterion is met;

(g) assemble a copilot incorporating the microservices and the data producer(s):

(h) test the copilot; and in at least a first case, in which the copilot satisfies a predetermined performance criterion:

(i) deploying the copilot.

14. A method, comprising:

(a) capturing copilot objectives;

(b) obtaining one or more document records, each document record pertaining to one or more of the copilot objectives;

(c) identifying one or more data sources supporting the document record(s);

(d) configuring one or more data producers to provide one or more interfaces with the data source(s);

for each of the data producer(s):

(e) executing a respective first training regimen on the each data producer;

for each of a plurality of microservices of a copilot flow:

(f) executing a respective second training regimen on the each microservice;

wherein executing the first or second training regimen on a target comprises:

(ef1) generating training records including disjoint first and second subsets of records;

(ef2) applying the first subset of records to train the target; and (ef3) applying the second subset of records to test the target;

wherein, for at least a first case for which the testing at act (ef3) determines that a predetermined second performance criterion is not met, the method further comprises iterating, until act (ef6) establishes that the predetermined second performance criterion is met:

(ef4) generating additional training records including disjoint first and second additional subsets of records;

(ef5) applying the first additional subset of records to train the target; and (ef6) applying at least the second additional subset of records to test the target;

(g) assemble a copilot incorporating the microservices and the data producer(s):

(h) test the copilot; and in at least a first case, in which the copilot satisfies a predetermined performance criterion:

(i) deploying the copilot.

15. A method, comprising:

(a) capturing copilot objectives;

(b) obtaining one or more document records, each document record pertaining to one or more of the copilot objectives;

(c) identifying one or more data sources supporting the document record(s);

(d) configuring one or more data producers to provide one or more interfaces with the data source(s);

for each of the data producer(s):
  (e) executing a respective first training regimen on the each data producer;
for each of a plurality of microservices of a copilot flow:
  (f) executing a respective second training regimen on the each microservice;
  wherein the microservices include an expansion microservice, a retrieval microservice, a qualification microservice, a core microservice, a protection microservice, and an evaluation microservice;
  (g) assemble a copilot incorporating the microservices and the data producer(s), by:
    coupling the expansion microservice to receive input from a client interface or an intermodal microservice;
    coupling the retrieval microservice to receive input from the expansion microservice, the data producer(s), and a data repository;
    coupling the qualification microservice to receive input from the retrieval microservice;
    coupling the core microservice to receive input from the qualification microservice;
    coupling the protection microservice to receive input from the core microservice;
    coupling the evaluation microservice to receive input from the protection microservice; and
    coupling the evaluation microservice to provide output to the client interface or the retrieval microservice;
  (h) test the copilot; and
  in at least a first case, in which the copilot satisfies a predetermined performance criterion:
    (i) deploying the copilot.

16. One or more computer-readable media storing instructions which, when executed by one or more hardware processors, cause the one or more hardware processors to perform operations comprising:
  (a) receiving one or more task inputs within scope of one or more copilot objectives;
  (b) obtaining one or more document records relevant to the task input(s);
  (c) based at least partly on the document record(s), identifying one or more data sources supporting the document record(s), the identifying including:
    (c1) determining one or more candidate data sources relevant to the document record(s); and
    (c2) obtaining validation of a subset of the candidate data source(s);
    wherein the identified data source(s) comprise the validated subset of the candidate data source(s);
  (d) linking one or more of the data source(s) to respective data producer(s) of a copilot instance;
  for each of the data producer(s):
    (e) applying respective training data to fine-tune the each data producer until a respective first performance criterion is satisfied; and
  for each of a plurality of microservices of the copilot instance:
    (f) applying respective training data to fine-tune the each microservice until a respective second performance criterion is satisfied; and
  (g) apply testing data to verify that performance of the copilot instance, incorporating the fine-tuned data producer(s) and the fine-tuned microservices, satisfies a third performance criterion;
  wherein the copilot instance is configured to receive new task inputs within scope of the copilot objective(s) and, in response, generate and deliver corresponding outputs satisfying the copilot objective(s).

* * * * *